(12) United States Patent
Harada et al.

(10) Patent No.: US 7,873,594 B2
(45) Date of Patent: Jan. 18, 2011

(54) SYSTEM ANALYSIS PROGRAM, SYSTEM ANALYSIS METHOD, AND SYSTEM ANALYSIS APPARATUS

(75) Inventors: Lilian Harada, Kawasaki (JP);
Nobuhiro Yugami, Kawasaki (JP);
Kenichi Kobayashi, Kawasaki (JP);
Hiroshi Otsuka, Kawasaki (JP); Ken Yokoyama, Kawasaki (JP); Riichiro Take, Kawasaki (JP); Kazumi Kubota, Kawasaki (JP); Yuuji Hotta, Kawasaki (JP); Naoki Akaboshi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 37 days.

(21) Appl. No.: 10/980,766

(22) Filed: Nov. 3, 2004

(65) Prior Publication Data

US 2005/0289231 A1 Dec. 29, 2005

(30) Foreign Application Priority Data

Jun. 24, 2004 (JP) ............................. 2004-185909

(51) Int. Cl.
*G06F 17/30* (2006.01)

(52) U.S. Cl. .................................... 707/603
(58) Field of Classification Search ................. 707/103, 707/603
See application file for complete search history.

(56) References Cited

U.S. PATENT DOCUMENTS

| | | | | |
|---|---|---|---|---|
| 5,263,156 A | * | 11/1993 | Bowen et al. ............... | 707/202 |
| 5,530,939 A | * | 6/1996 | Mansfield et al. ........... | 707/201 |
| 5,878,420 A | * | 3/1999 | de la Salle .................... | 707/10 |
| 6,041,042 A | * | 3/2000 | Bussiere ..................... | 370/245 |
| 6,058,389 A | * | 5/2000 | Chandra et al. ................ | 707/1 |
| 6,286,004 B1 | * | 9/2001 | Yoshiura et al. ............... | 707/10 |

(Continued)

FOREIGN PATENT DOCUMENTS

JP 2004-032377 1/2004

OTHER PUBLICATIONS

Sakurada et al.; "Business Process Management Solution," Mitsubishi Engineering Technical Report, Mitsubishi Electric Engineering Company Limited, Apr. 25, 2003, vol. 77, No. 4, pp. 55-58.

(Continued)

*Primary Examiner*—Neveen Abel Jalil
*Assistant Examiner*—Mark Andrew X Radtke
(74) *Attorney, Agent, or Firm*—Greer, Burns & Crain, Ltd.

(57) ABSTRACT

A system analysis program which can accurately analyze the operational status of a system without modifying functions of the system for providing services. A message analysis unit analyzes the contents of collected messages, and determines the times of occurrence of the messages, the process types requested by the messages, and whether or not each of the messages is a request message or a response message. In response to an instruction for model generation, a model generation unit generates a transaction model satisfying at least one limiting condition related to caller-called relationships between processes, based on a set of messages selected in accordance with a selection criterion based on the certainty of existence of caller-called relationships. Then, in response to an instruction for analysis, an analysis unit analyzes the processing status of a transaction based on a protocol log conforming to the transaction model.

5 Claims, 55 Drawing Sheets

U.S. PATENT DOCUMENTS

| | | | |
|---|---|---|---|
| 6,304,913 B1* | 10/2001 | Rune | 709/241 |
| 6,327,591 B1* | 12/2001 | Osborn et al. | 707/10 |
| 6,393,480 B1 | 5/2002 | Qin et al. | |
| 6,584,477 B1* | 6/2003 | Mosher, Jr. | 707/204 |
| 6,647,400 B1* | 11/2003 | Moran | 707/205 |
| 6,650,731 B1* | 11/2003 | Steltner et al. | 379/15.01 |
| 6,889,231 B1* | 5/2005 | Souder et al. | 707/104.1 |
| 7,013,302 B2* | 3/2006 | Modelski et al. | 707/10 |
| 7,023,859 B2* | 4/2006 | Paul et al. | 370/400 |
| 7,065,534 B2* | 6/2006 | Folting et al. | 707/603 |
| 7,197,507 B2* | 3/2007 | Sugiura | 707/102 |
| 7,499,953 B2* | 3/2009 | Krishnaswamy et al. | 707/202 |
| 2002/0177910 A1* | 11/2002 | Quarterman et al. | 700/28 |
| 2002/0198985 A1* | 12/2002 | Fraenkel et al. | 709/224 |
| 2003/0217068 A1* | 11/2003 | Fruchtman et al. | 707/101 |
| 2004/0122942 A1* | 6/2004 | Green et al. | 709/224 |
| 2005/0086376 A1* | 4/2005 | Park et al. | 709/245 |
| 2005/0216421 A1* | 9/2005 | Barry et al. | 705/64 |
| 2005/0256897 A1* | 11/2005 | Sinha et al. | 707/102 |
| 2006/0004865 A1* | 1/2006 | Theurer | 707/104.1 |
| 2006/0195508 A1* | 8/2006 | Bernardin et al. | 709/203 |

OTHER PUBLICATIONS

Kobayashi et al.; "The flow analysis technique for workflow management using Distributed Independent Active Databases;" Information Processing Society of Japan SIG Notes, Information Processing Society of Japan, Jul. 17, 2002, vol. 2002, No. 67, pp. 9-16.

Technical Standard Application Response Measurement (ARM); Issue 4.0-C Binding; pp. 1-120; The Open Group; 2003.

IBM Tivoli Monitoring for Transaction—Performance helps maximize performance of your applications; IBM Corp. Software Group; pp. 1-11; Sep. 2003.

IBM Tivoli Monitoring for Transaction Performance, Version 5.2; IBM Corp. Software Group; pp. 1-4; 2003.

* cited by examiner

| TIME | IDENTIFICATION NUMBER | PROTOCOL | DIRECTION | OBJECT/ RESPONSE TIME |
|---|---|---|---|---|
| 112a — 00.00.00:100 | 1 | HTTP | REQUEST | /corba/servlet/Balance |
| 112b — 00.00.00:150 | 1 | IIOP | REQUEST | Mbalance |
| 112c — 00.00.00:190 | 1 | DB | REQUEST | Fetch ->Account |
| 112d — 00.00.00:200 | 1 | DB | RESPONSE | 0.010 |
| 112e — 00.00.00:240 | 1 | IIOP | RESPONSE | 0.090 |
| 112f — 00.00.00:290 | 1 | HTTP | RESPONSE | 0.190 |

FIG. 17

PROTOCOL-LOG STORAGE UNIT
112

| | | | | |
|---|---|---|---|---|
| 00.00.00:100 | 1 | HTTP | Request | /corba/servlet/Balance |
| 00.00.00:150 | 1 | IIOP | Request | Mbalance |
| 00.00.00:190 | 1 | DB | Request | Fetch->Account |
| 00.00.00:200 | 1 | DB | Response | 0.010 |
| 00.00.00:240 | 1 | IIOP | Response | 0.090 |
| 00.00.00:290 | 1 | HTTP | Response | 0.190 |
| 00.00.00:300 | 2 | HTTP | Request | /corba/servlet/Deposit |
| 00.00.00:360 | 2 | IIOP | Request | Mdeposit |
| 00.00.00:390 | 2 | DB | Request | Fetch->Account |
| 00.00.00:400 | 3 | HTTP | Request | /corba/servlet/Balance |
| 00.00.00:410 | 2 | DB | Response | 0.020 |
| 00.00.00:430 | 3 | IIOP | Request | Mbalance |
| 00.00.00:440 | 3 | DB | Request | Update->Account |
| 00.00.00:470 | 4 | DB | Request | Fetch->Account |
| 00.00.00:480 | 3 | DB | Response | 0.040 |
| 00.00.00:490 | 4 | DB | Response | 0.020 |
| 00.00.00:520 | 2 | IIOP | Response | 0.160 |
| 00.00.00:550 | 3 | IIOP | Response | 0.120 |
| 00.00.00:590 | 2 | HTTP | Response | 0.290 |
| 00.00.00:620 | 3 | HTTP | Response | 0.220 |
| 00.00.00:650 | 4 | HTTP | Request | /corba/servlet/Deposit |
| 00.00.00:710 | 4 | IIOP | Request | Mdeposit |
| 00.00.00:740 | 5 | DB | Request | Fetch->Account |
| 00.00.00:750 | 5 | DB | Response | 0.010 |
| 00.00.00:770 | 6 | DB | Request | Update->Account |
| 00.00.00:790 | 6 | DB | Response | 0.020 |
| 00.00.00:830 | 4 | IIOP | Response | 0.120 |
| 00.00.00:890 | 4 | HTTP | Response | 0.240 |

FIG. 18

FIG. 21
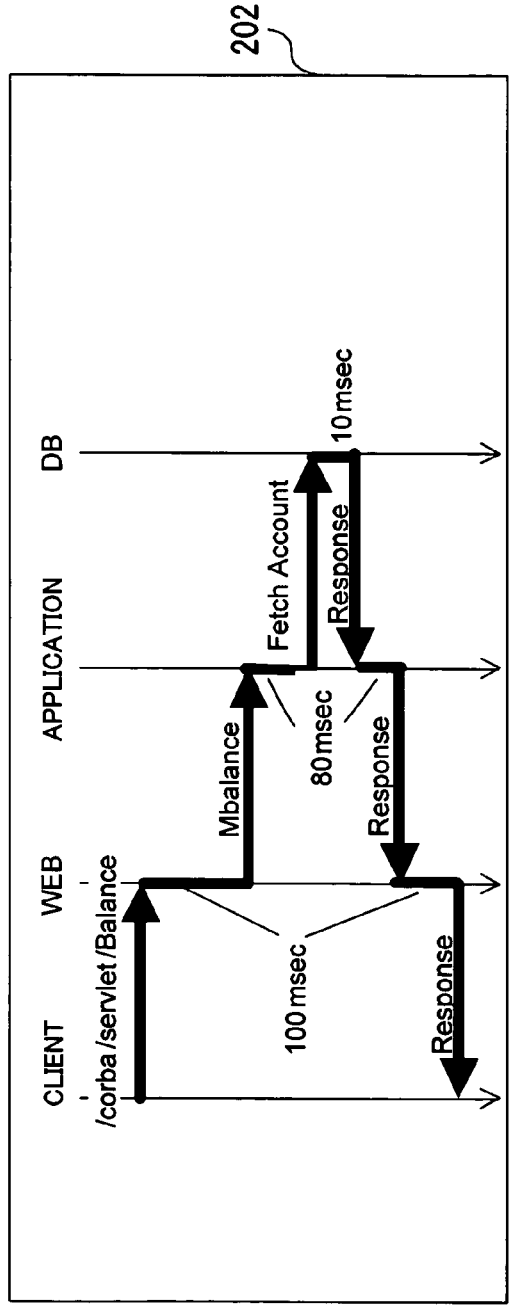
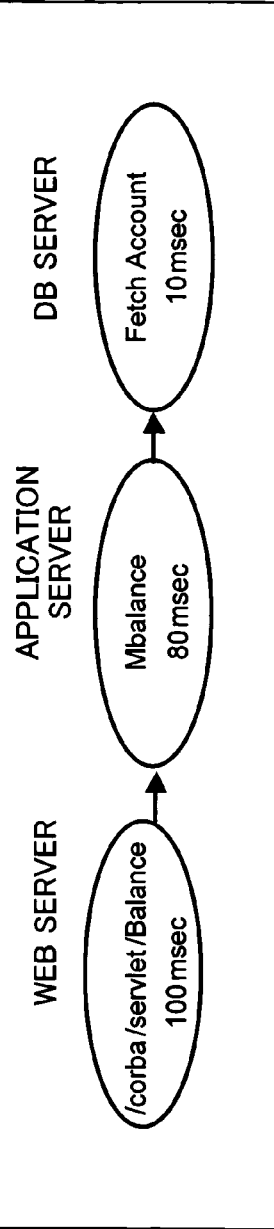

FIG. 24

112 PROTOCOL-LOG STORAGE UNIT

| | | | | |
|---|---|---|---|---|
| 221 | 10.00.00:000 | HTTP | 100 | Request | /corba/servlet/Balance |
| 222 | 10.00.00:040 | IIOP | 200 | Request | Mbalance |
| 223 | 10.00.00:045 | HTTP | 101 | Request | /corba/servlet/Deposit |
| 224 | 10.00.00:070 | DB | 500 | Request | Fetch->Account |
| 225 | 10.00.00:075 | IIOP | 201 | Request | Mdeposit |
| 226 | 10.00.00:080 | HTTP | 102 | Request | /corba/servlet/Deposit |
| 227 | 10.00.00:090 | DB | 500 | Response | 0.020(msec) |
| 228 | 10.00.00:095 | DB | 501 | Request | Fetch->Account |
| 229 | 10.00.00:115 | DB | 501 | Response | 0.020 |
| 230 | 10.00.00:125 | DB | 502 | Request | Update->Account |
| 231 | 10.00.00:130 | IIOP | 202 | Request | Mdeposit |
| 232 | 10.00.00:140 | IIOP | 200 | Response | 0.100 |
| 233 | 10.00.00:175 | DB | 502 | Response | 0.050 |
| 234 | 10.00.00:180 | DB | 503 | Request | Fetch->Account |
| 235 | 10.00.00:190 | HTTP | 100 | Response | 0.190 |
| 236 | 10.00.00:200 | DB | 503 | Response | 0.020 |
| 237 | 10.00.00:220 | DB | 504 | Request | Update->Account |
| 238 | 10.00.00:255 | IIOP | 201 | Response | 0.180 |
| 239 | 10.00.00:355 | HTTP | 101 | Response | 0.310 |
| 240 | 10.00.00:450 | DB | 504 | Response | 0.230 |
| 241 | 10.00.00:480 | IIOP | 202 | Response | 0.350 |
| 242 | 10.00.00:550 | HTTP | 102 | Response | 0.470 |

FIG. 40

PROTOCOL-LOG STORAGE UNIT 112

| | | | | | |
|---|---|---|---|---|---|
| 401 | 00.00.00:010 | | IIOP | Request | Mbalance |
| 402 | 00.00.00:030 | 1 | DB | Request | Fetch->Account |
| 403 | 00.00.00:050 | 2 | IIOP | Request | Mdeposit |
| 404 | 00.00.00:060 | 2 | DB | Request | Fetch->Account |
| 405 | 00.00.00:090 | 1 | DB | Response | 0.060 |
| 406 | 00.00.00:100 | 2 | DB | Response | 0.040 |
| 407 | 00.00.00:100 | 3 | IIOP | Request | Mdeposit |
| 408 | 00.00.00:110 | 3 | DB | Request | Fetch->Account |
| 409 | 00.00.00:120 | 4 | DB | Request | Update->Account |
| 410 | 00.00.00:140 | 1 | IIOP | Response | 0.130 |
| 411 | 00.00.00:140 | 4 | IIOP | Request | Mbalance |
| 412 | 00.00.00:160 | 4 | DB | Response | 0.040 |
| 413 | 00.00.00:170 | 2 | IIOP | Response | 0.120 |
| 414 | 00.00.00:180 | 3 | DB | Response | 0.070 |
| 415 | 00.00.00:190 | 5 | DB | Request | Update->Account |
| 416 | 00.00.00:210 | 6 | DB | Request | Fetch->Account |
| 417 | 00.00.00:220 | 5 | DB | Response | 0.030 |
| 418 | 00.00.00:250 | 6 | DB | Response | 0.040 |
| 419 | 00.00.00:260 | 3 | IIOP | Response | 0.160 |
| 420 | 00.00.00:270 | 4 | IIOP | Response | 0.130 |

| CALLER PROCESS \ CALLED PROCESS | IIOP TYPE A | IIOP TYPE B | DB TYPE a | DB TYPE b |
|---|---|---|---|---|
| IIOP TYPE A | 0 | 0 | 1 | 1 |
| IIOP TYPE B | 0 | 0 | 1 | 1 |
| DB TYPE a | 0 | 0 | 0 | 0 |
| DB TYPE b | 0 | 0 | 0 | 0 |

FIG. 43

| CALLER PROCESS / CALLER PROCESS | DB TYPE a | DB TYPE b |
|---|---|---|
| IIOP TYPE A | $\dfrac{(1+1/2)+1/2}{2}=1$ | $\dfrac{0+1/2}{2}=\dfrac{1}{4}$ |
| IIOP TYPE B | $\dfrac{1/2+(1+1/2)}{2}=1$ | $\dfrac{1/2+(1/2+1/2)}{2}=\dfrac{3}{4}$ |

FIG. 45

| CALLER PROCESS / CALLER PROCESS | DB TYPE a | DB TYPE b |
|---|---|---|
| IIOP TYPE A | $\dfrac{(1+1/2)+1/2}{2}=1$ | $\dfrac{0+1/4}{2}=\dfrac{1}{8}$ |
| IIOP TYPE B | $\dfrac{1/2+(1+1/2)}{2}=1$ | $\dfrac{1/2+(1/2+3/4)}{2}=\dfrac{7}{8}$ |

FIG. 47

| | PATTERN | PROBABILITY |
|---|---|---|
| PATTERN A1 | { } | (0 + 1/4) /2 = 1/8 |
| PATTERN A2 | { b } | (0 + 1/4) /2 = 1/8 |
| PATTERN A3 | { a } | (1/2 + 1/4)/2 = 3/8 |
| PATTERN A4 | { a, a } | (1/2 + 0)/2 = 1/4 |
| PATTERN A5 | { b, a } | (0 + 1/4)/2 = 1/8 |

FIG. 50

| | PATTERN | PROBABILITY |
|---|---|---|
| PATTERN B1 | { } | (1/4 + 0)/2 = 1/8 |
| PATTERN B2 | {a} | (1/4 + 1/8)/2 = 3/16 |
| PATTERN B3 | {b} | (1/4 + 0)/2 = 1/8 |
| PATTERN B4 | {a, b} | (1/4 + 1/4)/2 = 1/4 |
| PATTERN B5 | {a, a} | (0 + 1/8)/2 = 1/16 |
| PATTERN B6 | {a, b, b} | (0 + 1/8)/2 = 1/16 |
| PATTERN B7 | {a, b, a} | (0 + 1/4)/2 = 1/8 |
| PATTERN B8 | {a, b, b, a} | (0 + 1/8)/2 = 1/16 |

FIG. 51

| | PATTERN | PROBABILITY |
|---|---|---|
| PATTERN A1 | { } | 87/1624 = 0.054 |
| PATTERN A2 | { b } | 87/1624 = 0.054 |
| PATTERN A3 | { a } | 1023/1624 = 0.630 |
| PATTERN A4 | { a, a } | 224/1624 = 0.138 |
| PATTERN A5 | { b, a } | 203/1624 = 0.125 |

FIG. 52

|  | PATTERN | PROBABILITY |
|---|---|---|
| PATTERN B1 | { } | 404/6666 = 0.061 |
| PATTERN B2 | {a} | 1503/6666 = 0.225 |
| PATTERN B3 | {b} | 505/6666 = 0.076 |
| PATTERN B4 | {a, b} | 3033/6666 = 0.455 |
| PATTERN B5 | {a, a} | 198/6666 = 0.030 |
| PATTERN B6 | {a, b, b} | 495/6666 = 0.074 |
| PATTERN B7 | {a, b, a} | 363/6666 = 0.054 |
| PATTERN B8 | {a, b, b, a} | 165/6666 = 0.025 |

FIG. 53

| PROCESS TYPE OF CALLER | PATTERN | | PROBABILITY | |
|---|---|---|---|---|
| IIOP TYPE A | IIOP TYPE A → DB TYPE a (441) | | 0.82 | 0.630/(0.630+0.138) |
| | IIOP TYPE A → DB TYPE a, DB TYPE a (442) | | 0.18 | 0.138/(0.630+0.138) |
| IIOP TYPE B | IIOP TYPE B → DB TYPE a, DB TYPE b (443) | | 0.80 | 0.574/(0.574+0.142) |
| | IIOP TYPE B → DB TYPE a (444) | | 0.20 | 0.142/(0.574+0.142) |

FIG. 54

SYSTEM ANALYSIS PROGRAM, SYSTEM ANALYSIS METHOD, AND SYSTEM ANALYSIS APPARATUS

CROSS-REFERENCE TO RELATED APPLICATIONS

This application is based upon and claims the benefits of priority from the prior Japanese Patent Application No. 2004-185909, filed on Jun. 24, 2004, the V entire contents of which are incorporated herein by reference.

BACKGROUND OF THE INVENTION

1) Field of the Invention

The present invention relates to a system analysis program, a system analysis method, and a system analysis apparatus for analyzing the operational status of a network system, and particularly to a system analysis program, a system analysis method, and a system analysis apparatus for analyzing the operational status of a system based on a transaction model in which exchange of messages between servers during a transaction are defined.

2) Description of the Related Art

Many of the recent computer systems using the IT (information and communications technology) have large-scale complex constructions. For example, in an increasing number of systems, various transaction services such as transaction services for payment and transfer in online banking are provided through a 3-tier web system constituted by a web server, an application server, and a database (DB) server. Such systems have massive and complex constructions for enhancement of the efficiency in transactions, provision for security, and the like. In addition, since many transactions require promptness, suspension of services and deterioration of responses are serious problems. Therefore, it is necessary to keep track of details of the operational statuses of large-scale systems, and promptly solve performance problems.

Further, in order to determine the causes of a performance deterioration or a failure of a complex system (such as a tier web system) in which a plurality of applications operate in cooperation with each other, it is necessary to monitor and analyze the overall system performance as well as the behavior of each server. For example, in the 3-tier web systems, often, processing requests to an application server occur in correspondence with processing requests to a web server, and processing requests to a DB server occur in correspondence with processing requests to the application server. In order to investigate propagation of a performance problem in each system, it is necessary to examine caller-called relationships between processes in applications.

Therefore, there are demands for a function of tracking processing performed by each application, from a user's request to a response. When such tracking is possible, analysis of the problem of the system becomes easy.

This situation leads to increasing demands for a technique for tracking message exchanged between servers for processing by implementing an agent in each server. This technique makes each agent analyze and report the operational status of the server. For example, see FIG. 2 in the Technical Standard "Application Response Measurement (ARM)," Issue 4.0-C Binding, published by The Open Group, October 2003.

In addition, a technique in which an agent keeps track of the operational status and reports the result is already operational. For example, see "IBM Tivoli Monitoring for Transaction Performance helps maximize performance of your applications," published by IBM Corporation Software Group, September 2003, and "IBM Tivoli Monitoring for Transaction Performance," version 5.2, published by IBM Corporation Software Group, September 2003.

However, according to the conventional techniques, in order to acquire detailed information on an application-by-application basis, it is necessary to implement some application (e.g., an agent) in each server. Therefore, it is difficult to analyze the performance of an existing system. In particular, in the recent systems, each application is produced by a different company. Therefore, it is difficult to adapt such systems so as to enable exchange of information between every application and an agent.

SUMMARY OF THE INVENTION

The present invention is made in view of the above problems, and the object of the present invention is to provide a system analysis program, a system analysis method, and a system analysis apparatus which can accurately analyze the operational status of a system without modifying functions of the system for providing services.

In order to accomplish the above object, a system analysis program for analyzing, by use of a computer, the operational form of a network to which a plurality of servers are connected is provided. The system analysis program makes the computer execute processing comprising the steps of: (a) collecting messages transmitted or received through the network by using a message monitoring unit; (b) analyzing contents of the messages collected in step (a), determining process types requested by the messages and whether or not each of the messages is a request message or a response message, and storing in a protocol-log storage unit as a protocol log information which indicates the determined process types, by using a message analysis unit; (c) identifying at least one process corresponding to each process type, based on at least one correspondence relationship between at least one request message and at least one response message corresponding to the process type which are indicated in the protocol log stored in the protocol-log storage unit, generating a transaction model which satisfies at least one limiting condition related to caller-called relationships between processes, based on a set of messages selected in accordance with a selection criterion based on the certainty of existence of caller-called relationships, and storing the generated transaction model in a transaction-model storage unit, by using a model generation unit when an instruction for generation of a model is inputted into the model generation unit; and (d) extracting from the protocol-log storage unit record items constituting the protocol log and conforming to at least one caller-called relationship indicated by the transaction model stored in the transaction-model storage unit, and analyzing a processing status of a transaction constituted by messages indicated by the extracted record items, by using an analysis unit when an instruction for analysis is inputted into the analysis unit.

In addition, in order to accomplish the above object, a system analysis method for analyzing, by use of a computer, the operational form of a network to which a plurality of servers are connected is provided. The system analysis method comprises the steps of: (a) collecting messages transmitted or received through the network by using a message monitoring unit; (b) analyzing contents of the messages collected in step (a), determining process types requested by the messages and whether or not each of the messages is a request message or a response message, and storing in a protocol-log storage unit as a protocol log information which indicates the determined process types, by using a message analysis unit; (c) identifying at least one process corresponding to each process type, based on at least one correspondence relationship between at least one request message and at least one response message corresponding to the process type which are indicated in the protocol log stored in the protocol-log storage unit, generating a transaction model which satisfies at least one limiting condition related to caller-called relationships between processes, based on a set of messages selected in accordance with a selection criterion based on the certainty of existence of caller-called relationships, and storing the generated transaction model in a transaction-model storage unit, by using a model generation unit when an instruction for generation of a model is inputted into the model generation unit; and (d) extracting from the protocol-log storage unit record items constituting the protocol log and conforming to at least one caller-called relationship indicated by the transaction model stored in the transaction-model storage unit, and analyzing a processing status of a transaction constituted by messages indicated by the extracted record items, by using an analysis unit when an instruction for analysis is inputted into the analysis unit.

Further, in order to accomplish the above object, a system analysis apparatus for analyzing the operational form of a network to which a plurality of servers are connected is provided. The system analysis apparatus comprises: a message monitoring unit which collects messages transmitted or received through the network; a message analysis unit which analyzes contents of the messages collected by the message monitoring unit, determines process types requested by the messages and whether or not each of the messages is a request message or a response message, and stores in a protocol-log storage unit as a protocol log information indicating the determined process types; a model generation unit which identifies at least one process corresponding to each process type, based on at least one correspondence relationship between at least one request message and at least one response message corresponding to the process type which are indicated in the protocol log stored in the protocol-log storage unit, generates a transaction model satisfying at least one limiting condition related to caller-called relationships between processes, based on a set of messages selected in accordance with a selection criterion based on the certainty of existence of caller-called relationships, and stores the generated transaction model in a transaction-model storage unit, when an instruction for generation of a model is inputted into the model generation unit; and an analysis unit which extracts from the protocol-log storage unit record items constituting the protocol log and conforming to at least one caller-called relationship indicated by the transaction model stored in the transaction-model storage unit, and analyzes a processing status of a transaction constituted by messages indicated by the extracted record items, when an instruction for analysis is inputted into the analysis unit.

The above and other objects, features and advantages of the present invention will become apparent from the following description when taken in conjunction with the accompanying drawings which illustrate preferred embodiment of the present invention by way of example.

BRIEF DESCRIPTION OF THE DRAWINGS

In the drawings:

FIG. 17 is a diagram illustrating an example of a protocol log;

FIG. 18 is a diagram illustrating an example of a protocol log stored in a protocol-log storage unit;

FIG. 21 is a diagram illustrating an example of generation of a model of a "Balance Inquiry" transaction;

FIG. 24 is a diagram illustrating examples of messages which are inputted into an analysis unit;

FIG. 40 is a diagram illustrating examples of messages which are inputted into the analysis unit;

FIG. 43 is a diagram illustrating an example of a number-of-calls matrix;

FIG. 45 is a diagram illustrating an example of the number-of-calls matrix after an update;

FIG. 47 is a diagram illustrating an example of the number-of-calls matrix after the second update;

FIG. 50 is a first diagram illustrating patterns of calls from processes of the process type A and the probabilities of the patterns;

FIG. 51 is a first diagram illustrating patterns of calls from processes of the process type B and the probabilities of the patterns;

FIG. 52 is a second diagram illustrating patterns of calls from processes of the process type A and the probabilities of the patterns;

FIG. 53 is a second diagram illustrating patterns of calls from processes of the process type B and the probabilities of the patterns;

FIG. 54 is a diagram illustrating a result of generation of a model; and

DESCRIPTION OF THE PREFERRED EMBODIMENTS

The embodiments of the present invention are explained in detail below with reference to drawings.

First, an outline of the present invention which is realized in the embodiments is explained, and thereafter details of the embodiments are explained.

Figure 1:
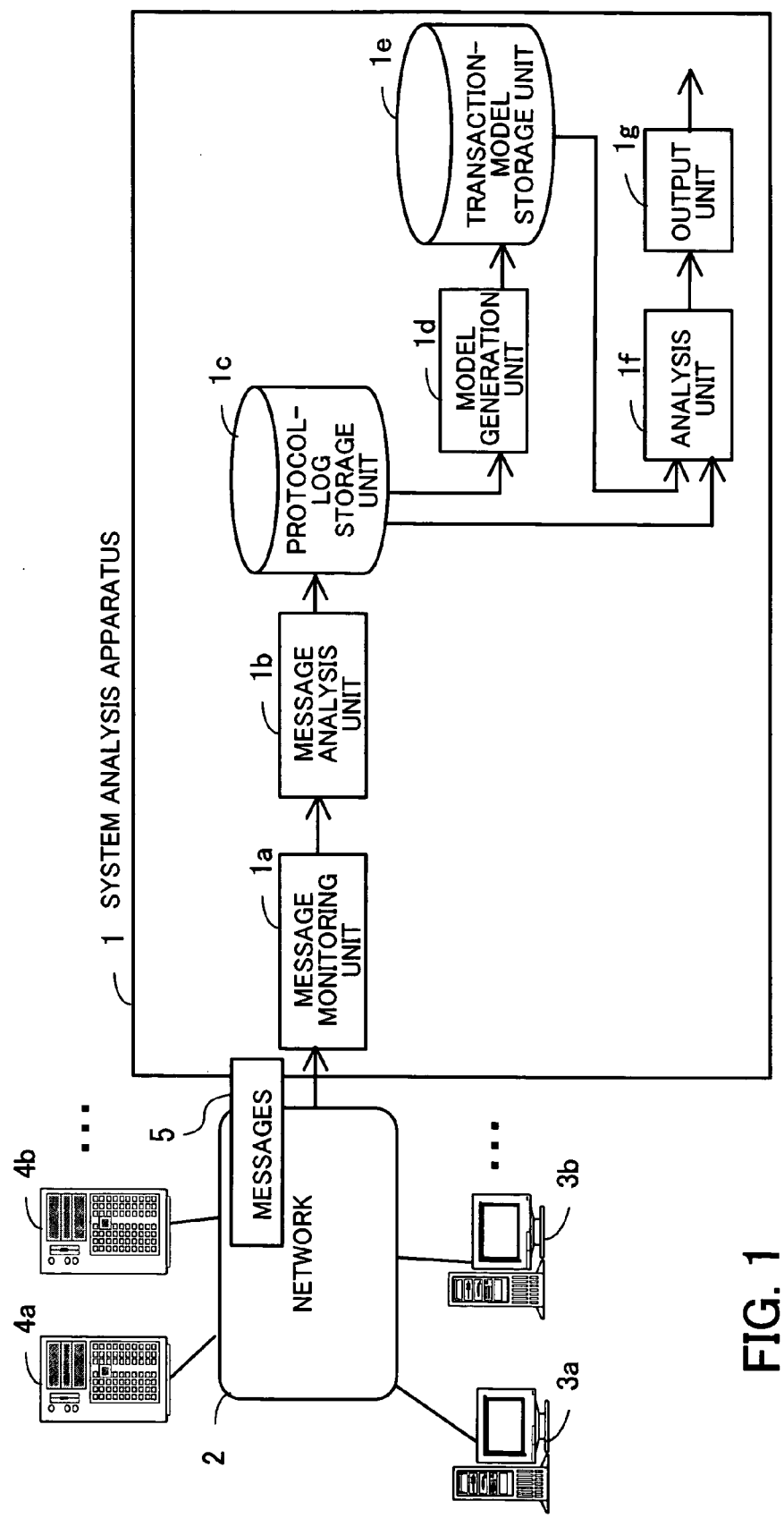
FIG. 1 is a conceptual diagram illustrating the present invention which is applied to embodiments.

FIG. 1 is a conceptual diagram illustrating the present invention which is applied to the embodiments. The system analysis apparatus 1 is connected to clients 3a, 3b, . . . and servers 4a, 4b, . . . through a network 2. The servers 4a, 4b, . . . provides services in response to requests from the clients 3a, 3b, . . . . In order to provide the services, the servers 4a, 4b, . . . cooperate with each other. At this time, the system analysis apparatus 1 acquires messages 5 which are transmitted or received through the network 2, and analyzes the operational form of the network 2. In order to perform the analysis, the system analysis apparatus 1 has the functions illustrated in FIG. 1.

A message monitoring unit 1a collects the above messages 5, and passes the collected messages 5 to a message analysis unit 1b.

The message analysis unit 1b analyzes the contents of the collected messages, and determines the process types (the types of processing) requested by the messages and the directions of the messages (i.e., whether each of the messages is a request message or a response message) For example, when a protocol applied to the messages is HTTP (HyperText Transfer Protocol), the process types can be determined based on the URLs (Uniform Resource Locators) which are designated by the requests for processing. Then, the message analysis unit 1b stores in a protocol-log storage unit 1c the information obtained by the above determination as a protocol log.

When a model generation unit 1d receives an instruction for generation of a model, the model generation unit 1d recognizes at least one process corresponding to each process type, based on correspondence relationships between response messages and request messages being recorded in the protocol log stored in the protocol-log storage unit 1c and corresponding to the process type. Then, the model generation unit 1d generates a transaction model which satisfies at least one limiting condition related to caller-called relationships between processes, based on a set of messages (message set) selected in accordance with a certain selection criterion based on the certainty of existence of caller-called relationships between the processes. The model generation unit 1d stores the generated transaction model in a transaction-model storage unit 1e.

The selection criterion requires, for example, to select a set of messages so that the processing times of the messages are within time spans of nonmultiple transactions which do not overlap with processing times of other transactions. In addition, the at least one limiting condition includes, for example, a condition that the processing time of a called process is contained in the processing time of the corresponding calling process.

When an analysis unit 1f receives an instruction for analysis, the analysis unit 1f extracts from the protocol-log storage unit 1c protocol-log record items corresponding to at least one caller-called relationship indicated in the transaction model stored in the transaction-model storage unit 1e. Then, the analysis unit 1f analyzes the processing status of a transaction constituted by messages indicated in the extracted protocol-log record items. For example, the analysis unit 1f analyzes the processing time in each server for the transaction.

An output unit 1g outputs to a monitor or the like a result of the analysis by the analysis unit 1f, in a form of statistical information which is easy to visually recognize, e.g., a graph.

In the system analysis apparatus 1 having the above construction, the message monitoring unit 1a collects messages 5 which are transmitted or received through the network 2. Then, the message analysis unit 1b analyzes the contents of the collected messages, determines the times of occurrence of the messages, the process types requested by the messages, and the directions of the messages (i.e., whether each of the messages is a request message or a response message). Then, the message analysis unit 1b stores the information obtained by the above determination as protocol-log record items in the protocol-log storage unit 1c.

When an instruction to generate a model is inputted into the system analysis apparatus 1, the model generation unit 1d recognizes each process corresponding to each process type based on a correspondence relationship between a request message and a response message corresponding to each process type in the protocol log stored in the protocol-log storage unit 1c. Then, a transaction model satisfying at least one limiting condition is generated in accordance with a certain selection criterion based on the certainty of existence of caller-called relationship between processes. The generated transaction model is stored in the transaction-model storage unit 1e.

In addition, when an instruction for analysis is inputted, the analysis unit 1f extracts from the protocol-log storage unit 1c protocol-log record items corresponding to at least one caller-called relationship indicated in the transaction model stored in the transaction-model storage unit 1e, and analyzes the processing status of a transaction constituted by messages indicated in the extracted protocol-log record items. The output unit 1g outputs the result of the analysis for presenting the result of the analysis to a user.

As explained above, according to the present invention, a set of messages are chosen from messages 5 transmitted or received through the network 2, in accordance with a selection criterion based on the certainty of existence of caller-called relationships between processes, and a transaction model is generated from the chosen set of messages. That is, at least one caller-called relationship between processes which occurs with high probability is chosen, a transaction realized by the at least one caller-called relationship is modeled. Thus, it is possible to identify a set of messages constituting a common transaction, and analyze the processing status by detecting, in the protocol log, messages conforming to the transaction model generated as above without adding functions to the servers 4a, 4b, . . . .

Hereinbelow, details of the embodiments of the present invention are explained.

First Embodiment

In the first embodiment, two services "balance inquiry" and "deposit" are provided in a 3-tier web system which provides transaction services for internet banking, and the elements to be managed include "session," "message," "object," and "transaction."

The "session" is a set of data transmitted through a transmission path determined by IP (Internet Protocol) addresses and port numbers on the source and destination sides.

The "message" is a minimum unit of data which is exchanged in a TCP (Transmission Control Protocol) session between a plurality of devices. For example, an HTTP request or an HTTP response is a message.

The "object" is a virtual object containing inputted data and one or more processes executed by a server after reception of a message before transmission of a response. The one or more processes are provided for calculation by a CPU (central processing unit), input and output of data, waiting for input and output of data, and the like.

The "transaction" is a set of object processes which occur in response to requests to the system.

Figure 2:
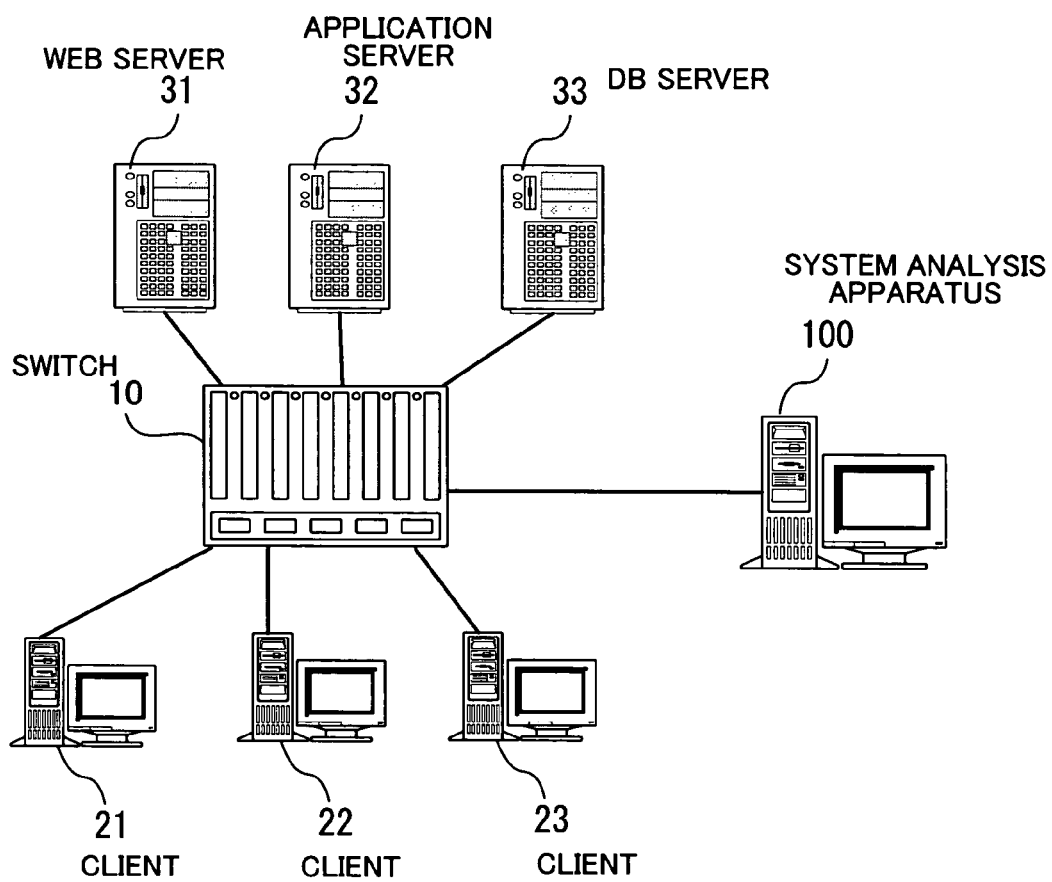
FIG. 2 is a diagram illustrating an example of a construction of a system of a first embodiment of the present invention.

FIG. 2 is a diagram illustrating an example of a construction of a system of the first embodiment of the present invention. In the example of FIG. 2, clients 21, 22, and 23, a web server 31, an application server 32, a database (DB) server 33, and a system analysis apparatus 100 are connected through a switch 10. The web server 31 the application server 32, and the DB server 33 provide services in response to requests from the clients 21, 22, and 23.

In some transactions for providing services, messages are exchanged between the web server 31, the application server 32, and the DB server 33 through the switch 10. The system analysis apparatus 100 can analyze the operational status of the system by monitoring the messages transmitted or received through the switch 10.

Figure 3:
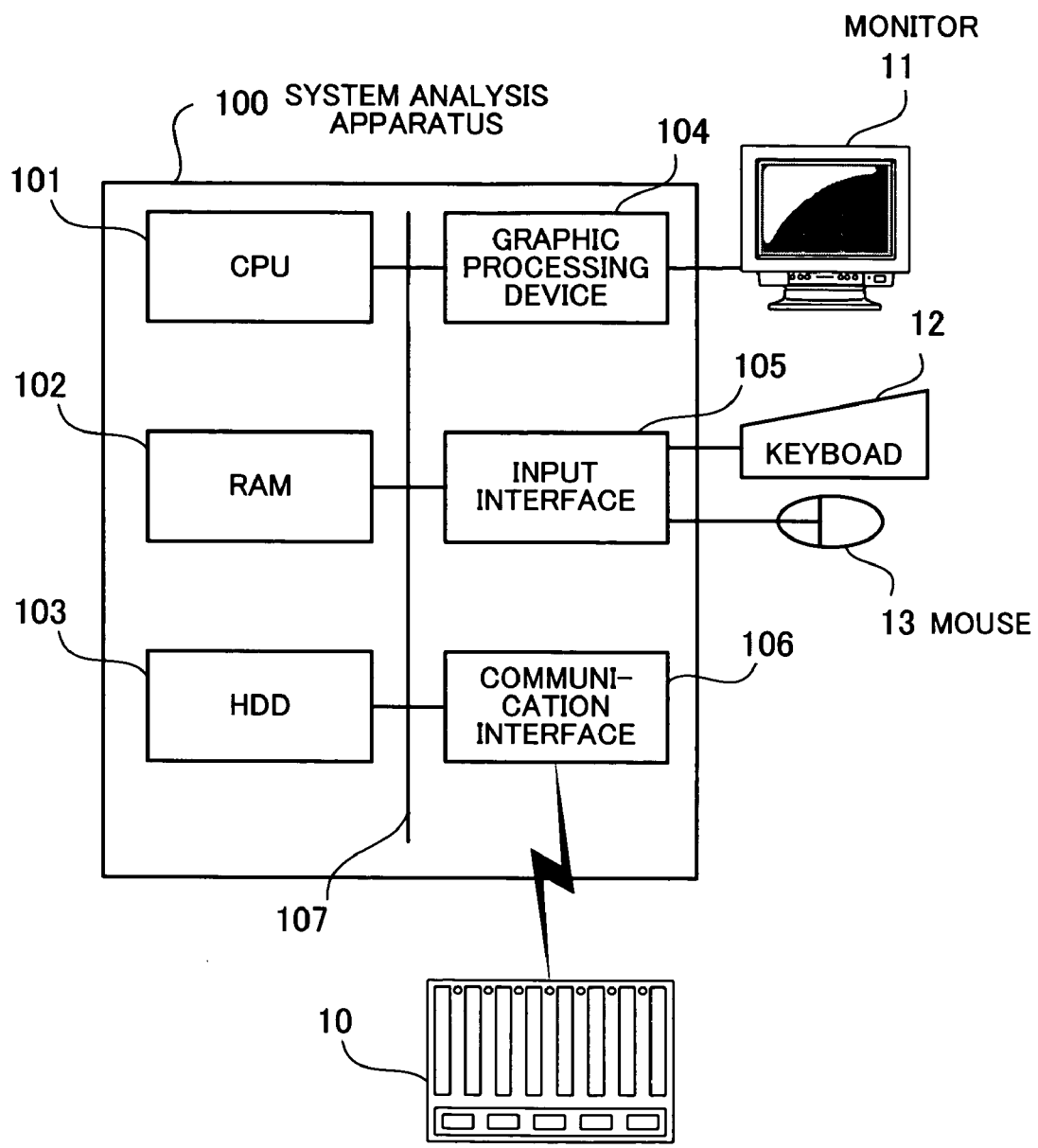
FIG. 3 is a diagram illustrating an example of a hardware construction of a system analysis apparatus.

FIG. 3 is a diagram illustrating an example of a hardware construction of the system analysis apparatus used in the first embodiment. The entire system analysis apparatus 100 is controlled by a CPU (central processing unit) 101, to which a RAM (random access memory) 102, an HDD (hard disk drive) 103, a graphic processing device 104, an input interface 105, and a communication interface 106 are connected through a bus 107.

The RAM 102 temporarily stores at least a portion of an OS (operating system) program and application programs which are executed by the CPU 101, as well as various types of data which are necessary for the CPU 101 to perform processing. The HDD 103 stores the OS program and the application programs.

A monitor 11 is connected to the graphic processing device 104, which makes the monitor 11 display an image on a screen in accordance with an instruction from the CPU 101. A keyboard 12 and a mouse 13 are connected to the input interface 105, which transmits signals transmitted from the keyboard 12 and the mouse 13, to the CPU 101 through the bus 107.

The communication interface 106 is connected to the switch 10, and provided for exchanging data with other computers through the switch 10.

By using the above hardware construction, it is possible to realize the processing functions of the embodiments of the present invention. In addition, each of the clients 21, 22, and 23, the web server 31, the application server 32, and the DB server 33 can also be realized by using a similar hardware construction.

Figure 4:
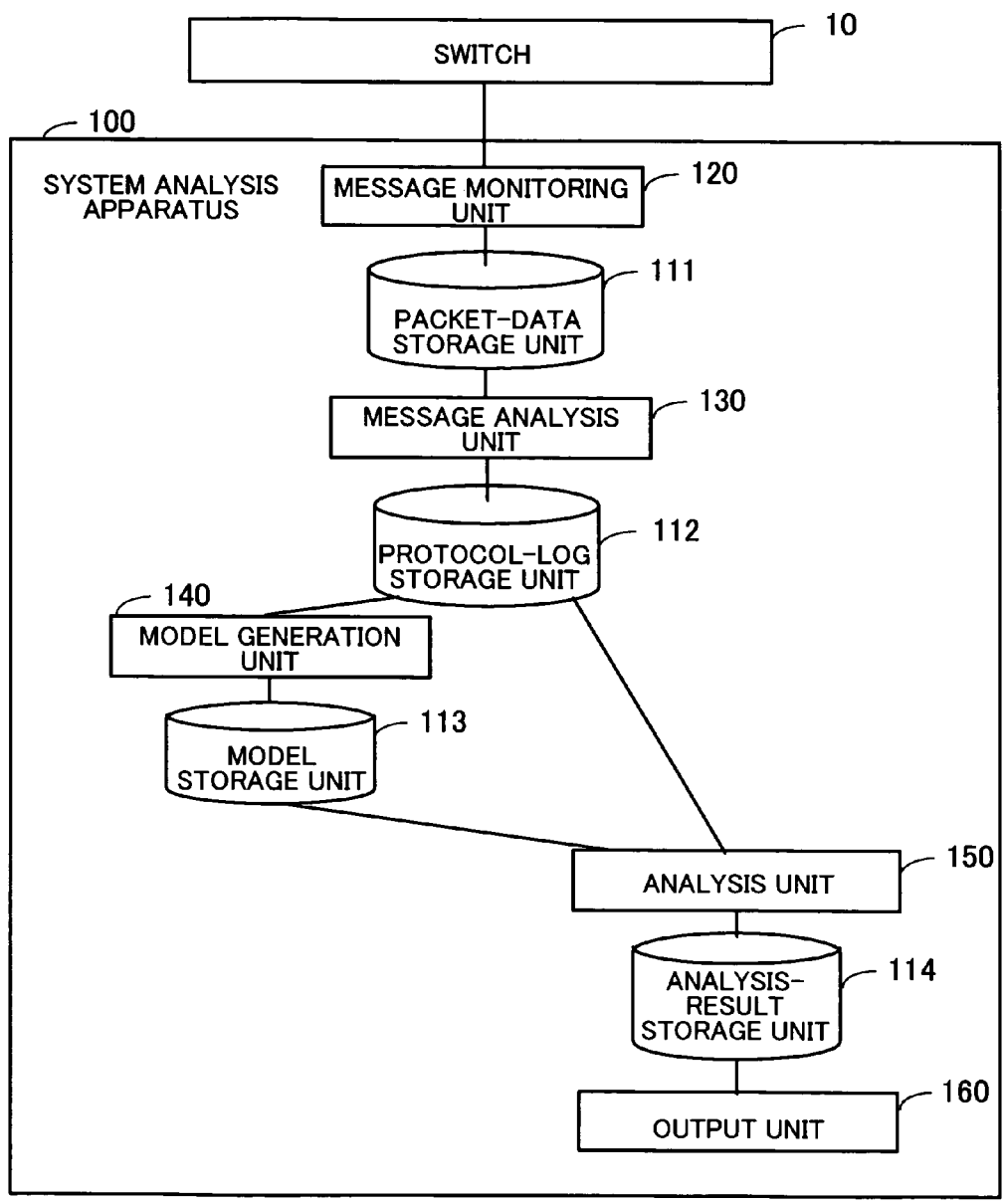
FIG. 4 is a block diagram illustrating functions of the system analysis apparatus.

FIG. 4 is a block diagram illustrating functions of the system analysis apparatus. The system analysis apparatus 100 comprises a packet-data storage unit 111, a protocol-log storage unit 112, a model storage unit 113, an analysis-result storage unit 114, a message monitoring unit 120, a message analysis unit 130, a model generation unit 140, an analysis unit 150, and an output unit 160.

The packet-data storage unit 111 is a storage device for storing packets constituting messages which are transmitted or received through the switch 10, the protocol-log storage unit 112 is a storage device for storing information related to messages acquired by analyzing packets, the model storage unit 113 is a storage device for storing as a transaction model a list of messages which are transmitted or received until a transaction is completed, and the analysis-result storage unit 114 is a storage device for storing results of analysis of messages.

The message monitoring unit 120 monitors the messages which are transmitted or received through the switch 10, and stores in the packet-data storage unit 111 packets which constitute the messages.

The message analysis unit 130 analyzes the contents of the packets stored in the packet-data storage unit 111, and stores in the protocol-log storage unit 112 the results of the analysis of the messages.

The model generation unit 140 generates a transaction model based on information stored in the protocol-log storage unit 112, and stores the transaction model in the model storage unit 113.

The analysis unit 150 compares the information stored in the protocol-log storage unit 112 with the transaction model stored in the model storage unit 113, and analyzes statistical information for each transaction such as the processing time of each transaction. Then, the analysis unit 150 stores the result of the analysis in the analysis-result storage unit 114.

The output unit 160 outputs to the monitor 11 or the like the result of the analysis stored in the analysis-result storage unit 114, where the result of the analysis is represented in the form of a graph or the like.

The system analysis apparatus 100 having the above construction performs processing for system analysis as explained below.

Figure 5:
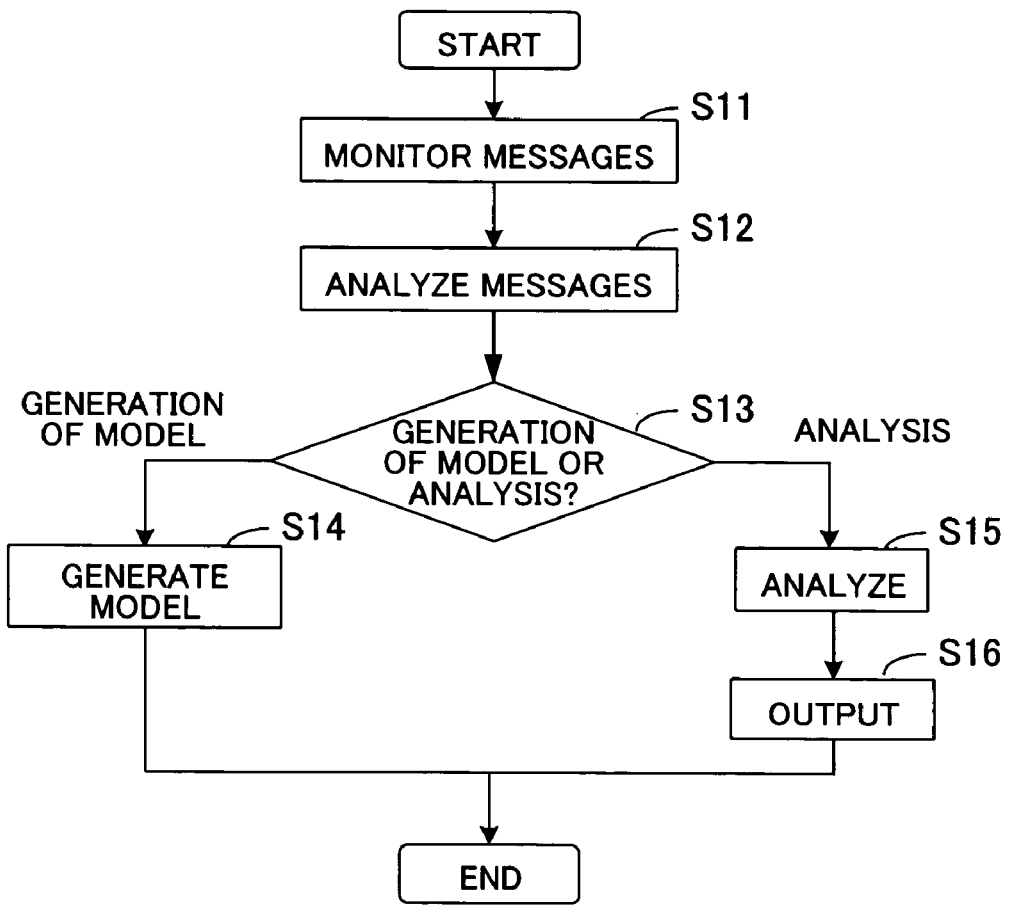
FIG. 5 is a flow diagram indicating a sequence of processing for analyzing the system.

FIG. 5 is a flow diagram indicating a sequence of processing for analyzing the system. The processing illustrated in FIG. 5 is explained below step by step.

[Step S11] The message monitoring unit 120 monitors messages flowing through the switch 10, and stores the messages in the packet-data storage unit 111.

[Step S12] The message analysis unit 130 analyzes the messages stored in the packet-data storage unit 111.

[Step S13] Thereafter, the model generation unit 140 determines whether or not an instruction for generation of a model is inputted, and the analysis unit 150 determines whether or not an instruction for analysis is inputted. The instruction for generation of a model and the instruction for analysis are inputted, for example, by manipulation input by an administrator of the system analysis apparatus 100 using the keyboard 12 or the like. When an instruction for generation of a model is inputted, the operation goes to step S14. When an instruction for analysis is inputted, the operation goes to step S15.

[Step S14] The model generation unit 140 refers to information stored in the protocol-log storage unit 112, generates a transaction model, and stores the generated transaction model in the model storage unit 113. Thereafter, the processing of FIG. 5 is completed.

[Step S15] The analysis unit 150 refers to the information stored in the protocol-log storage unit 112 and a transaction model stored in the model storage unit 113, and analyzes information on a transaction which is currently executed. Then, the analysis unit 150 stores the result of the analysis in the analysis-result storage unit 114.

[Step S16] The output unit 160 outputs to the monitor 11 statistical information or the like based on the result of the analysis stored in the analysis-result storage unit 114. Thereafter, the processing of FIG. 5 is completed.

Thus, the system analysis is performed along the above sequence. Hereinbelow, processing performed in each of the steps in FIG. 5 is explained in detail.

First, the processing for monitoring messages is explained below.

Figure 6:
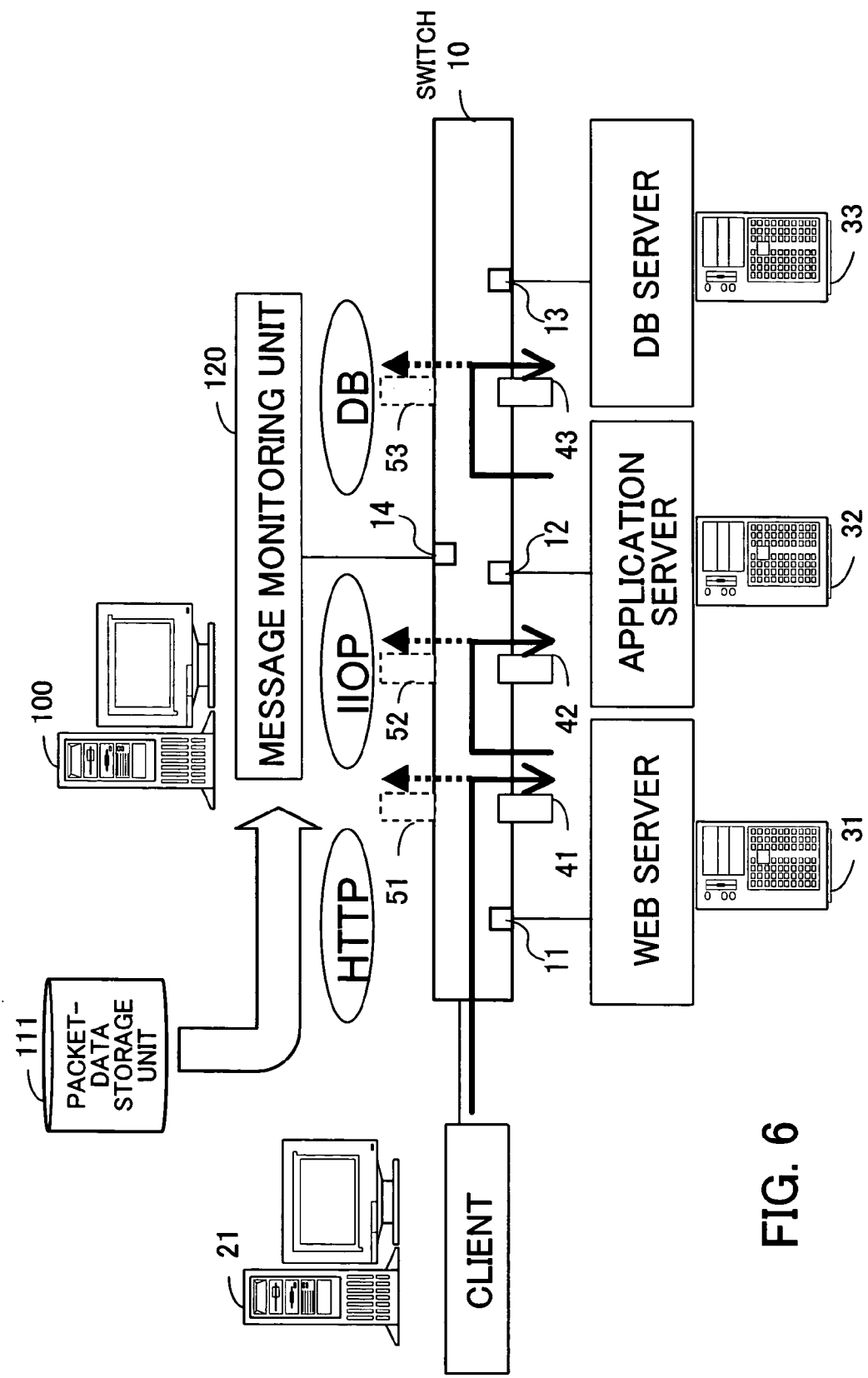
FIG. 6 is a conceptual diagram illustrating a configuration in which messages are monitored.

FIG. 6 is a conceptual diagram illustrating a configuration in which messages are monitored. In this example, the web server 31, the application server 32, and the DB server 33 are objects to be monitored. The web server 31, the application server 32, and the DB server 33 are respectively connected to the ports 11, 12, and 13, and the system analysis apparatus 100 is connected to the port 14 of the switch 10.

The switch 10 has a function of mirroring data which passes through the switch 10, where the mirroring function is a function of outputting data which is identical to data outputted from a certain port, from another port.

In the example of FIG. 6, the port 14, to which the system analysis apparatus 100 is connected, is designated as a port from which copies of data outputted from the ports 11, 12, and 13 are outputted. Therefore, packets addressed to the servers are inputted to the system analysis apparatus 100 as well as to the respective servers.

For example, assume that the web server 31, the application server 32, and the DB server 33 cooperate to provide a service in response to a request from the client 21. In this case, first, a packet 41 (for example, an HTTP packet) is transmitted from the client 21 to the web server 31. At this time, a packet 51 having identical contents to the packet 41 is inputted into the system analysis apparatus 100. Next, when a packet 42 (for example, an IIOP (Internet Inter-ORB Protocol) packet) is transmitted from the web server 31 to the application server 32, a packet 52 having identical contents to the packet 42 is inputted into the system analysis apparatus 100. Further, when a packet 43 (for example, a packet for database access) is transmitted from the application server 32 to the DB server 33, a packet 53 having identical contents to the packet 43 is inputted into the system analysis apparatus 100.

The message monitoring unit 120 directly connected to the switch 10 acquires the packets 51, 52, and 53 inputted into the system analysis apparatus 100, and stores the acquired packets in the packet-data storage unit 111. Specifically, the message monitoring unit 120 captures the packets 51, 52, and 53 transferred from the switch 10, and stores the captured packets in the packet-data storage unit 111 together with the times of reception.

Alternatively, the message monitoring unit 120 may send the captured packets 51, 52, and 53 to the message analysis unit 130 without storing the captured packets when the packets are captured. Further, the message monitoring unit 120 may capture only the packets which are necessary in the message monitoring unit 120. Furthermore, the message monitoring unit 120 may select in the switch 10 only the data which are necessary for mirroring.

Figure 7:
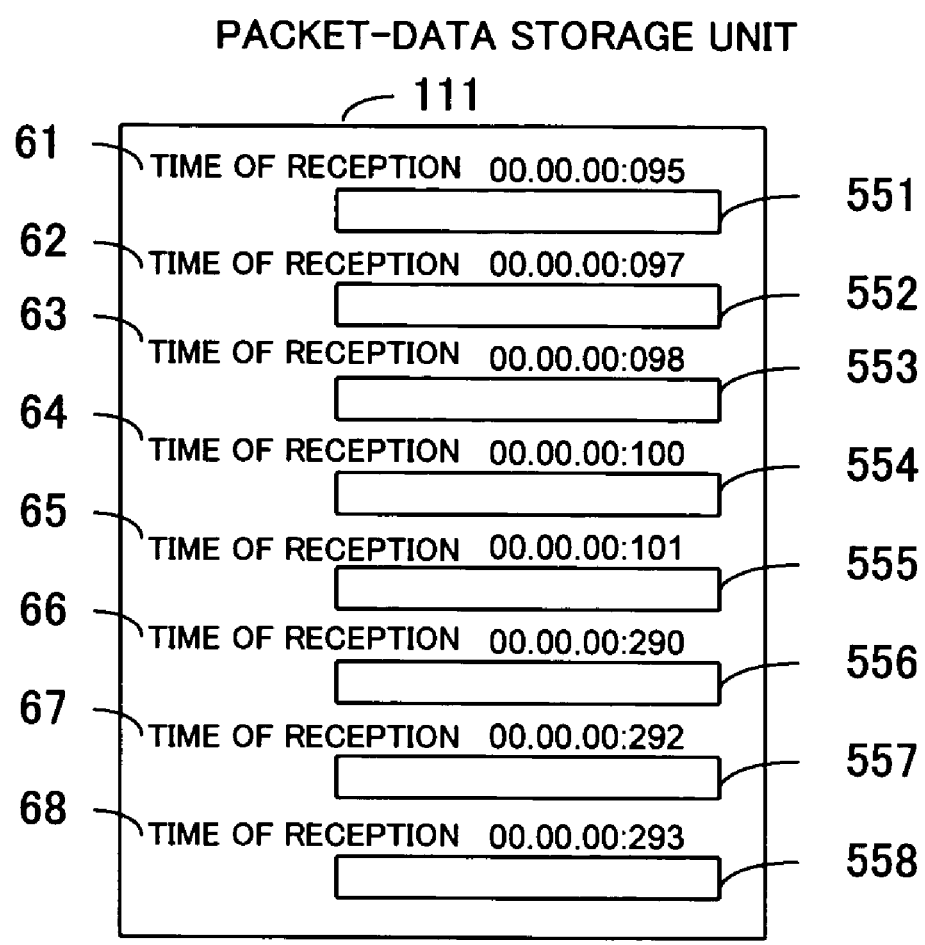
FIG. 7 is a diagram illustrating an example of a data structure in a packet-data storage unit.

FIG. 7 is a diagram illustrating an example of a data structure in the packet-data storage unit. In the packet-data storage unit 111, a plurality of packets 551 to 558 and time information items 61 to 68 respectively indicating the times of reception of the packets 551 to 558 are stored.

Figure 8:
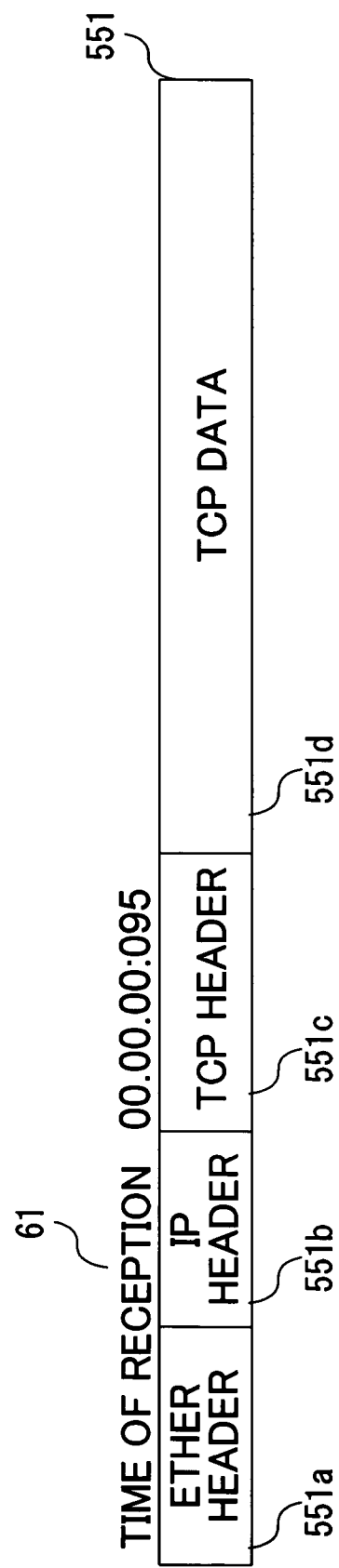
FIG. 8 is a diagram illustrating information contained in a packet.

FIG. 8 is a diagram illustrating information contained in a packet. The packet 551 which is stored in association with the time information item 61 is constituted by an Ether header 551*a*, an IP header 551*b*, a TCP header 551*c*, and TCP data 551*d*.

Figure 9:
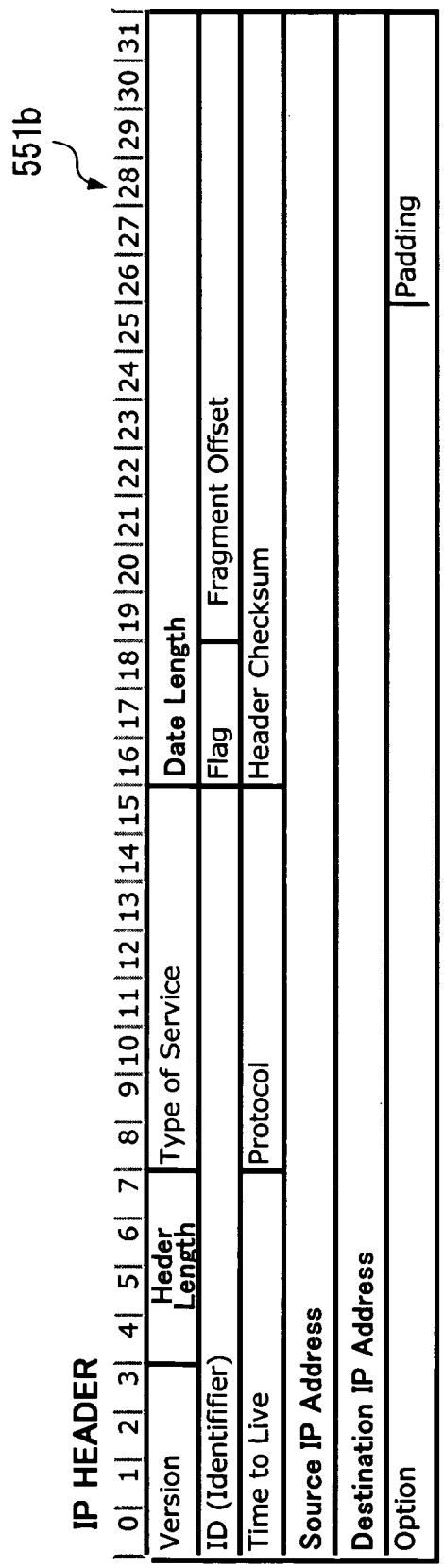
FIG. 9 is a diagram illustrating details of an IP header.

FIG. 9 is a diagram illustrating details of the IP header. The IP header 551*b* is constituted by version information, a header length, a type of service, a data length, an identifier (ID), a flag, a fragment offset, a time to live, a protocol, a header checksum, a source IP address, a destination IP address, an option, and a padding.

Figure 10:
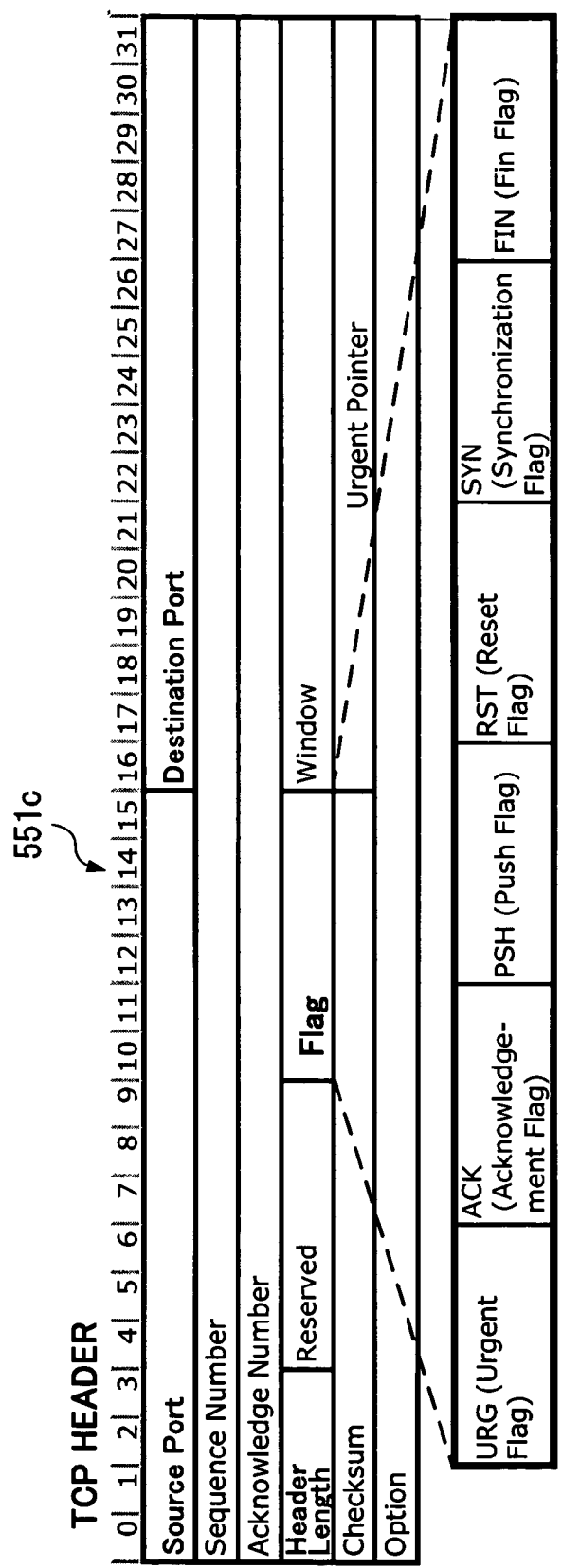
FIG. 10 is a diagram illustrating details of a TCP header.

FIG. 10 is a diagram illustrating details of the TCP header. The TCP header 551*c* is constituted by a source port, a destination port, a source sequence number ("Sequence Number"), a response acknowledge number ("Acknowledge Number"), a header length, a reserved area ("Reserved"), a flag, a window, a checksum, an urgent pointer, and an option, where the flag is constituted by an urgent flag (URG), an acknowledge flag (ACK), a push flag (PSH), a reset flag (RST), a synchronization flag (SYN), and a fin flag (FIN).

The packets acquired by the message monitoring unit 120 are analyzed by the message analysis unit 130.

Figure 11:
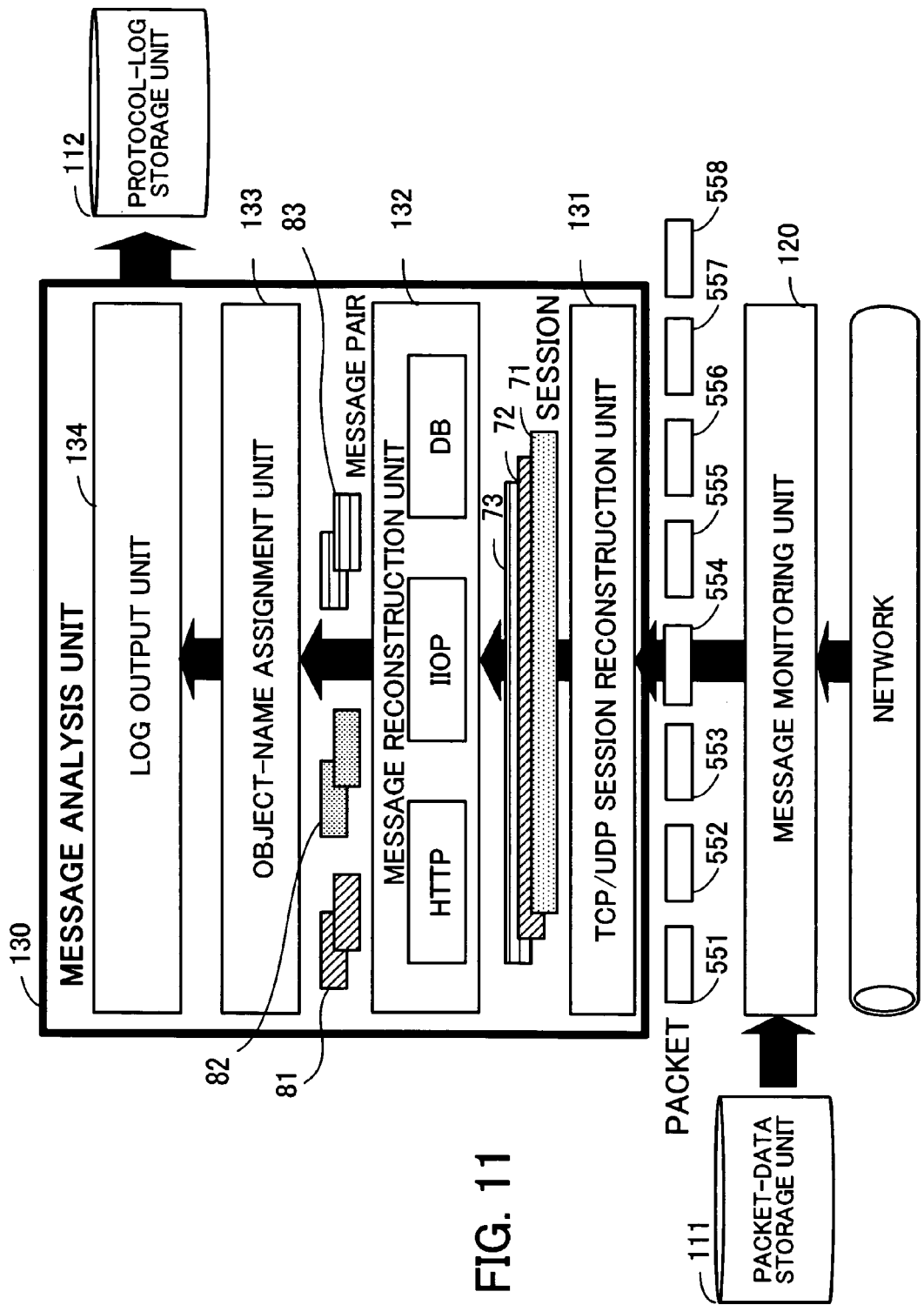
FIG. 11 is a block diagram illustrating functions of a message analysis unit.

FIG. 11 is a block diagram illustrating functions of the message analysis unit. The message analysis unit 130 comprises a TCP/UDP (User Datagram Protocol) session reconstruction unit 131, a message reconstruction unit 132, an object-name assignment unit 133, and a log output unit 134.

The TCP/UDP session reconstruction unit 131 sorts the packets 551 to 558 into the sessions 71 to 73 to which the packets 551 to 558 belong. The message reconstruction unit 132 extracts predetermined data from the packets 551 to 558 sorted into the sessions 71 to 73, and reconstructs pairs of messages 81 to 83. The object-name assignment unit 133 determines object names corresponding to the pairs of messages 81 to 83. The log output unit 134 outputs a processing result to the protocol-log storage unit 112.

When the packets 551 to 558 are inputted from the message monitoring unit 120 to the message analysis unit 130, processing is performed in the order of the TCP/UDP session reconstruction unit 131, the message reconstruction unit 132, the object-name assignment unit 133, and the log output unit 134. Each of the packets 551 to 558 transferred from the message monitoring unit 120 may be a packet stored in advance in the packet-data storage unit 111 or a packet detected by the message monitoring unit 120.

Hereinbelow, processing executed by each element of the message analysis unit 130 is explained in detail.

First, the packets 551 to 558 transferred to the message analysis unit 130 are inputted into the TCP/UDP session reconstruction unit 131, which sorts the inputted packets 551 to 558 into the sessions.

Specifically, the TCP/UDP session reconstruction unit 131 acquires the values of the source IP address and the destination IP address (as illustrated in FIG. 9) from the IP header 551b in the packet 551. Next, the TCP/UDP session reconstruction unit 131 acquires the values of the source port number and the destination port number from the TCP header 551c (as illustrated in FIG. 10). Then, the TCP/UDP session reconstruction unit 131 determines the set of the four values acquired as above to be an identifier. Alternatively, it is possible to assign a unique number as an identifier.

The TCP/UDP session reconstruction unit 131 generates identifiers for the respective packets 551 to 558, and recognizes that packets having identical identifiers belong to an identical session (i.e., sorts packets having identical identifiers into an identical session).

Next, in the case of TCP, the TCP/UDP session reconstruction unit 131 acquires the session status indicating, for example, "start," "establishment," or "disconnection" by reading the flag contained in the TCP header 551c (as illustrated in FIG. 10). For example, the TCP/UDP session reconstruction unit 131 recognizes a start of a session by detection of a packet in which the synchronization flag "SYN" is "1," and recognizes establishment of a session by detection of a response to the packet in which the acknowledgement flag "ACK" is "1." Then, transmission of data and return of a response in which the acknowledgement flag "ACK" is "1" are repeated in the state in which the session is established. Finally, the TCP/UDP session reconstruction unit 131 recognizes disconnection of the session by detection of a packet in which the fin flag "FIN" is "1."

In addition, the TCP/UDP session reconstruction unit 131 acquires the data length and the header lengths contained in the IP header 551b and the TCP header 551c, and obtains the length of the data portion (data size) by subtracting the header lengths from the data length.

Further, when the IP addresses of the respective servers are provided to the TCP/UDP session reconstruction unit 131 in advance, it is possible to determine the directions of respective packets based on the combinations of IP addresses.

Furthermore, the TCP/UDP session reconstruction unit 131 reads the source port number when a server address is contained as the transmission address in the IP header of a packet, or the destination port number when a server address is contained as the destination address in the IP header of a packet. Then, the TCP/UDP session reconstruction unit 131 can determine the service to which the session is related, by using as an identifier the port number which is read as above.

For example, when the server-side port is No. 80, the TCP/UDP session reconstruction unit 131 determines that the packet is for (HTTP) communication with the web server.

Figure 12:
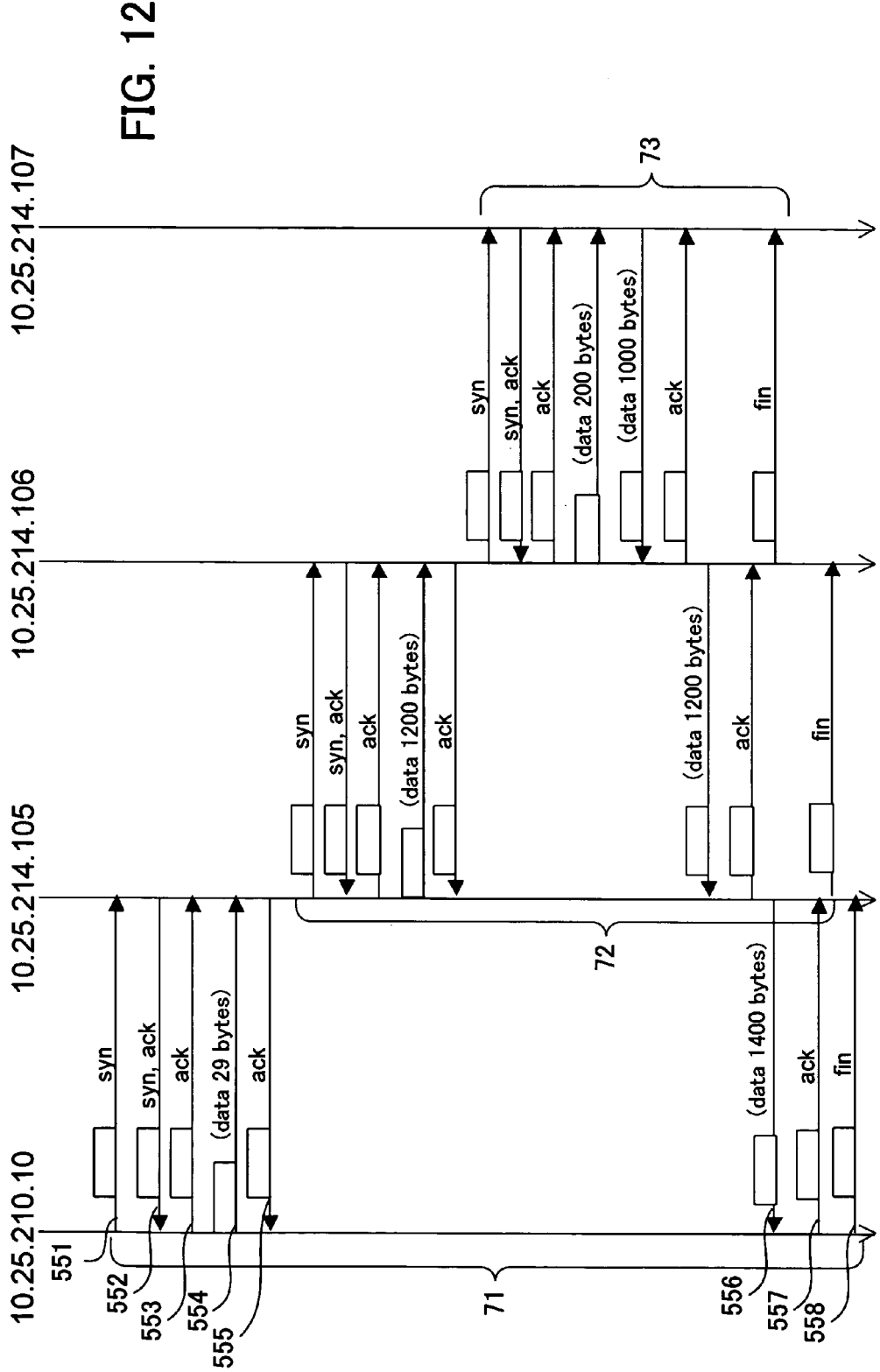
FIG. 12 is a diagram illustrating an example of a reconstructed session.

FIG. 12 is a diagram illustrating an example of a reconstructed session. The TCP/UDP session reconstruction unit 131 reconstructs the TCP sessions 71 to 73 from the packets 551 to 558. In FIG. 12, the vertical lines correspond to the progress of time, and the time progresses from the top to the bottom of FIG. 12.

The numbers indicated above the vertical lines in FIG. 12 are IP addresses of the respective devices. The packets are sorted based on a pair of IP addresses contained in each packet. In FIG. 12, a sequence of transmission of packets (as a time series) is indicated with flags or data sizes extracted from the respective packets.

As indicated above, the packets sorted into the sessions 71 to 73 are passed to the message reconstruction unit 132.

The message reconstruction unit 132 reconstructs messages from the data portions of the packets sorted into the sessions 71 to 73. The message reconstruction unit 132 extracts data portions from a group of packets transmitted in each of the sessions 71 to 73, and arranges the extracted data portions in a certain order. The message reconstruction unit 132 acquires the message size in accordance with a protocol format, and reconstructs messages from the data portions arranged above. At this time, when a message is divided into a plurality of pieces, and the plurality of pieces of the message are transmitted as a plurality of data portions of a plurality of packets, the message reconstruction unit 132 can reconstruct the message by connecting the plurality of data portions. Alternatively, when a plurality of messages connected to each other are transmitted by a single packet, the message reconstruction unit 132 can cut out the plurality of messages from a single data portion of the single packet. In addition, it is possible to assign numbers which are unique in each session, to the messages.

Figure 13:
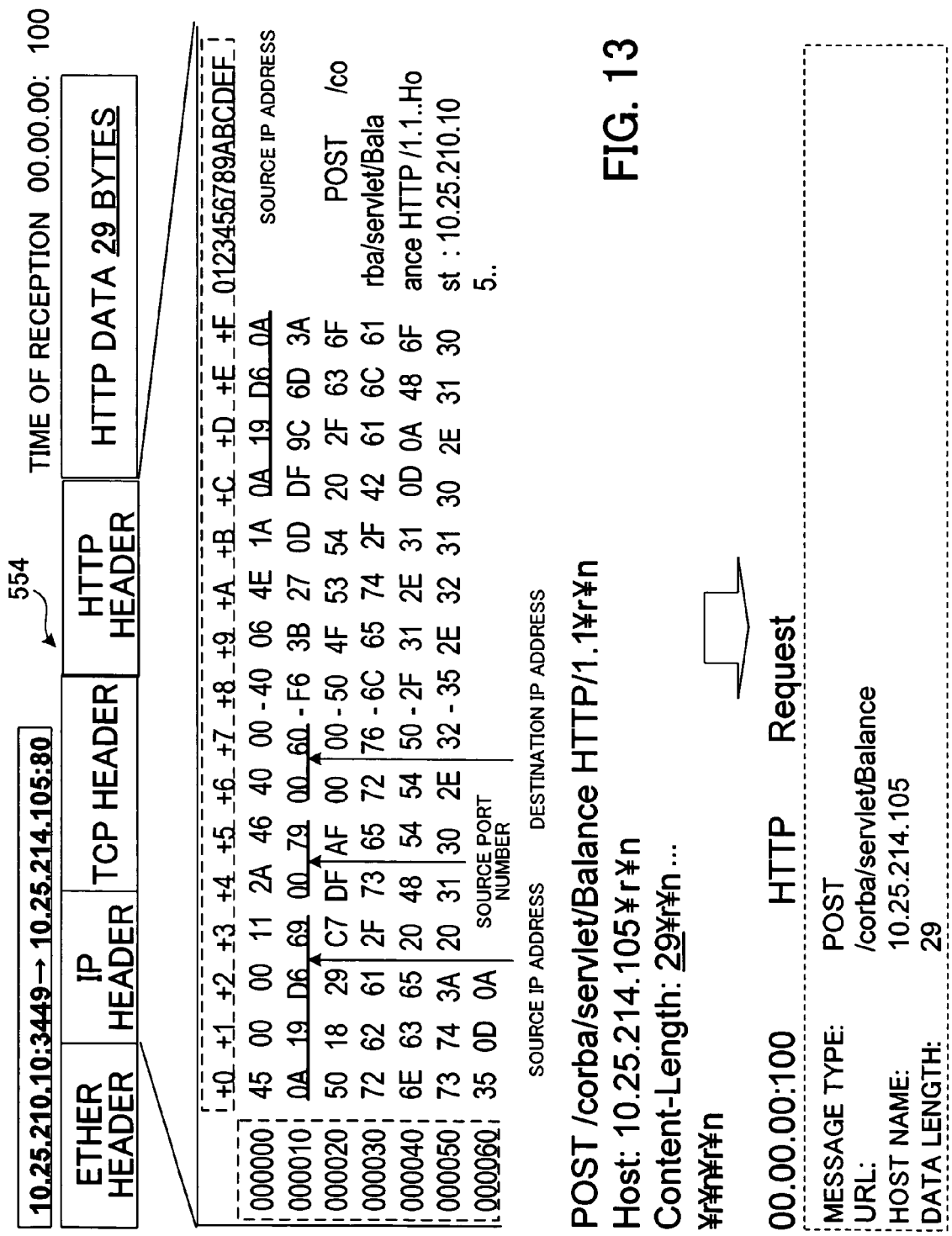
FIG. 13 is a diagram illustrating an example of reconstruction of a message.

FIG. 13 is a diagram illustrating an example of reconstruction of a message. Specifically, FIG. 13 shows an example of analysis of a message on the session 71, where the message has an identifier constituted by the source IP address "10.25.210.10," the destination IP address "10.25.214.105," the source port number "3449," and the destination port number "80."

Since the destination port number corresponding to the session to which the packet 554 belongs is "80," the message reconstruction unit 132 determines that the data portion of the packet 554 constitutes an HTTP request from the client 21 to the web server 31, and cuts out the data portion as a constituent of an HTTP message.

In the case of HTTP, the message reconstruction unit 132 searches the data for a specific combination of octets (0x0D0A0D0A=¥r¥n¥r¥n), and determines a portion of the data preceding the specific combination of octets to be a header portion (HTTP data). Next, when a data portion (HTTP data) exists, the message reconstruction unit 132 acquires the length of the data portion from the content-length field in the header portion, cuts out a message, and determines the time "00.00.00:100" of reception of the first packet 554 constituting the message to be the time of reception of the message. In addition, the message reconstruction unit 132 acquires the message type, a requested URL, and data of a response.

For example, the information acquired from an HTTP message includes the length of a header, the length of data, the type of the message, a URL, individual parameters, and the like. In addition, the information acquired from an IIOP message includes the length of a header, the length of data, the type of the message, the name of a method, individual parameters, and the like. Further, the information acquired from a DB message includes the length of a header, the length of data, the type of the message, an SQL (structured query language) sentence, parameters of the SQL sentence, and the like.

In the example of FIG. 13, "POST," followed by "/corba/servlet/Balance," is indicated at the top of the header of the HTTP request message. That is, the header of the HTTP request message indicates that the type of the message is "POST," and the URL indicating an object is "/corba/servlet/Balance." In addition, the value of the content-length field in the header of the HTTP request message is "29." This indicates that the data portion has a length of 29 bytes. Therefore, the message reconstruction unit 132 cuts out as a message 29 bytes following the end of the header.

Further, the message reconstruction unit 132 brings a request message to an object which mainly executes the request, into correspondence with a response message as a response to the request message, and calculates a time which elapsed until the response is received. For example, in the case of HTTP, the message reconstruction unit 132 brings a request message into correspondence with a response message which occurs immediately after the request message in the same session. In addition, the response time between a pair of a request message and a response message is determined by subtracting the time of reception of the request message from the time of reception of the response message. At this time, it is possible to assign a unique number to the pair of the corresponding messages.

Figure 14:
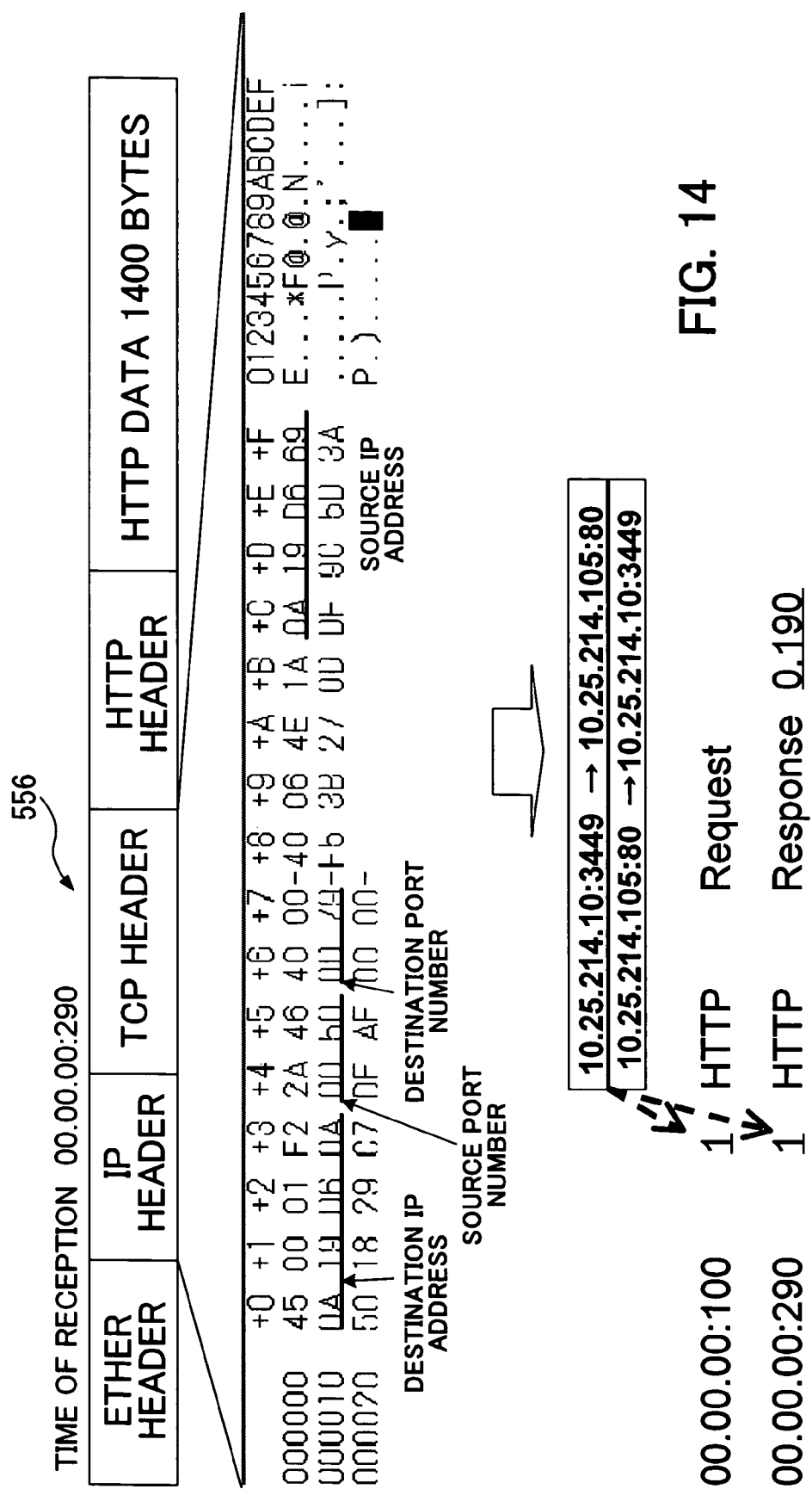
FIG. 14 is a diagram illustrating an example of assignment of a response message to a request.

FIG. 14 is a diagram illustrating an example of assignment of a response message to a request message. In the example of FIG. 14, an HTTP response message is brought into correspondence with an HTTP request message.

Since, in the message acquired from the packet 554 indicated in FIG. 13 and the message acquired from the packet 556 indicated in FIG. 14, the source and destination IP addresses are "10.25.214.105" and "10.25.210.10," and the source and the destination port numbers are "80" and "3449," the message reconstruction unit 132 determines that the message acquired from the packet 556 indicated in FIG. 14 is transmitted in succession to the message acquired from the packet 554 indicated in FIG. 13 in the same session as the message acquired from the packet 554. In addition, since the directions of the transmission of the above two messages are opposite, the message reconstruction unit 132 generates a pair of the messages (message pair) by associating the above messages with each other. Further, the message reconstruction unit 132 calculates the response time between the pair of messages, and assigns a common identification number "1" to the two messages.

Then, the above pair of messages are passed to the object-name assignment unit 133, which determines an object name corresponding to the pair of messages.

The object name may be changed according to the contents which are to be analyzed by a device at a later stage. In addition, it is possible to assign an identical object name to different messages, or more than one object name to a single message. Further, it is possible to assign all acquirable information as a provisional object name to each message, and determine the object name by another device at a later stage.

For example, it is possible to assign to a pair of HTTP messages a URL as an object name. This is because the URL contains information for associating a message with a process to be executed.

In addition, it is possible to assign to a pair of IIOP messages a method name as an object name. This is because the method name in IIOP indicates a single process on a server.

Further, it is possible to assign to a pair of DB a combination of an operator type in SQL and a name of a database table messages as an object name, where the operator type in SQL is, for example, "Select," "Insert," "Update," or "Fetch." The purpose of this assignment is to explicitly indicate the amounts of processing and processing times, where the amounts of processing and processing times are different according to the size of the database table to be manipulated, whether or not the processing includes writing by manipulation of a database, and other conditions.

Figure 15:
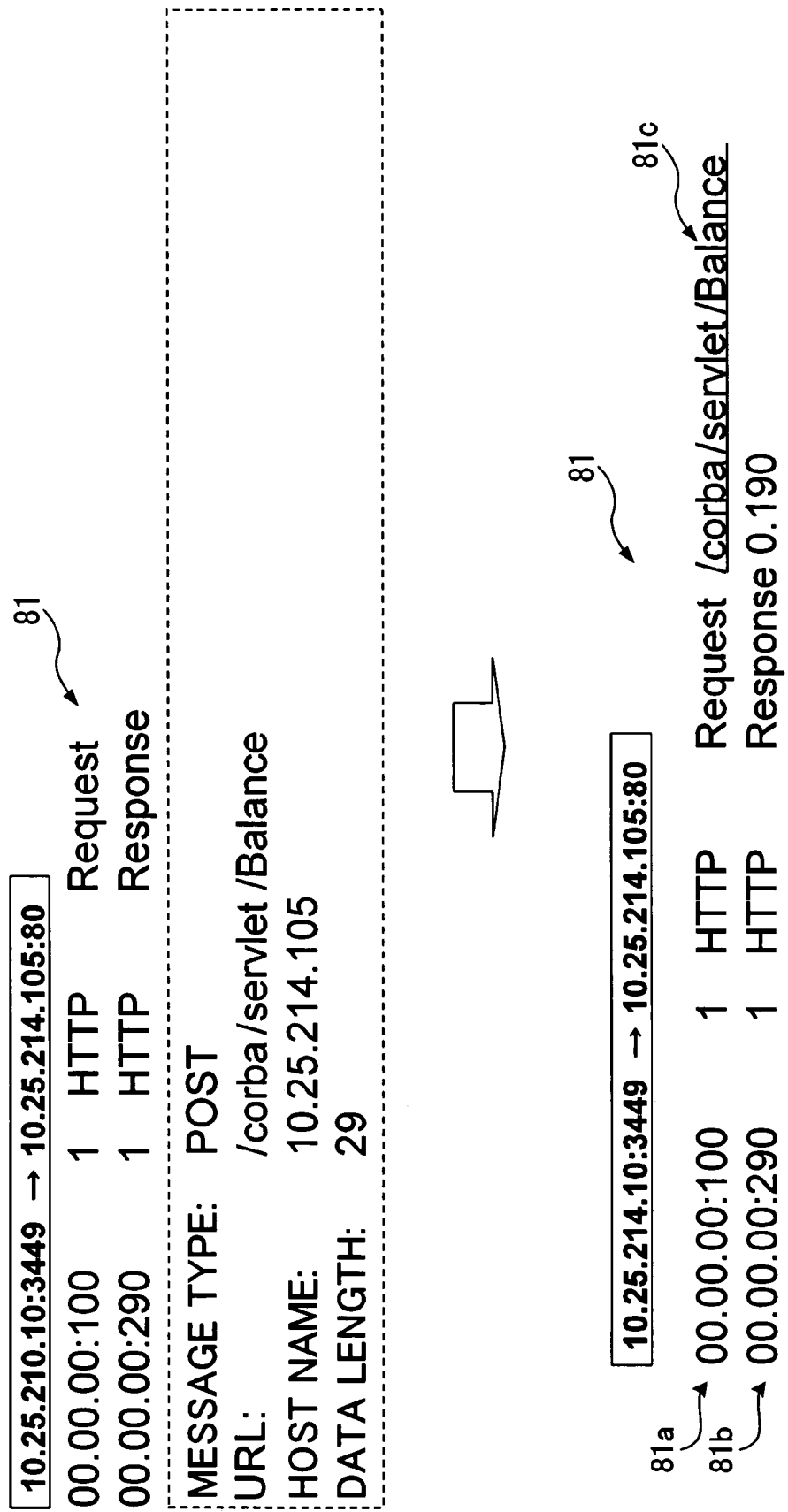
FIG. 15 is a diagram illustrating an example of assignment of an object name.

FIG. 15 is a diagram illustrating an example of assignment of an object name and a result of analysis of a message. In this example, the URL designated by the request message is assigned as an object name 81c to the pair 81 of the messages associated with each other as illustrated in FIG. 14. The message 81a is the HTTP request message reconstructed from the packet 554 illustrated in FIG. 13, the message 81b is the HTTP response message reconstructed from the packet 556 illustrated in FIG. 14, and the pair 81 is produced by associating the above messages 81a and 81b with each other.

Figure 16:
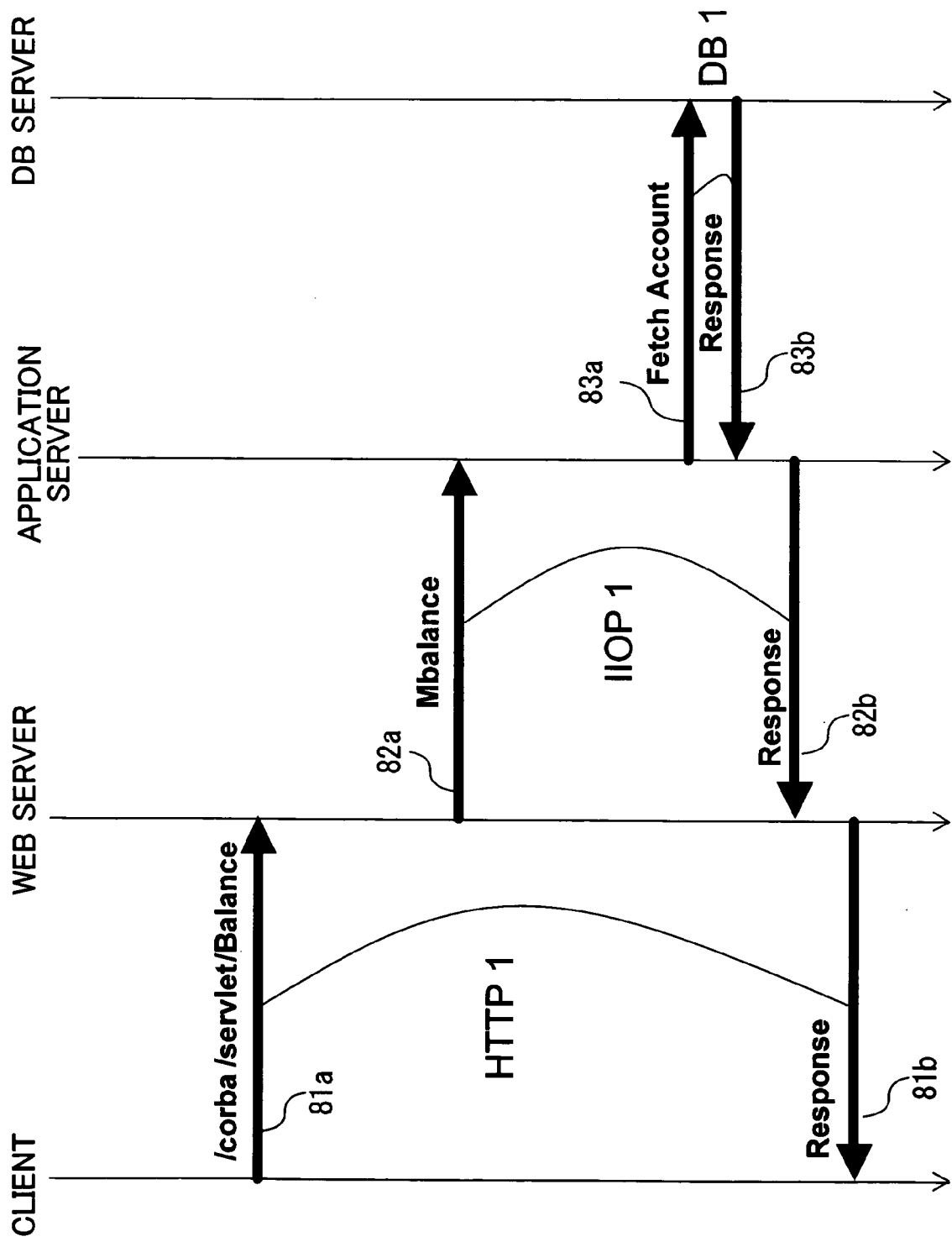
FIG. 16 is a diagram illustrating assignment of object names to respective message constituting a transaction and results of analysis of the messages.

FIG. 16 is a diagram illustrating assignment of object names to respective message constituting a transaction and results of analysis of the messages. In this example, messages in accordance with other protocols such as IIOP and DB are also reconstructed as well as the messages in accordance with the HTTP protocol, and object names are also assigned to such messages.

Therefore, the HTTP messages 81a and 81b (having the identification number "1" in the HTTP session) which are paired as explained before with reference to FIGS. 13, 14, and 15, a pair of a request message 82a (to which the object name "Mbalance" is assigned) and a corresponding response message 82b which have the identification number "1" in the IIOP session, and a pair of a request message 83a (to which the object name "Fetch Account" is assigned) and a corresponding response message 83b which have the identification number "1" in the DB session are reconstructed. In FIG. 16, the above messages are indicated together with extracted object names in the form of a sequence diagram.

The object names corresponding to the messages 81a, 82a, and 83a are "/corba/servlet/Balance/," "Mbalance," and "Fetch Account," respectively.

The above pairs 81 to 83 of the messages to which the object names are assigned are inputted into the log output unit 134 (as illustrated in FIG. 11). Then, the log output unit 134 outputs as protocol-log record items of a protocol log the information obtained by the TCP/UDP session reconstruction unit 131, the message reconstruction unit 132, and the object-name assignment unit 133. At this time, the outputted protocol-log record items may be in either a text form or a binary form.

FIG. 17 is a diagram illustrating an example of the protocol log. In the example of FIG. 17, protocol-log record items 112a to 112f, which are outputted in the text form, are indicated. In the protocol-log record items 112a to 112f, a time of reception of the message (TIME), an identification number, the name of a protocol (PROTOCOL), a direction (REQUEST or RESPONSE), or an object name for a request or a response time for a response (OBJECT/RESPONSE TIME) are indicated for each message.

For example, in the case of an HTTP session, the time of reception "00.00.00.100," the identification number "1," and the object name "/corba/servlet/Balance/" are indicated in the protocol-log record item 112a, which corresponds to a request message, and the time of reception "00.00.00.290," the identification number "1," and the response time "0.190 (seconds)" are indicated in the protocol-log record item 112*f*, which corresponds to a response message.

Every time a service is provided to the clients 21, 22, and 23, the message analysis unit 130 successively stores the protocol-log record items 112*a* to 112*f* in the message analysis unit 130 as illustrated in FIG. 17. Thus, protocol-log record items related to a plurality of transactions are mixedly stored in the protocol-log storage unit 112.

FIG. 18 is a diagram illustrating an example of a protocol log stored in the protocol-log storage unit. In the protocol-log storage unit 112, protocol-log record items of messages related to different transactions are stored in chronological order. In the example of FIG. 18, protocol-log record items based on messages which occur during processing for "Balance Inquiry" transactions and "Deposit" transactions in internet banking are indicated.

When an instruction to generate a model is inputted into the model generation unit 140, the protocol-log record items stored in the protocol-log storage unit 112 are inputted into the model generation unit 140. Then, the model generation unit 140 generates a transaction model.

The model generation unit 140 acquires a transaction model based on the protocol-log record items stored in the protocol-log storage unit 112. In the protocol-log record items as illustrated in FIG. 18, messages in accordance with the HTTP, IIOP, and DB protocols are complexly mixed, and a request message and a response message corresponding to the request message in accordance with each protocol have an identical identification number which is generated by the message reconstruction unit 132.

In consideration of the above situation, according to the first embodiment, the following selection criterion is adopted in the model generation unit 140, where the selection criterion is based on the certainty of existence of caller-called relationships between processes. That is, a model is obtained by extracting only a portion in which the time span (from a client's request to a response) of each transaction does not overlap with the time span of another transaction, i.e., only a nonmultiple portion (with the multiplicity of "1"). When a transaction is nonmultiple, caller-called relationships certainly exist between processes within the time span of the nonmultiple transaction. In other words, the certainty of existence of caller-called relationships between processes within the time span of the nonmultiple transaction is high.

In order to extract only a nonmultiple portion, first, the model generation unit 140 detects a pair of a request and a response which conform to the HTTP protocol and have an identical identification number, and then checks whether or not an HTTP message having another identification number exists between the pair of messages conforming to the HTTP protocol. When no HTTP message having another identification number exists, the model generation unit 140 selects the pair of the request and the response conforming to the HTTP protocol and all requests between the pair. That is, a nonmultiple transaction which does not have a processing time span overlapping with a processing time span of another transaction is extracted.

Details of the processing are as follows.

Figure 19:
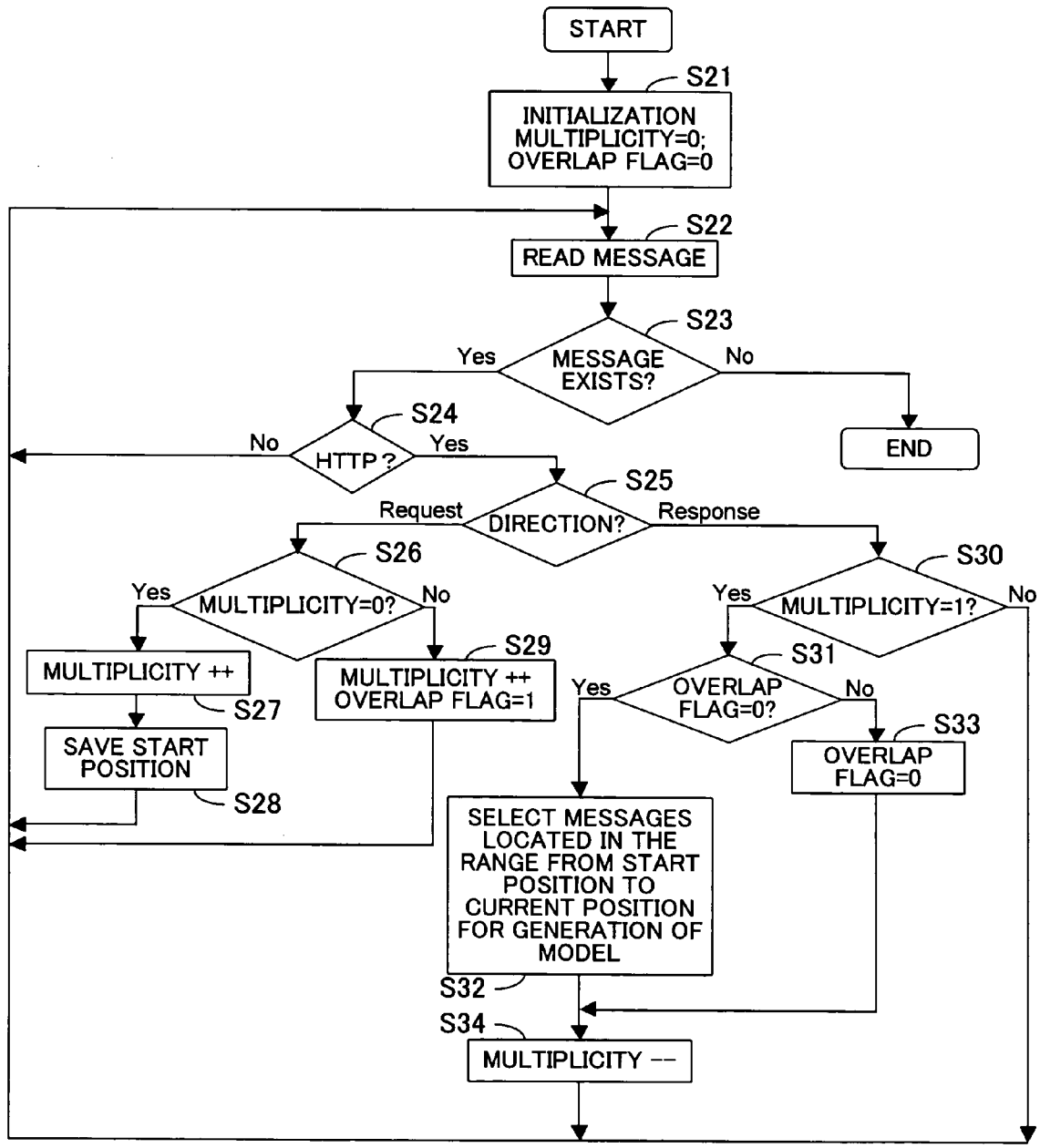
FIG. 19 is a flow diagram indicating a sequence of processing for generating a transaction model.

FIG. 19 is a flow diagram indicating a sequence of processing for generating a transaction model. The processing illustrated in FIG. 19 is explained below step by step.

[Step S21] The model generation unit 140 initializes parameters. Specifically, the multiplicity and an overlap flag are set to zero.

[Step S22] The model generation unit 140 reads in a message from the protocol-log storage unit 112.

[Step S23] The model generation unit 140 determines whether or not a message exists. When yes is determined, the operation goes to step S24. When no is determined, the processing of FIG. 19 is completed.

[Step S24] The model generation unit 140 determines whether or not the message read in in step S22 is in accordance with the HTTP protocol. When yes is determined, the operation goes to step S25. When no is determined, the operation goes to step S22.

[Step S25] The model generation unit 140 determines the direction of the message (i.e., whether the message is a request or a response). When the message is a request, the operation goes to step S26. When the message is response, the operation goes to step S30.

[Step S26] The model generation unit 140 determines whether or not the multiplicity is zero. When yes is determined, the operation goes to step S27. When no is determined, the operation goes to step S29.

[Step S27] The model generation unit 140 increments the multiplicity by one.

[Step S28] The model generation unit 140 saves a start position. Specifically, the model generation unit 140 stores information which specifies the position of the processed message (e.g., a pointer or the like which points to a corresponding protocol-log record item). Thereafter, the operation goes to step S22.

[Step S29] The model generation unit 140 increments the multiplicity by one, and sets the value of the overlap flag to one. Thereafter, the operation goes to step S22.

[Step S30] The model generation unit 140 determines whether or not the multiplicity is one. When yes is determined, the operation goes to step S31. When no is determined, the operation goes to step S22.

[Step S31] The model generation unit 140 determines whether or not the overlap flag is zero. When yes is determined, the operation goes to step S32. When the overlap flag is one, the operation goes to step S33.

[Step S32] The model generation unit 140 selects messages located in the range from the start position to the current position, as messages for generation of a model. Thereafter, the operation goes to step S34.

[Step S33] The model generation unit 140 sets the overlap flag to zero.

[Step S34] The model generation unit 140 decrements the multiplicity by one. Thereafter, the operation goes to step S22.

As explained above, it is possible to specify messages constituting a transaction which does not overlap with another transaction, and select the specified messages as messages for generation of a model.

Figure 20:
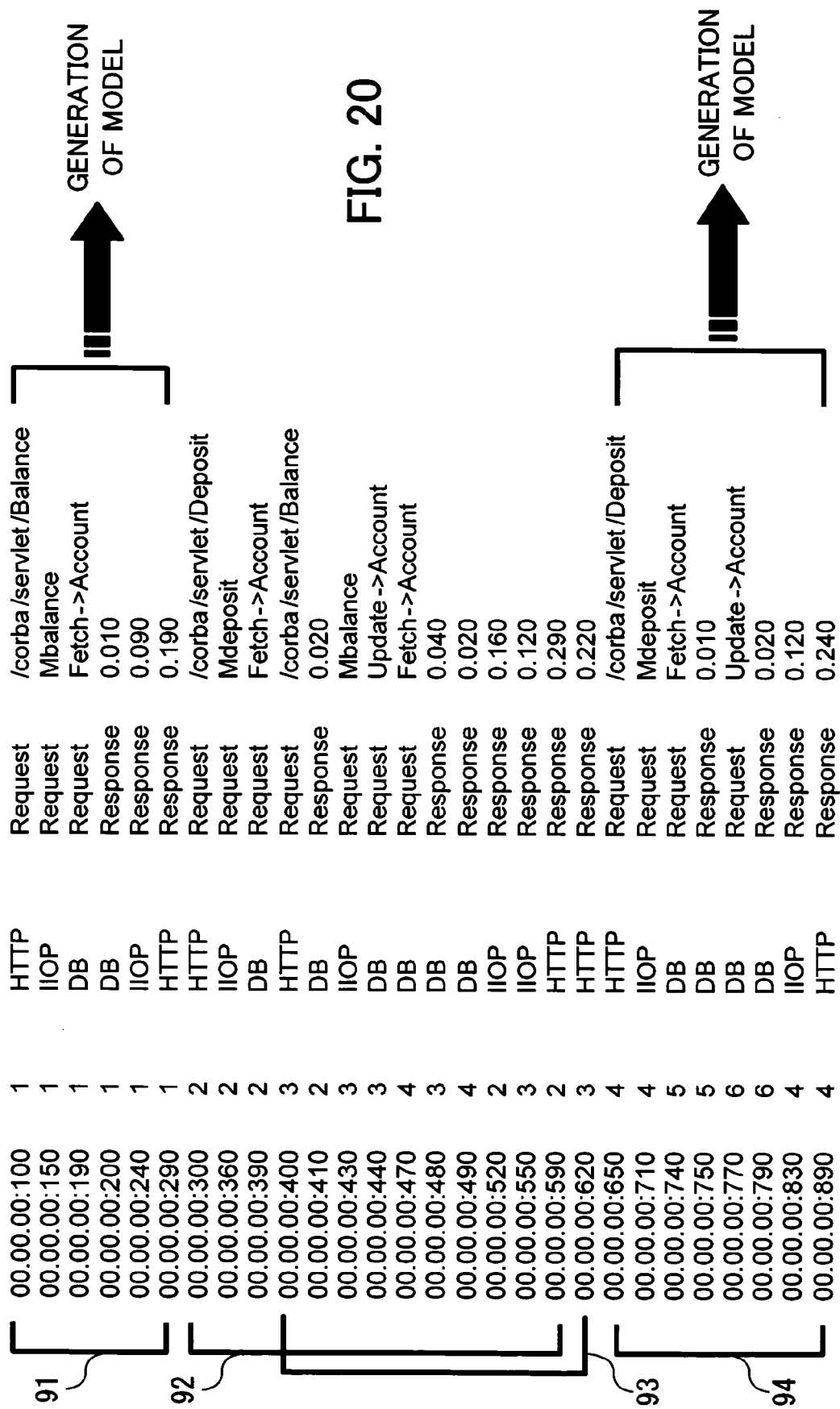
FIG. 20 is a diagram illustrating messages selected for generation of a model.

FIG. 20 is a diagram illustrating messages selected for generation of a model. In FIG. 20, sets of messages extracted from the protocol log as illustrated in FIG. 18 for generation of a model are indicated.

For example, when the protocol log of FIG. 20 is searched for a pair of an HTTP request and an HTTP response, four pairs 91, 92, 93, and 94 each of which is constituted by an HTTP request and an HTTP response are first detected, where the pairs 91, 92, 93, and 94 have the identification numbers "1," "2," "3," and "4," respectively. However, the HTTP request message having the identification number "3" exists between the HTTP request and response messages constituting the pair 92 having the identification number "2." Therefore, finally, only the pairs 91 and 94 respectively having the identification numbers "1" and "4" are extracted for use in generation of a model.

FIG. 21 is a diagram illustrating an example of generation of a model of a "Balance Inquiry" transaction. Specifically, FIG. 21 shows a transaction model 203 for "Balance Inquiry," which is generated from a set of messages (message set) 201 between and including the HTTP request and response messages constituting the pair 91 having the identification number "1" illustrated in FIG. 20.

The limiting condition imposed at this time is that processes at upper levels can call processes at lower levels, but the converse is not true. This limiting condition is typical of systems having a hierarchic structure. For example, the client 21 can call a process in the web server 31, the web server 31 can call a process in the application server 32, and the application server 32 can call a process in the DB server 33.

The model generation unit 140 analyzes the message set 201 in accordance with a predetermined limiting condition, and produces a processing sequence 202. Specifically, the model generation unit 140 analyzes the contents of the respective messages in the message set 201 in chronological order. Details of the respective messages in the message set 201 are as follows.

First, the client 21 requests the web server 31 to perform processing by sending a request message conforming to the HTTP protocol and having the identification number "1." In this case, the object processing corresponding to the object name "/corba/servlet/Balance/" is requested. Next, the web server 31 requests the application server 32 to execute an Mbalance method by sending a request message conforming to the IIOP protocol and having the identification number "1." Then, the application server 32 requests the DB server 33 to perform processing for manipulation called "Fetch Account" by sending a request message conforming to the DB protocol and having the identification number "1." Thereafter, response messages in accordance with the DB, IIOP, and HTTP protocols are transmitted from the DB server 33, application server 32, and the web server 31, respectively. Then, the processing sequence 202 is generated in accordance with the above messages.

The processing sequence 202 includes response times in the respective sessions. In the example of FIG. 21, the response times (i.e., the times elapsed from transmission of the requests until reception of the corresponding responses) in the DB server 33, the application server 32, and the web server 31 are 10, 90, and 190 milliseconds, respectively.

In addition, in the processing sequence 202 for "Balance Inquiry," the web server 31 performs processing of an /corba/servlet/Balance/ object, the application server 32 performs processing of an Mbalance object, and the DB server 33 performs processing of a "Fetch Account" object. Then, the model generation unit 140 calculates the processing times of the objects in the respective servers.

The processing time in the DB server 33 is the time elapsed after occurrence of a DB request until occurrence of a DB response (which is hereinafter referred to as a DB response time). In this example, the DB response time is 10 milliseconds. The processing time in the application server 32 is the remainder after subtraction of the DB response time from the time elapsed after occurrence of an IIOP request until occurrence of an IIOP response (which is hereinafter referred to as an IIOP response time). In this example, the IIOP response time is 80 (=90−10) milliseconds. The processing time in the web server 31 is the remainder after subtraction of the IIOP response time from the time elapsed after occurrence of an HTTP request until occurrence of an HTTP response (which is hereinafter referred to as an HTTP response time). In this example, the HTTP response time is 100 (=190−90) milliseconds.

Then, the model generation unit 140 generates a transaction model 203 in which caller-called relationships in the object processing and the processing times in the respective objects are defined.

Figure 22:
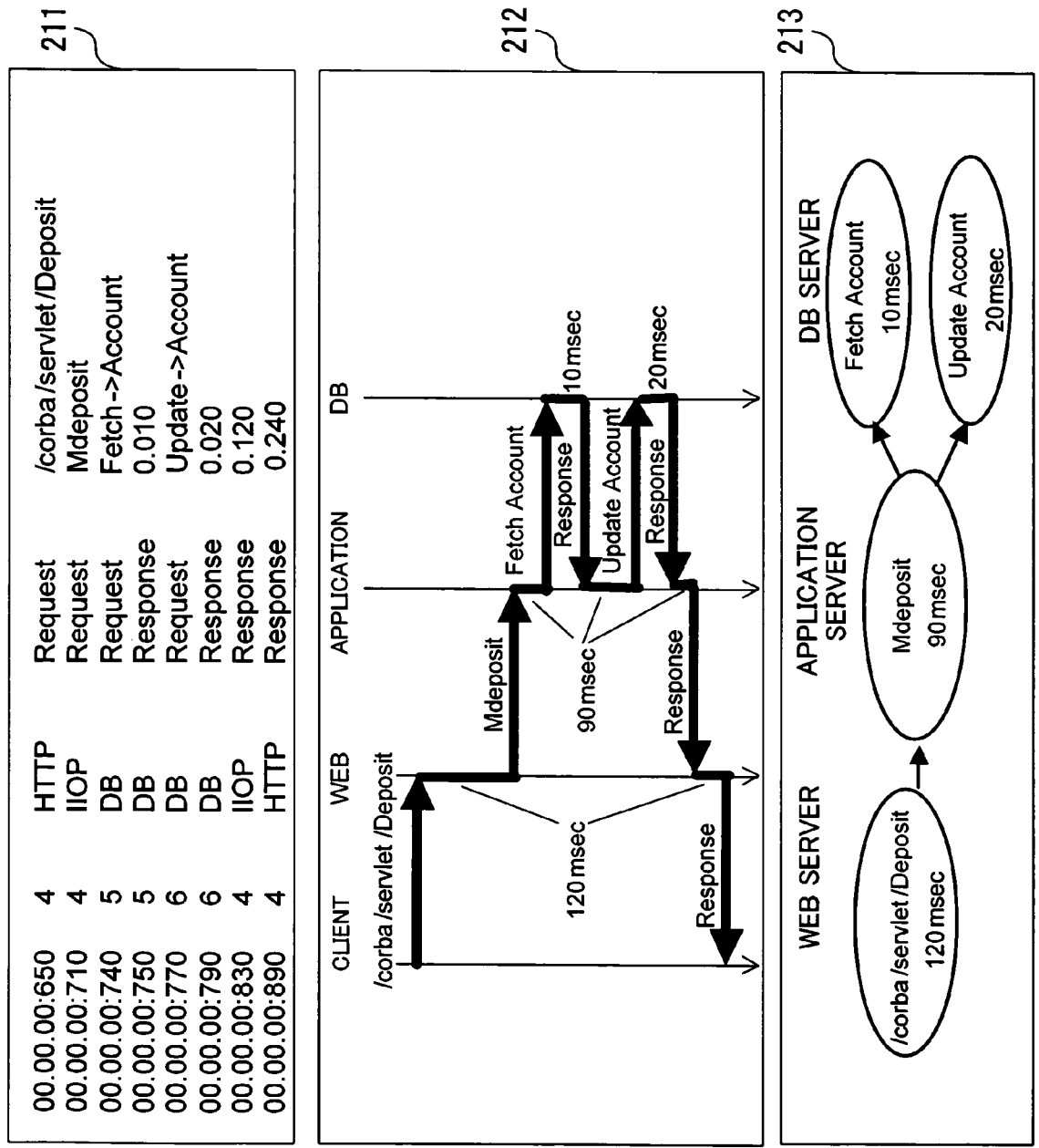
FIG. 22 is a diagram illustrating an example of generation of a model of a "Deposit" transaction.

FIG. 22 is a diagram illustrating an example of generation of a model of a "Deposit" transaction. Specifically, FIG. 22 shows a transaction model 213 for "Deposit," which is generated from a set of messages (message set) 211 between and including the HTTP request and response messages constituting the pair 94 having the identification number "4" illustrated in FIG. 20.

The model generation unit 140 analyzes the message set 211 in accordance with a predetermined limiting condition, and produces a processing sequence 212 in a similar manner to the processing of FIG. 21. Details of the respective messages in the message set 211 are as follows.

First, the client 21 requests the web server 31 to perform processing by sending a request message conforming to the HTTP protocol and having the identification number "4." In this case, the URL is "/corba/servlet/Deposit/." Next, the web server 31 requests the application server 32 to execute an "Mdeposit" method by sending a request message conforming to the IIOP protocol and having the identification number "4." Then, the application server 32 requests the DB server 33 to perform processing for manipulation called "Fetch Account" by sending a request message conforming to the DB protocol and having the identification number "5." As indicated in the description of the DB response message corresponding to the above DB request message and having the identification number "5," it takes 10 milliseconds for the DB server 33 to perform the "Fetch Account" processing.

Thereafter, the application server 32 further requests the DB server 33 to perform other processing for manipulation called "Update Account" by sending another request message conforming to the DB protocol and having the identification number "6." Then, a response message conforming to the DB protocol and having the identification number "6," a response message conforming to the IIOP protocol and having the identification number "4," and a response message conforming to the HTTP protocol and having the identification number "4" are transmitted from the DB server 33, application server 32, and the web server 31, respectively.

Subsequently, a transaction model 213 is generated based on the flow of the above messages, and stored in the model storage unit 113. When the above response messages are received, the response times (i.e., the times elapsed from occurrence of the requests until occurrence of the corresponding responses) in the DB server 33, the application server 32, and the web server 31 can be recognized as 20, 120, and 240 milliseconds, respectively. The response times are also included in the transaction model 213.

The "Deposit" transaction model 213 shows that the web server 31 performs processing of an "/corba/servlet/Deposit/" object, the application server 32 performs processing of an "Mdeposit" object, and the DB server 33 performs processing of a "Fetch Account" object and an "Update Account" object. Then, the model generation unit 140 calculates the processing times of the objects in the respective servers. The processing times in the DB server 33 are 10 and 20 milliseconds, the processing time in the application server 32 is 90 (=120−(10+20)) milliseconds, and the processing time in the web server 31 is 120 (=240−120) milliseconds.

As explained above, the model generation unit 140 generates a transaction model 213 in which caller-called relationships in the object processing and the processing times in the respective objects are defined.

Further, in some cases, messages for a "Balance Inquiry" transaction or a "Deposit" transaction may be inputted again by the message analysis unit 130 into the model generation unit 140, and the multiplicity of transactions is one. In such cases, it is possible to ignore the messages which are inputted again. Alternatively, it is possible to generate a model based on the messages which are inputted again, in a similar manner to the generation of a model based on the precedingly inputted messages for a transaction of the same type, and reflect the model generated based on the messages which are inputted again, in the processing time in each server in the model generated based on the precedingly inputted messages (for example, by taking an average of the corresponding processing times).

In addition, it is possible to generate a model by extracting a set of messages corresponding to a transaction having a multiplicity of more than one, based on the model corresponding to the multiplicity of one, by using a method of matching messages with an existing transaction model, which is executed by the analysis unit 150, and obtaining application processing times for each value of the multiplicity.

Hereinbelow, processing executed by the analysis unit 150 is explained in detail. The analysis unit 150 recognizes messages constituting each transaction by comparing the protocol log stored in the protocol-log storage unit 112 with a transaction model stored in the model storage unit 113. Then, the analysis unit 150 analyzes the condition of the system based on the processing times of the messages corresponding to each transaction. Specifically, the following processing is performed.

Figure 23:
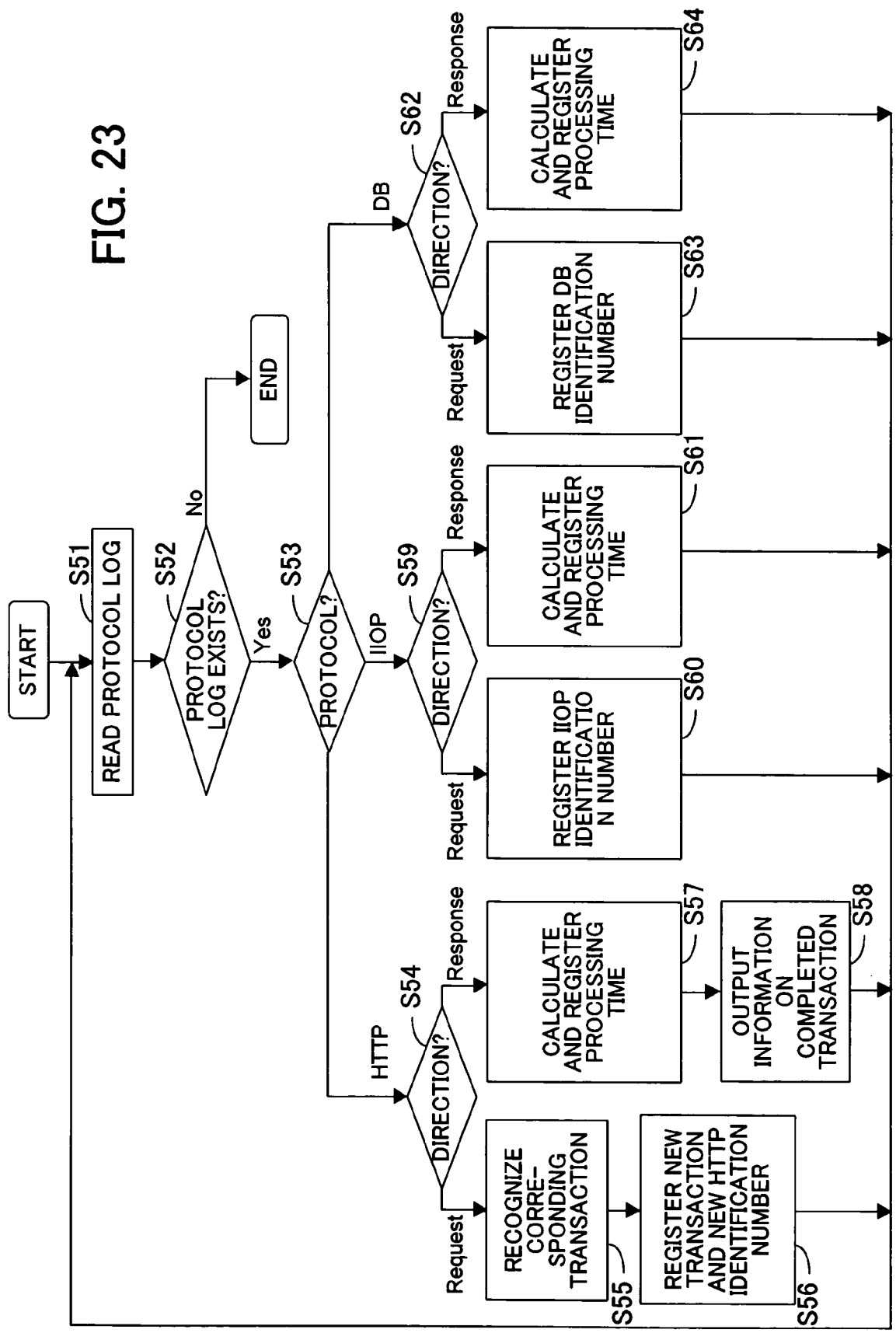
FIG. 23 is a flow diagram indicating a sequence of processing for analysis.

FIG. 23 is a flow diagram indicating a sequence of processing for analysis. The processing illustrated in FIG. 23 is explained below step by step.

[Step S51] The analysis unit 150 reads in a not-yet-processed protocol-log record item from the protocol-log storage unit 112.

[Step S52] The analysis unit 150 determines whether or not a not-yet-processed protocol-log record item exists. When yes is determined, the operation goes to step S53. When no is determined, the processing of FIG. 23 is completed.

[Step S53] The analysis unit 150 determines the protocol of the message indicated in the protocol-log record item which is read in. When the protocol is HTTP, the operation goes to step S54. When the protocol is IIOP, the operation goes to step S59. When the protocol is DB, the operation goes to step S62.

[Step S54] The analysis unit 150 determines the direction of the message, i.e., whether the message is a request or a response. When the message is a request, the operation goes to step S55. When the message is a response, the operation goes to step S57.

[Step S55] The analysis unit 150 detects a transaction model corresponding to an object (URL) which the message indicates, in the model storage unit 113, and recognizes the details of the transaction which occurs in response to the HTTP request.

[Step S56] The analysis unit 150 registers a new transaction and a new HTTP identification number in an in-process information table. Thereafter, the operation goes to step S51.

[Step S57] The analysis unit 150 searches the in-process information table for a transaction and an HTTP request which correspond to an HTTP identification number, and calculates a processing time in the web server 31. The calculated processing time is registered in association with the corresponding transaction in the in-process information table.

[Step S58] The analysis unit 150 outputs information on a completed transaction to the output unit 160, and deletes the information from the in-process information table. Thereafter, the operation goes to step S51.

[Step S59] The analysis unit 150 determines the direction of the message, i.e., whether the message is a request or a response. When the message is a request, the operation goes to step S60. When the message is a response, the operation goes to step S61.

[Step S60] The analysis unit 150 searches the in-process information table for a transaction corresponding to an object (method) indicated in the message, and registers an IIOP identification number. Thereafter, the operation goes to step S51.

[Step S61] The analysis unit 150 searches the in-process information table for a transaction corresponding to an IIOP identification number, and calculates a processing time in the application server 32. The calculated processing time is registered in association with the corresponding transaction in the in-process information table. Thereafter, the operation goes to step S51.

[Step S62] The analysis unit 150 determines the direction of the message, i.e., whether the message is a request or a response. When the message is a request, the operation goes to step S63. When the message is a response, the operation goes to step S64.

[Step S63] The analysis unit 150 searches the in-process information table for a transaction corresponding to an object (a command+a table name) indicated in the message, and registers a DB identification number. Thereafter, the operation goes to step S51.

[Step S64] The analysis unit 150 searches the in-process information table for a transaction corresponding to a DB identification number, and calculates a processing time in the DB server 33. The calculated processing time is registered in association with the corresponding transaction in the in-process information table. Thereafter, the operation goes to step S51.

When the above processing is performed, the processing times and the like in each server can be recorded for each type of transaction.

FIG. 24 is a diagram illustrating examples of messages which are inputted into the analysis unit. After an instruction for analysis is issued in response to a user's manipulation input or the like, protocol-log record items 221 to 242 which are outputted from the message analysis unit 130 and stored in the protocol-log storage unit 112 are successively inputted into the analysis unit 150.

The analysis unit 150 compares the protocol-log record items 221 to 242 with the transaction models for "Balance Inquiry" and "Deposit," which are obtained by the model generation unit 140 and illustrated in FIGS. 21 and 22. Then, the analysis unit 150 extracts transactions which match with the transaction models for "Balance Inquiry" and "Deposit." Hereinbelow, an example of analysis of the protocol-log record items 221 to 242 indicated in FIG. 24 is explained with reference to FIGS. 25 to 34, which indicate state transitions of transactions which can be confirmed by analyzing the protocol-log record items 221 to 242 one by one from the top. In FIGS. 25 to 34, the objects the processing of which has already been started in each transaction the occurrence of which has been confirmed are indicated by solid ellipse, and the objects the processing of which has not yet been started are indicated by dashed ellipses.

Figure 25:
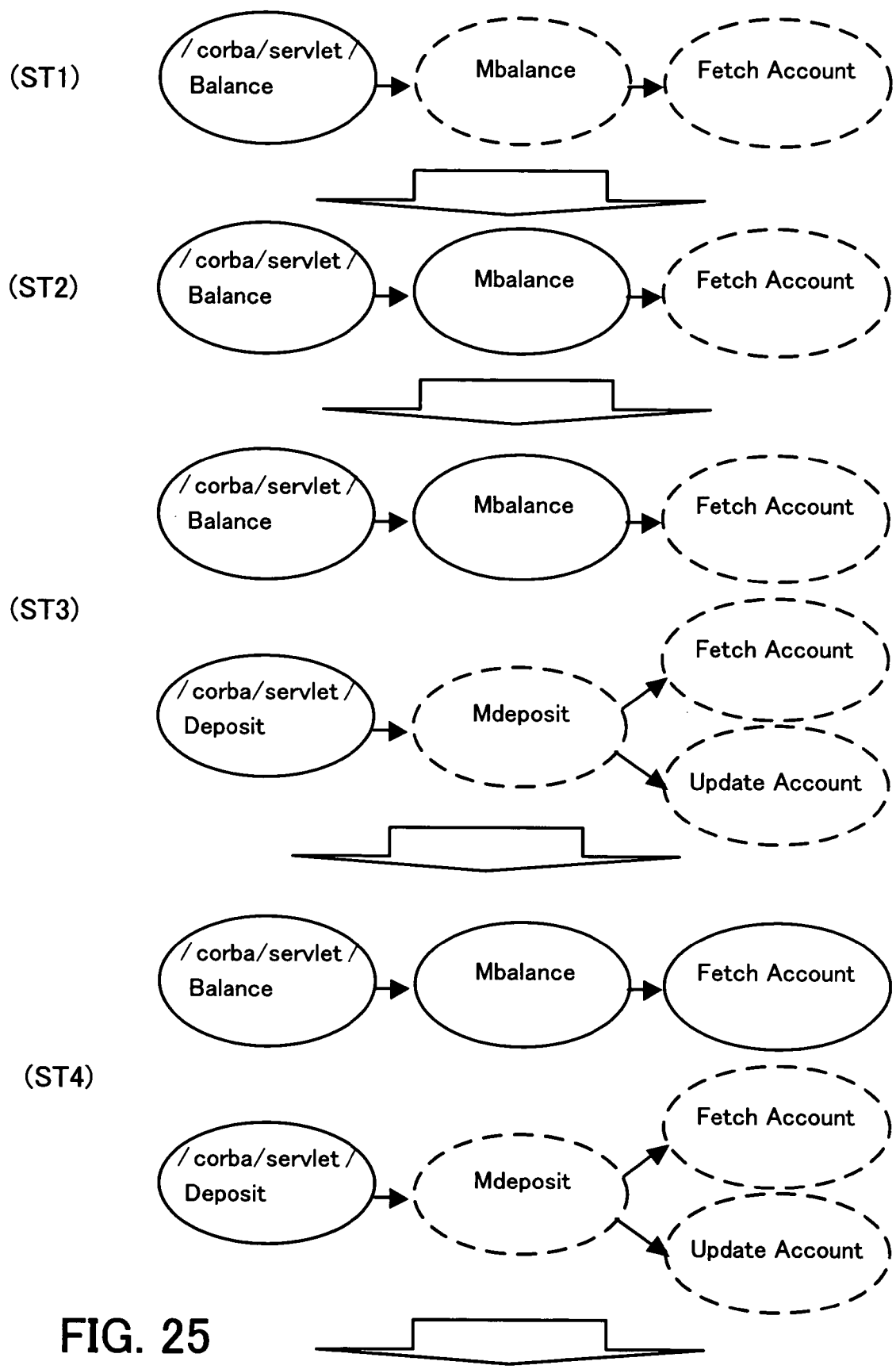
FIG. 25 is a first diagram illustrating an example of analysis of messages.

FIG. 25 is the first diagram illustrating an example of analysis of messages.

First, the message indicated by the first protocol-log record item 221 is a request message for processing of the /corba/servlet/Balance/ object, which conforms to the HTTP protocol, has an identification number "100" corresponding to a "Balance Inquiry" transaction, and is sent from the client 21 to the web server 31. As illustrated as the first state (ST1) in FIG. 25, this message corresponds to a call for processing in the web server 31 in the transaction model 203 (for the "Balance Inquiry" transaction) illustrated in FIG. 21. That is, the above message makes the web server 31 start the requested processing.

The message indicated by the second protocol-log record item 222 is a request message to the application server 32 for processing of the Mbalance object, which conforms to the IIOP protocol and has an identification number "200" corresponding to the "Balance Inquiry" transaction. As illustrated as the second state (ST2) in FIG. 25, this message corresponds to a call for processing in the application server 32 in the "Balance Inquiry" transaction model 203 illustrated in FIG. 21. That is, the above message makes the application server 32 start the requested processing.

The message indicated by the third protocol-log record item 223 is a first request message to the web server 31 for processing of the /corba/servlet/Deposit/ object, which conforms to the HTTP protocol and has an identification number "101" corresponding to a first "Deposit" transaction. As illustrated as the third state (ST3) in FIG. 25, this message corresponds to a call for processing in the web server 31 in the "Deposit" transaction model 213 illustrated in FIG. 21. That is, the above message makes the web server 31 start the requested processing.

The message indicated by the fourth protocol-log record item 224 is a request message for processing of a Fetch Account command, which conforms to the DB protocol, has an identification number "500" corresponding to the "Balance Inquiry" transaction, and is sent from the application server 32 to the DB server 33. As illustrated as the fourth state (ST4) in FIG. 25, this message corresponds to a call for processing in the DB server 33 in the "Balance Inquiry" transaction model 203. That is, the above message makes the DB server 33 start the requested processing.

Figure 26:
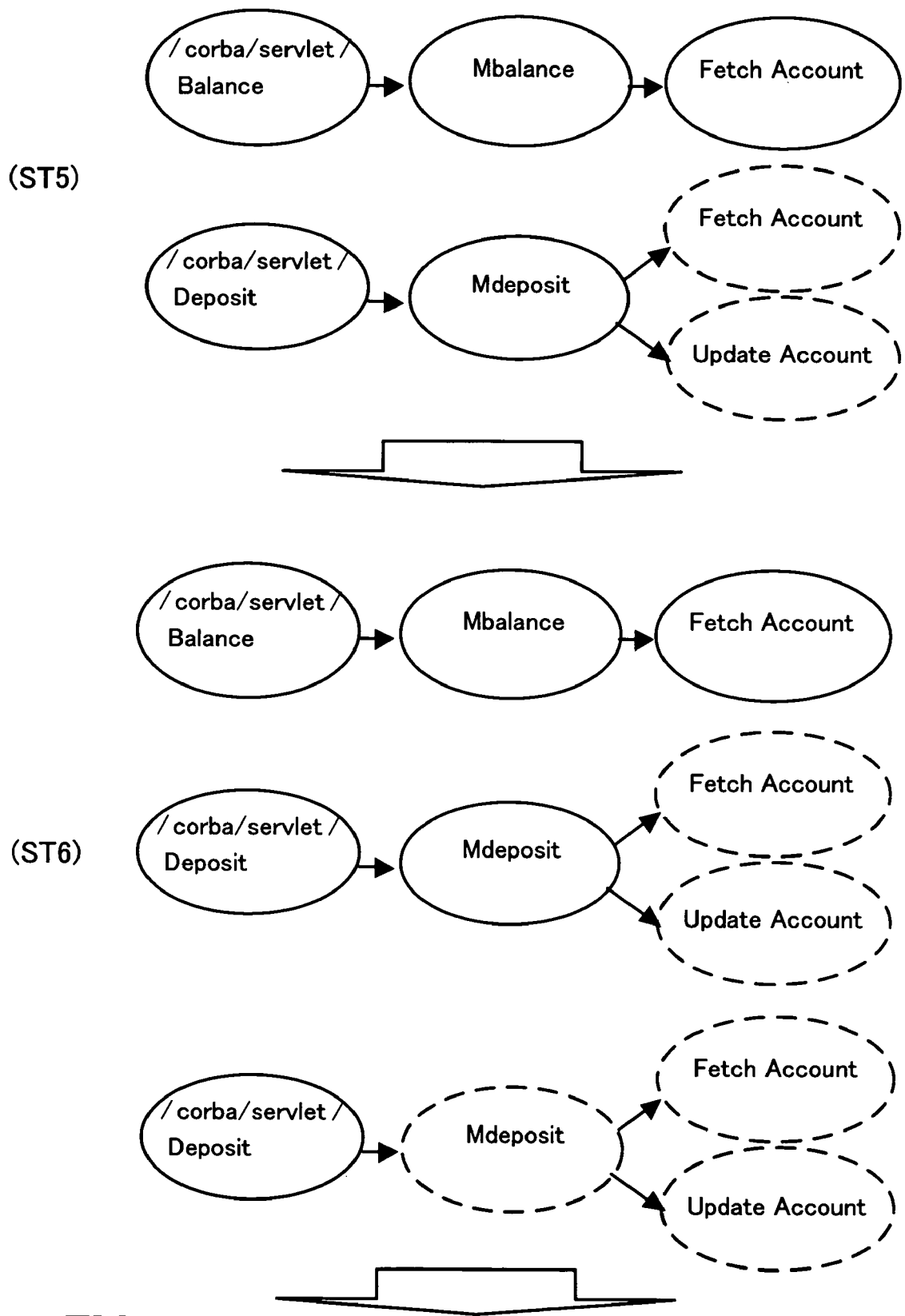
FIG. 26 is a second diagram illustrating the example of analysis of messages.

FIG. 26 is the second diagram illustrating the example of analysis of messages.

The message indicated by the fifth protocol-log record item 225 is a request message to the application server 32 for processing of the Mdeposit object, which conforms to the IIOP protocol and has an identification number "201" corresponding to the first "Deposit" transaction. As illustrated as the fifth state (ST5) in FIG. 26, this message corresponds to a call for processing in the application server 32 in the "Deposit" transaction model 213. That is, the above message makes the application server 32 start the requested processing.

The message indicated by the sixth protocol-log record item 226 is a request message to the web server 31 for processing of the /corba/servlet/Deposit/ object, which conforms to the HTTP protocol and has an identification number "102" for a second "Deposit" transaction. As illustrated as the sixth state (ST6) in FIG. 26, this message corresponds to a call for processing in the web server 31 in the "Deposit" transaction model 213. That is, the above message makes the web server 31 start the requested processing.

Figure 27:
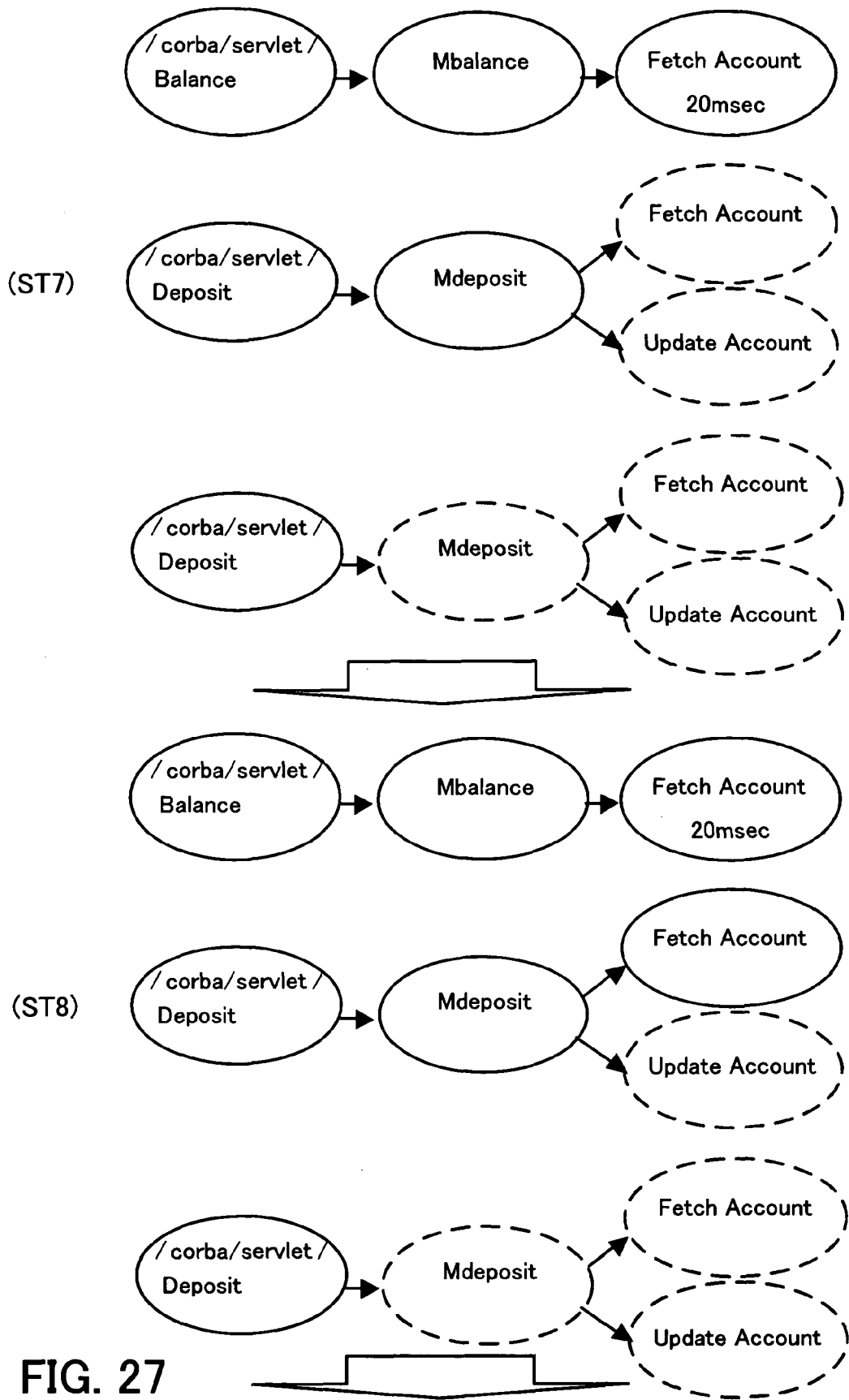
FIG. 27 is a third diagram illustrating the example of analysis of messages.

FIG. 27 is the third diagram illustrating the example of analysis of messages.

The message indicated by the seventh protocol-log record item 227 is a response message which conforms to the DB protocol, has an identification number "500" corresponding to the "Balance Inquiry" transaction, and is sent from the DB server 33 to the application server 32. As illustrated as the seventh state (ST7) in FIG. 27, this message indicates that the DB server 33 has taken 20 milliseconds for the processing in the "Balance Inquiry" transaction. In the "Balance Inquiry" transaction model 203 illustrated in FIG. 21, the processing time of the Fetch Account command in the DB server 33 is 10 milliseconds. That is, there is a difference of 10 milliseconds from the processing time of the Fetch Account command in the "Balance Inquiry" transaction model 203.

The message indicated by the eighth protocol-log record item 228 is a request message for processing of a Fetch Account command, which conforms to the DB protocol, has an identification number "501" corresponding to the first "Deposit" transaction, and is sent from the application server 32 to the DB server 33. As illustrated as the eighth state (ST8) in FIG. 27, this message corresponds to a call for processing in the DB server 33 in the "Deposit" transaction model 213. That is, the above message makes the DB server 33 start the requested processing.

Figure 28:
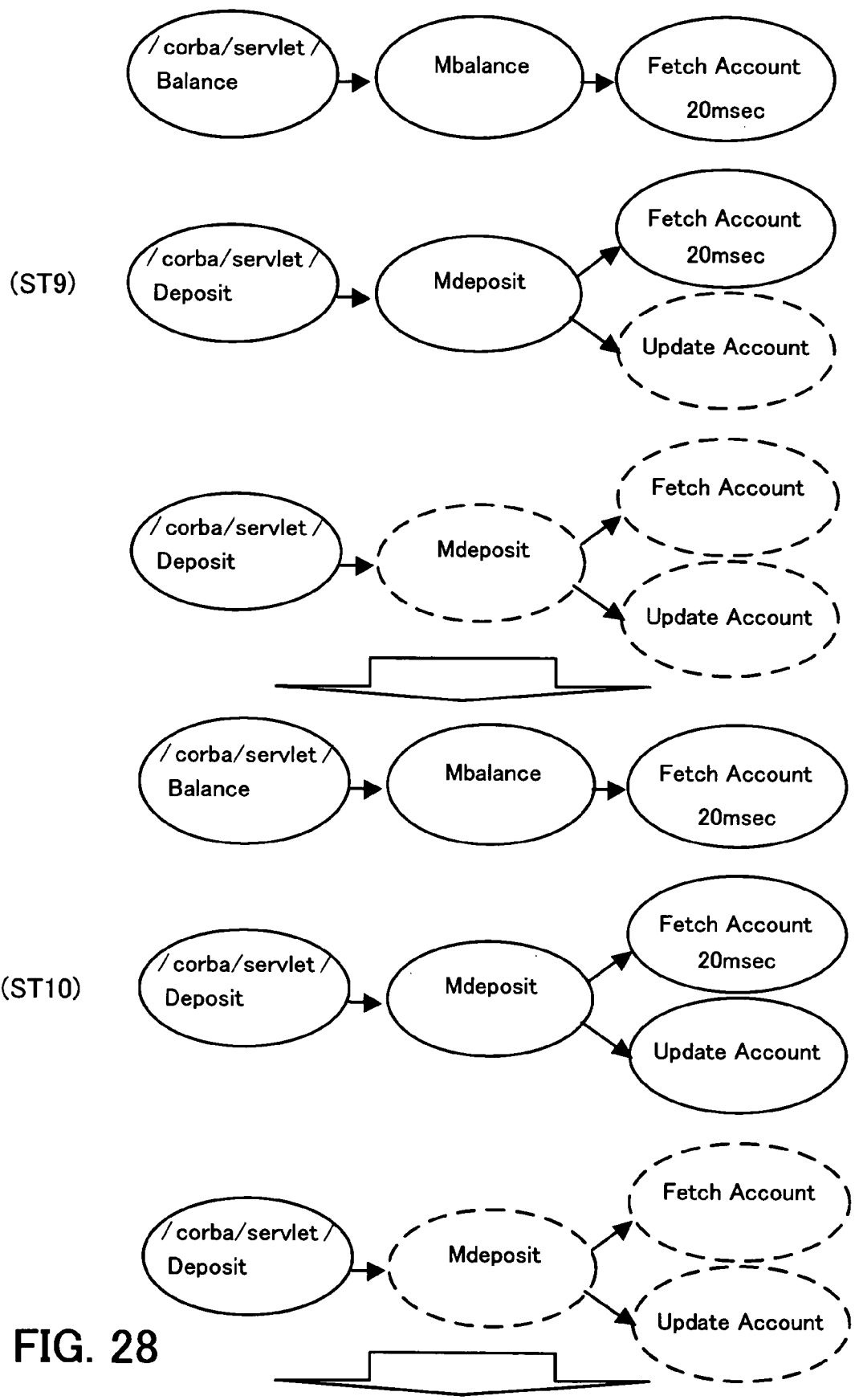
FIG. 28 is a fourth diagram illustrating the example of analysis of messages.

FIG. 28 is the fourth diagram illustrating the example of analysis of messages.

The message indicated by the ninth protocol-log record item 229 is a response message which conforms to the DB protocol, has an identification number "501" corresponding to the first "Deposit" transaction, and is sent from the DB server 33 to the application server 32. As illustrated as the ninth state (ST9) in FIG. 27, this message indicates that the DB server 33 has taken 20 milliseconds for the processing in the first "Deposit" transaction. According to the "Deposit" transaction model 213 illustrated in FIG. 22, the processing time of the Fetch Account command in the DB server 33 is 10 milliseconds. That is, there is a difference of 10 milliseconds from the processing time of the Fetch Account command according to the "Deposit" transaction model 213.

The message indicated by the tenth protocol-log record item 230 is a request message for processing of an Update Account command, which conforms to the DB protocol, has an identification number "502" corresponding to the first "Deposit" transaction, and is sent from the application server 32 to the DB server 33. As illustrated as the tenth state (ST10) in FIG. 28, this message corresponds to a call for processing in the DB server 33 in the "Deposit" transaction model 213. That is, the above message makes the DB server 33 start the requested processing.

Figure 29:
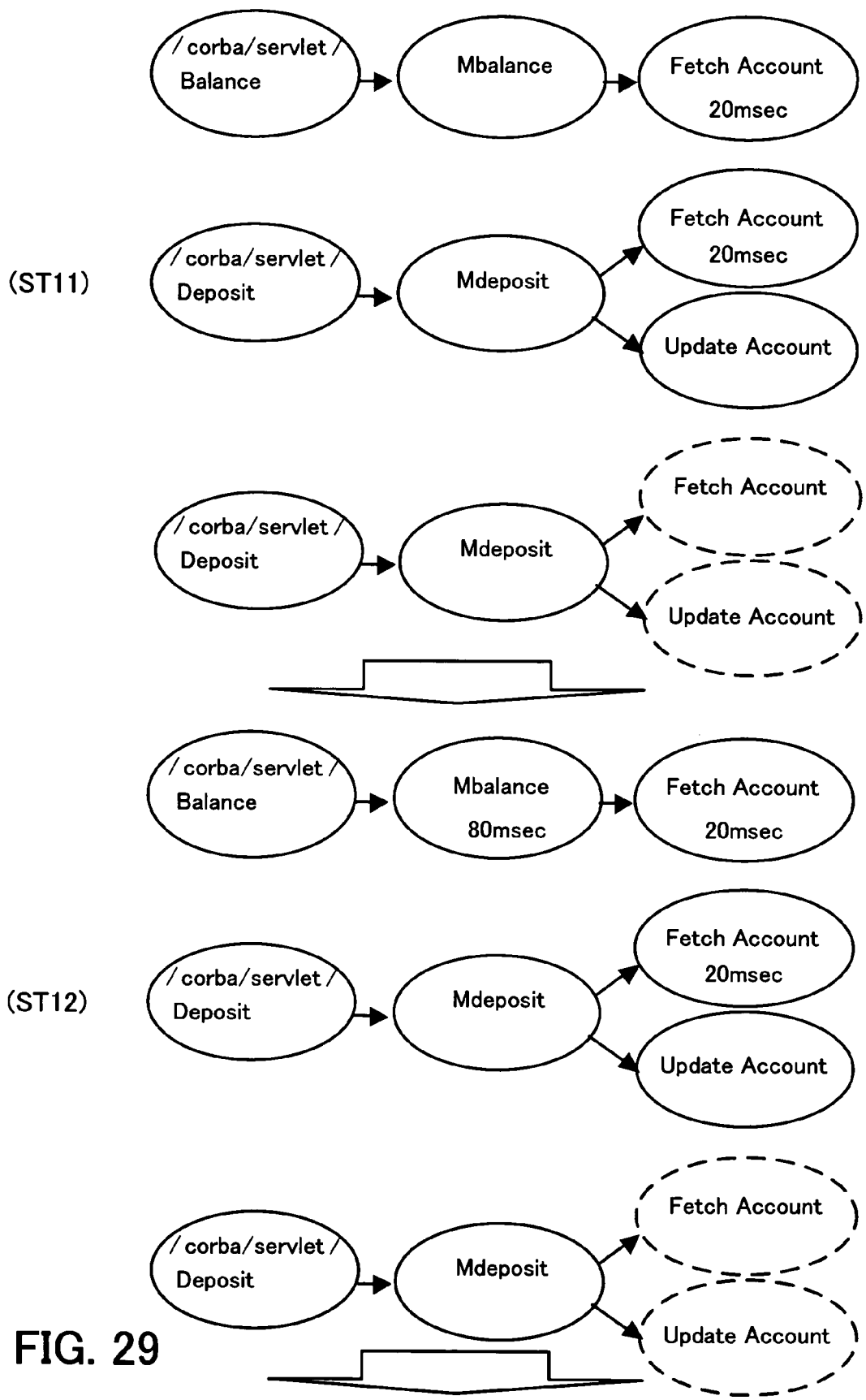
FIG. 29 is a fifth diagram illustrating the example of analysis of messages.

FIG. 29 is the fifth diagram illustrating the example of analysis of messages.

The message indicated by the eleventh protocol-log record item 231 is a request message to the application server 32 for processing of the Mdeposit object, which conforms to the IIOP protocol and has an identification number "202" corresponding to the second "Deposit" transaction. As illustrated as the eleventh state (ST11) in FIG. 29, this message corresponds to a call for processing in the application server 32 in the "Deposit" transaction model 213. That is, the above message makes the application server 32 start the requested processing.

The message indicated by the twelfth protocol-log record item 232 is a response message which conforms to the IIOP protocol, has an identification number "200" corresponding to the "Balance Inquiry" transaction, and is sent from the application server 32 to the web server 31. As illustrated as the twelfth state (ST12) in FIG. 29, this message indicates that the processing in the "Balance Inquiry" transaction performed by the application server 32 is completed. As indicated in this message, the time elapsed after the occurrence of the corresponding IIOP request until the occurrence of the above IIOP response at the web server 31 (the response time of the application server 32) is 100 milliseconds. However, the value of 80 milliseconds is obtained as the actual processing time in the application server 32 by subtracting the processing time in the DB server 33 (20 milliseconds) from the response time in the application server 32. This value is identical to the processing time in the application server 32 in the "Balance Inquiry" transaction model 203 illustrated in FIG. 21.

Figure 30:
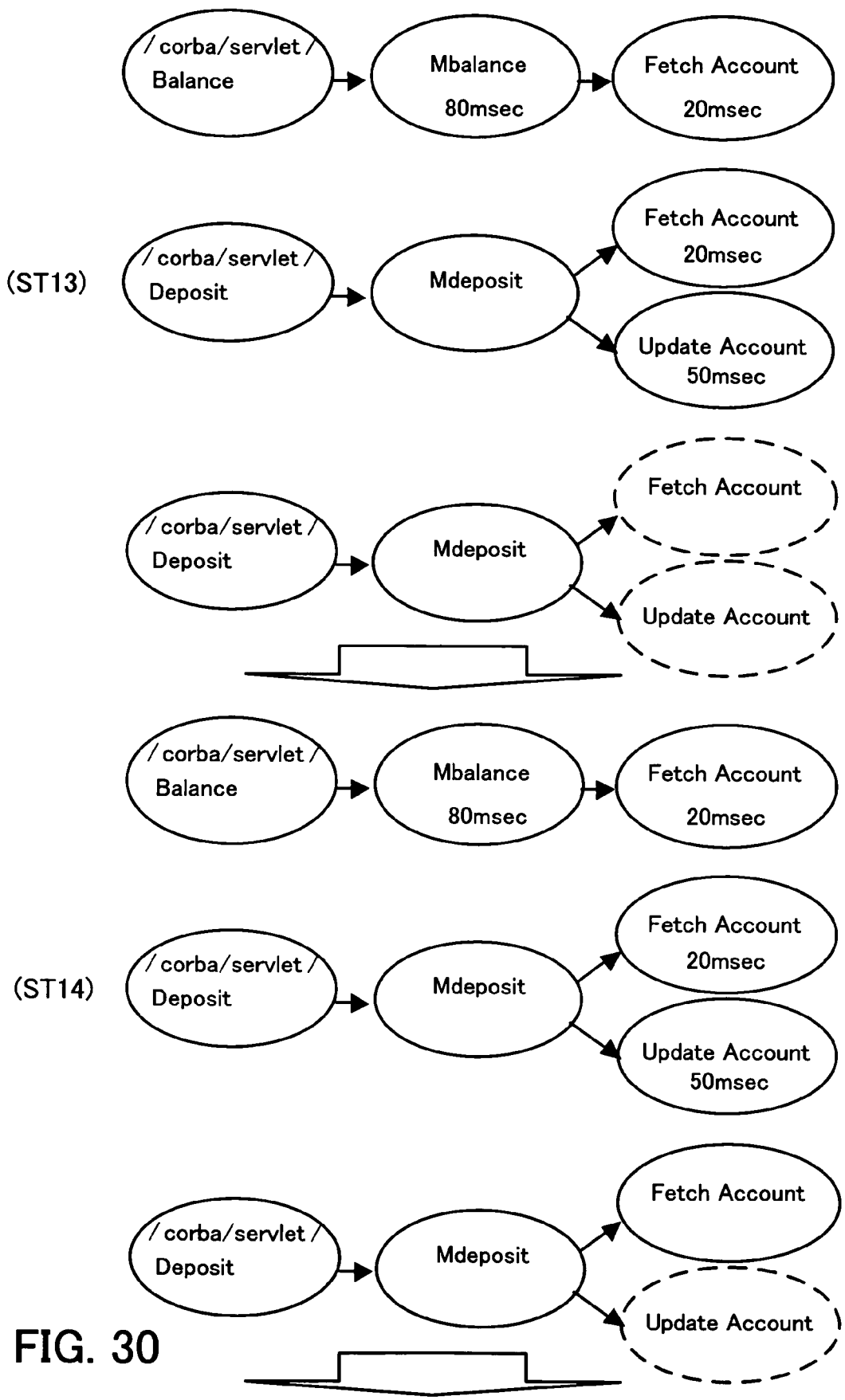
FIG. 30 is a sixth diagram illustrating the example of analysis of messages.

FIG. 30 is the sixth diagram illustrating the example of analysis of messages.

The message indicated by the thirteenth protocol-log record item 233 is a response message which conforms to the DB protocol, has an identification number "502" corresponding to the first "Deposit" transaction, and is sent from the DB server 33 to the application server 32. As illustrated as the thirteenth state (ST13) in FIG. 30, this message indicates that the DB server 33 has taken 50 milliseconds to complete the processing in the first "Deposit" transaction. According to the "Deposit" transaction model 213 illustrated in FIG. 22, the processing time of the Update Account command in the DB server 33 is 20 milliseconds. That is, there is a difference of 30 milliseconds from the processing time of the Update Account command according to the "Deposit" transaction model 213.

The message indicated by the fourteenth protocol-log record item 234 is a request message for processing of a Fetch Account command, which conforms to the DB protocol, has an identification number "503" corresponding to the second "Deposit" transaction, and is sent from the application server 32 to the DB server 33. As illustrated as the fourteenth state (ST14) in FIG. 30, this message corresponds to a call for processing in the DB server 33 in the "Deposit" transaction model 213. That is, the above message makes the DB server 33 start the requested processing.

Figure 31:
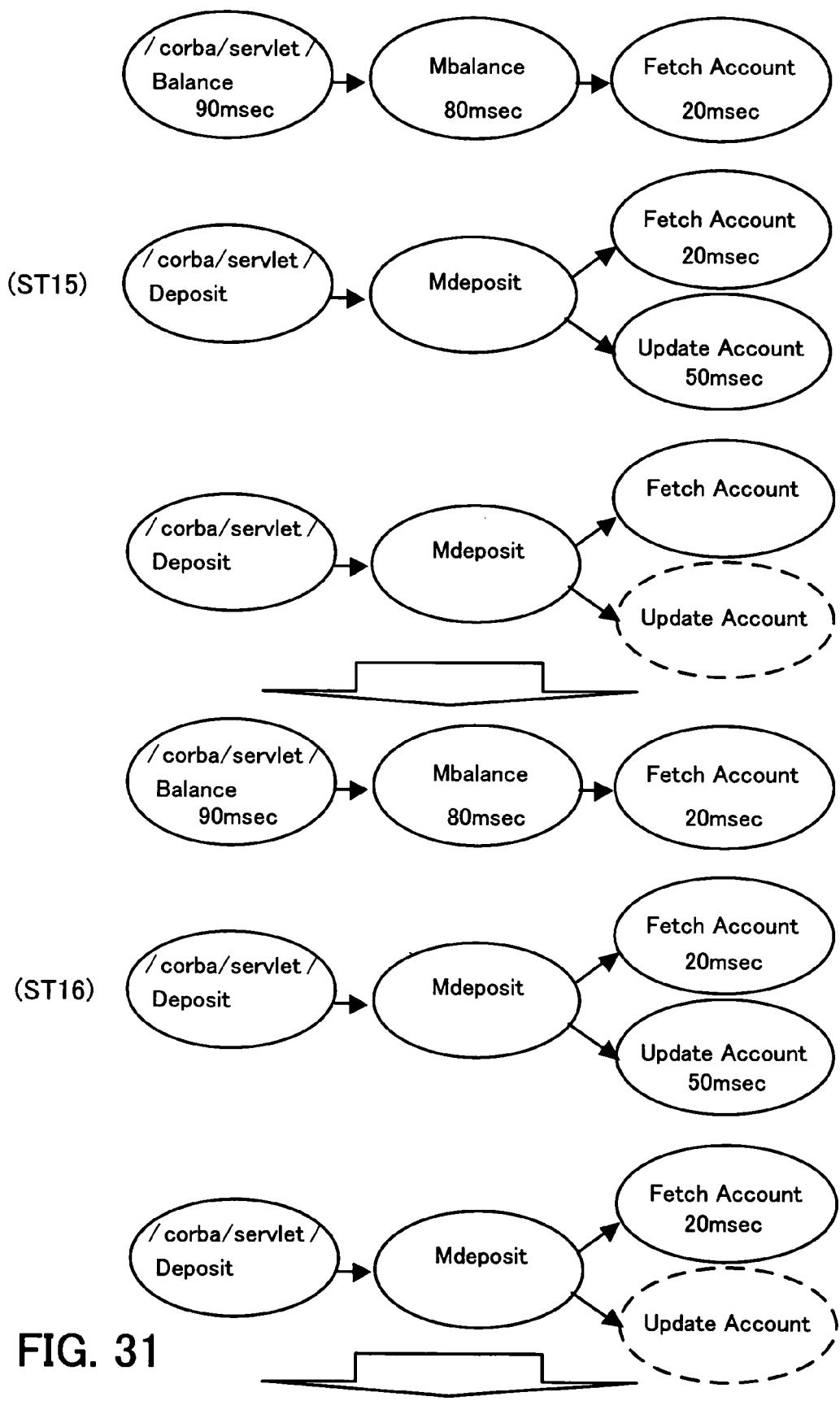
FIG. 31 is a seventh diagram illustrating the example of analysis of messages.

FIG. 31 is the seventh diagram illustrating the example of analysis of messages.

The message indicated by the fifteenth protocol-log record item 235 is a response message which conforms to the HTTP protocol, has an identification number "100" corresponding to the "Balance Inquiry" transaction, and is sent from the web server 31 to the client. As illustrated as the fifteenth state (ST15) in FIG. 31, this message indicates that the processing in the "Balance Inquiry" transaction performed by the web server 31 is completed. As indicated in this message, the time elapsed after the occurrence of the corresponding HTTP request until the occurrence of the above HTTP response (the response time of the web server 31) is 190 milliseconds. However, the value of 90 milliseconds is obtained as the actual processing time in the web server 31 by subtracting the response time in the application server 32 (100 milliseconds) from the response time in the web server 31. In the "Balance Inquiry" transaction model 203 illustrated in FIG. 21, the processing time in the web server 31 is 100 milliseconds. That is, the actual processing is completed 10 milliseconds earlier than the time of completion in the "Balance Inquiry" transaction model 203. When the above response message is received, all processing in the "Balance Inquiry" transaction is completed, and information on the completed transaction is outputted to the output unit 160.

The message indicated by the sixteenth protocol-log record item 236 is a response message which conforms to the DB protocol, has an identification number "503" corresponding to the second "Deposit" transaction, and is sent from the DB server 33 to the application server 32. As illustrated as the sixteenth state (ST16) in FIG. 31, this message indicates that the DB server 33 has taken 20 milliseconds to complete the processing in the second "Deposit" transaction. According to the "Deposit" transaction model 213 illustrated in FIG. 22, the processing time of the Fetch Account command in the DB server 33 is 10 milliseconds. That is, there is a difference of 10 milliseconds from the processing time of the Fetch Account command according to the "Deposit" transaction model 213.

Figure 32:
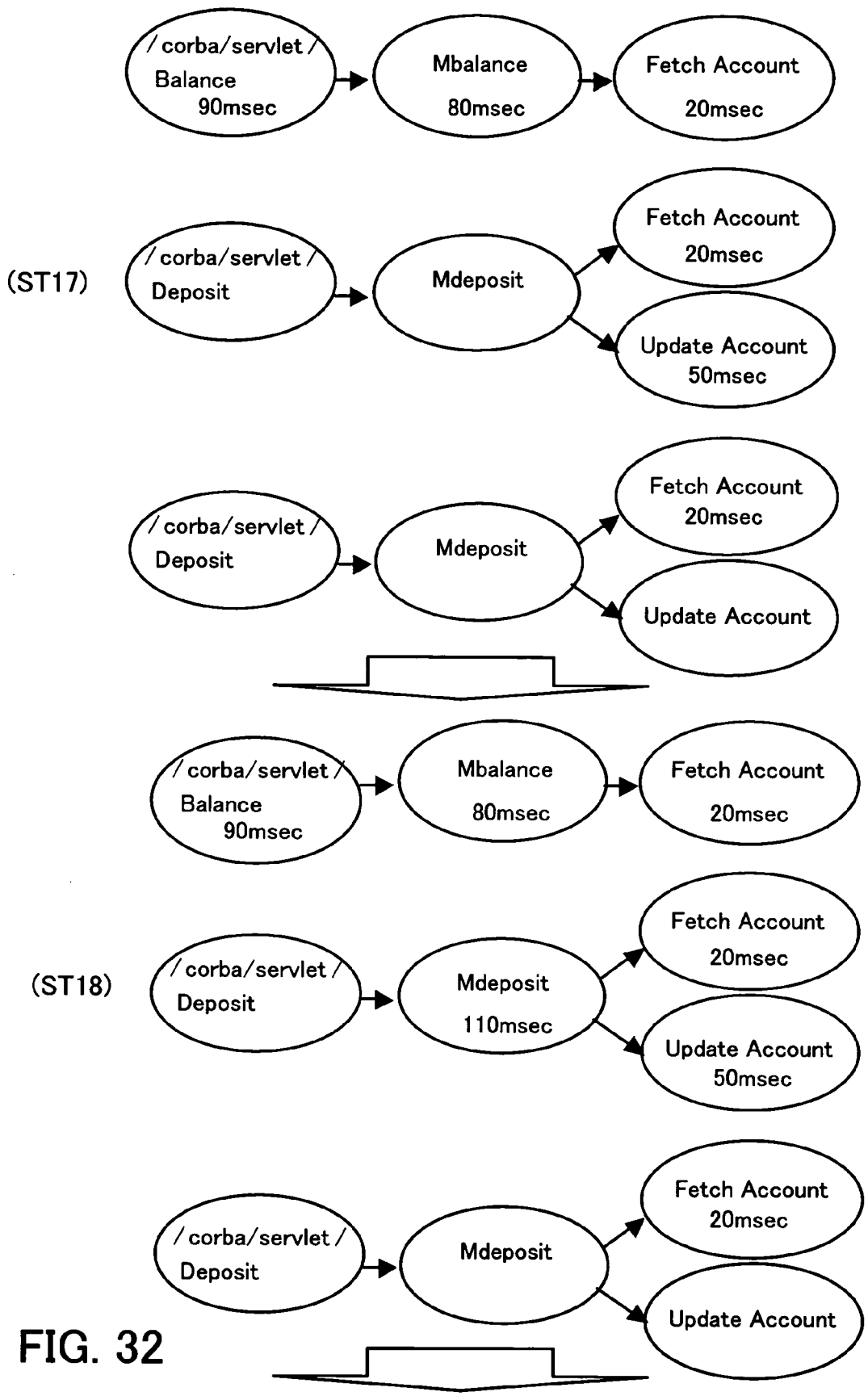
FIG. 32 is an eighth diagram illustrating the example of analysis of messages.

FIG. 32 is the eighth diagram illustrating the example of analysis of messages.

The message indicated by the seventeenth protocol-log record item 237 is a request message for processing of an Update Account command, which conforms to the DB protocol, has an identification number "504" corresponding to the second "Deposit" transaction, and is sent from the application server 32 to the DB server 33. As illustrated as the seventeenth state (ST17) in FIG. 32, this message corresponds to a call for processing in the DB server 33 in the "Deposit" transaction model 213. That is, the above message makes the DB server 33 start the requested processing.

The message indicated by the eighteenth protocol-log record item 238 is a response message which conforms to the IIOP protocol, has an identification number "201" corresponding to the first "Deposit" transaction, and is sent from the application server 32 to the web server 31. As illustrated as the eighteenth state (ST18) in FIG. 32, this message indicates that the processing in the first "Deposit" transaction performed by the application server 32 is completed. As indicated in this message, the time elapsed after the occurrence of the corresponding IIOP request until the occurrence of the above IIOP response (the response time of the application server 32) is 180 milliseconds. However, the value of 110 milliseconds is obtained as the actual processing time in the application server 32 by subtracting from the above response time in the application server 32 the sum of the times (70 msec=20 msec+50 msec) spent by the DB server 33 for processing of the two commands which are executed by the DB server 33 during the above response time. According to the "Deposit" transaction model 213 illustrated in FIG. 22, the processing time in the DB server 33 is 90 milliseconds. That is, there is a difference of 20 milliseconds from the processing time in the DB server 33 according to the "Deposit" transaction model 213.

Figure 33:
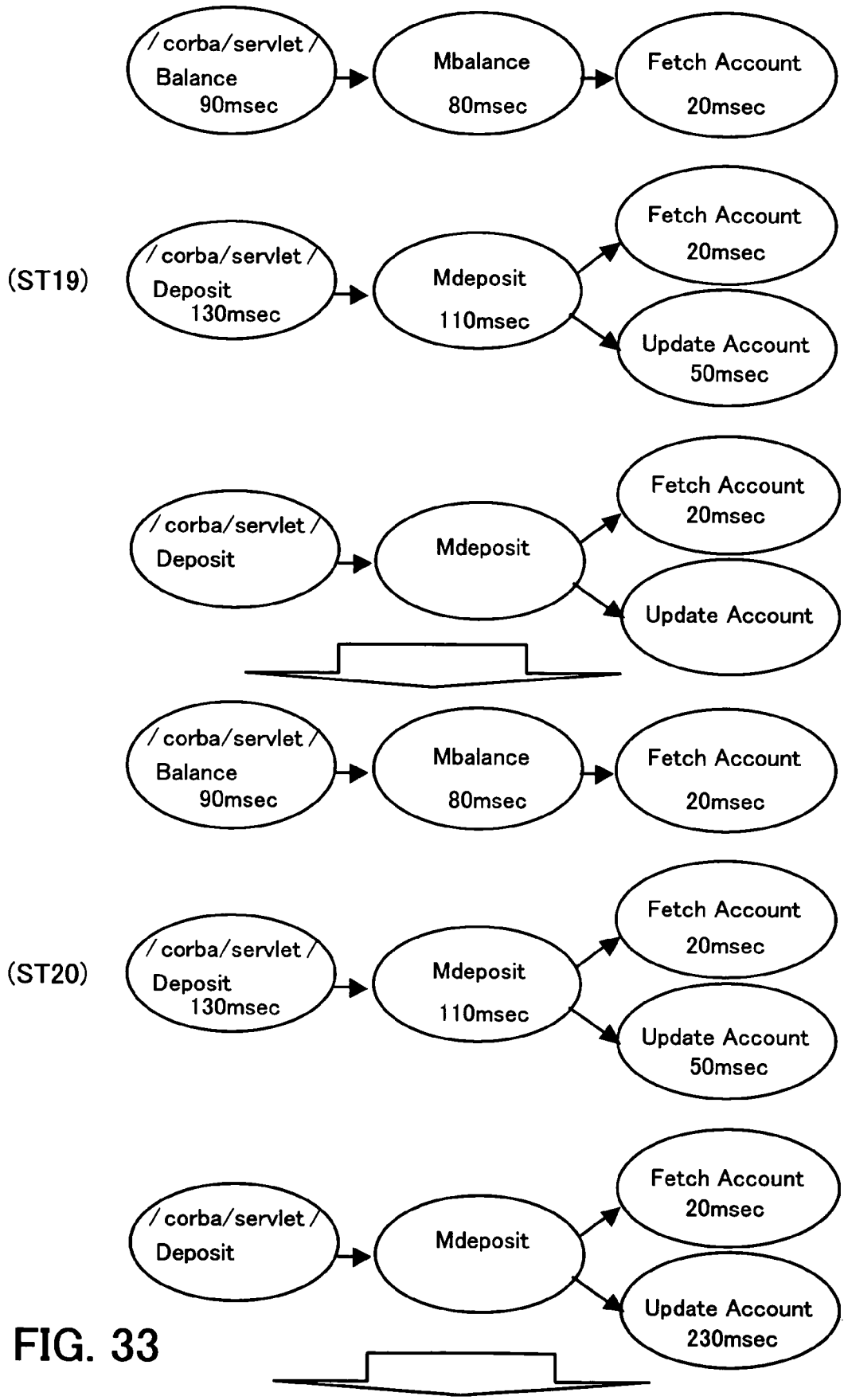
FIG. 33 is a ninth diagram illustrating the example of analysis of messages.

FIG. 33 is the ninth diagram illustrating the example of analysis of messages.

The message indicated by the nineteenth protocol-log record item 239 is a response message which conforms to the HTTP protocol, has an identification number "101" corresponding to the first "Deposit" transaction, and is sent from the web server 31 to the client. As illustrated as the nineteenth state (ST19) in FIG. 33, this message indicates that the processing in the first "Deposit" transaction performed by the web server 31 is completed. As indicated in this message, the time elapsed after the occurrence of the corresponding HTTP request until the occurrence of the above HTTP response (the response time of the web server 31) is 310 milliseconds. However, the value of 130 milliseconds is obtained as the actual processing time in the web server 31 by subtracting the response time in the application server 32 (180 milliseconds) from the response time in the web server 31. According to the "Deposit" transaction model 213 illustrated in FIG. 22, the processing time in the web server 31 is 120 milliseconds. That is, there is a difference of 10 milliseconds from the processing time in the web server 31 according to the "Deposit" transaction model 213. When the above message is received, all processing in the first "Deposit" transaction is completed, and information on the completed transaction is outputted to the output unit 160.

The message indicated by the twentieth protocol-log record item 240 is a response message which conforms to the DB protocol, has an identification number "504" corresponding to the second "Deposit" transaction, and is sent from the DB server 33 to the application server 32. As illustrated as the twentieth state (ST20) in FIG. 33, this message indicates that the DB server 33 has taken 230 milliseconds to complete the processing in the second "Deposit" transaction. According to the "Deposit" transaction model 213 illustrated in FIG. 22, the processing time of the Update Account command in the DB server 33 is 20 milliseconds. That is, the difference from the processing time of the Update Account command according to the "Deposit" transaction model 213 becomes as great as 210 milliseconds. This indicates that some problem has occurred.

Figure 34:
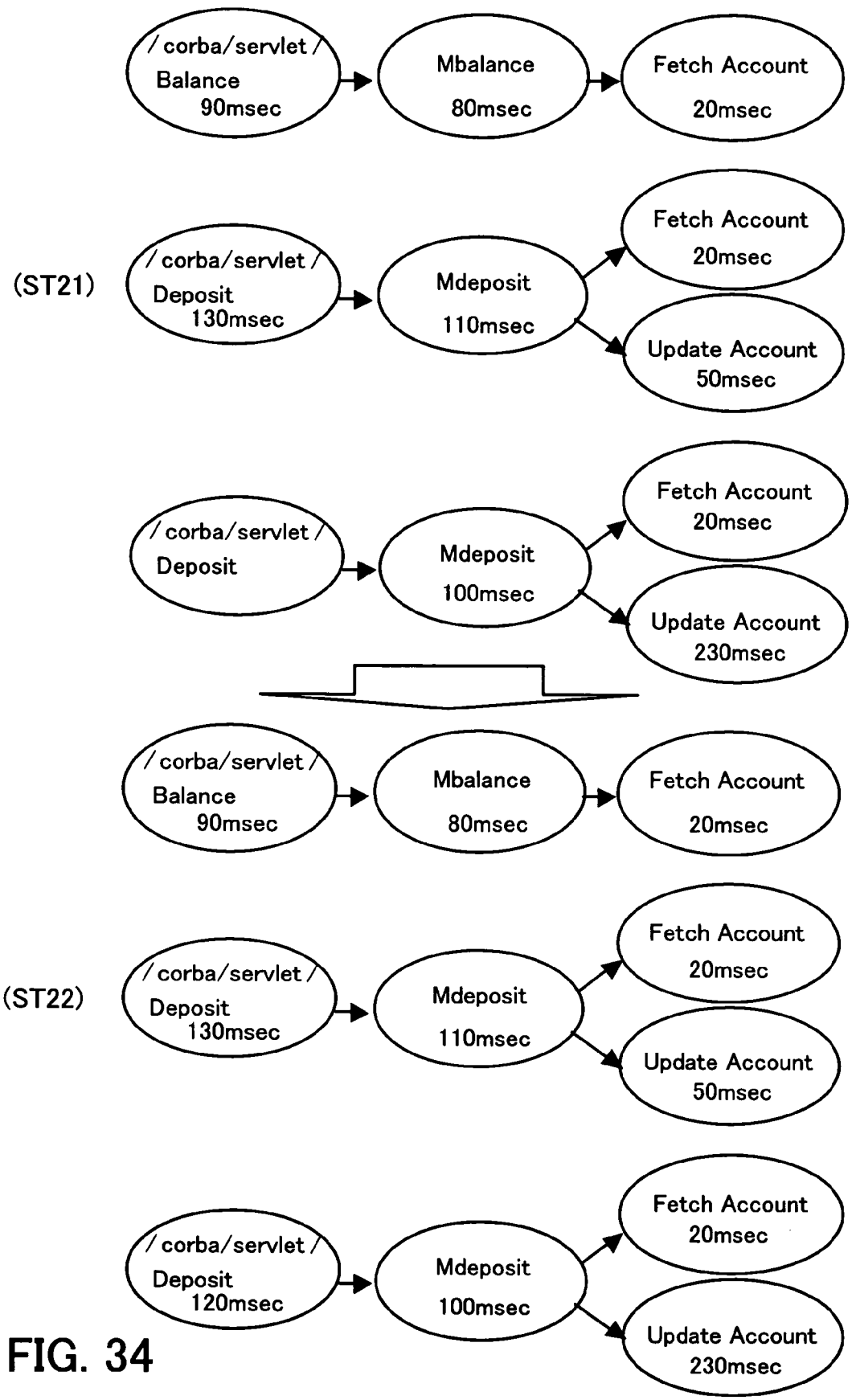
FIG. 34 is a tenth diagram illustrating the example of analysis of messages.

FIG. 34 is the tenth diagram illustrating the example of analysis of messages.

The message indicated by the twenty-first protocol-log record item 241 is a response message which conforms to the IIOP protocol, has an identification number "202" corresponding to the second "Deposit" transaction, and is sent from the application server 32 to the web server 31. As illustrated as the twenty-first state (ST21) in FIG. 34, this message indicates that the processing in the second "Deposit" transaction performed by the application server 32 is completed. As indicated in this message, the time elapsed after the occurrence of the corresponding IIOP request until the occurrence of the above IIOP response (the response time of the application server 32) is 350 milliseconds. However, the value of 100 milliseconds is obtained as the actual processing time in the application server 32 by subtracting from the above response time in the application server 32 the sum of the times (250 msec=20 msec+230 msec) spent by the DB server 33 for processing of the two commands which are executed by the DB server 33 during the above response time. According to the "Deposit" transaction model 213 illustrated in FIG. 22, the processing time in the DB server 33 is 90 milliseconds. That is, there is a difference of 10 milliseconds from the processing time in the DB server 33 according to the "Deposit" transaction model 213.

It should be noted that the actual processing time in the application server 32 is as small as 100 milliseconds, and nearly identical to the processing time in the application server 32 according to the "Deposit" transaction model 213, although the response time in the application server 32 is 350 milliseconds. This indicates that the application server 32 per se has no performance problem.

The message indicated by the twenty-second protocol-log record item 242 is a response message which conforms to the HTTP protocol, has an identification number "102" corresponding to the second "Deposit" transaction, and is sent from the web server 31 to the client. As illustrated as the twenty-second state (ST22) in FIG. 34, this message indicates that the processing in the second "Deposit" transaction performed by the web server 31 is completed. As indicated in this message, the time elapsed after the occurrence of the corresponding HTTP request until the occurrence of the above HTTP response (the response time of the web server 31) is 470 milliseconds. However, the value of 120 milliseconds is obtained as the actual processing time in the web server 31 by subtracting the response time in the application server 32 (350 milliseconds) form the response time in the web server 31. When the above message is received, all processing in the second "Deposit" transaction is completed, and information on the completed transaction is outputted to the output unit 160.

According to the "Deposit" transaction model 213 illustrated in FIG. 22, the processing time in the web server 31 is 120 milliseconds. That is, the actual processing time in the web server 31 obtained from the protocol log of FIG. 24 is identical to the processing time in the web server 31 according to the "Deposit" transaction model 213 although the response time is 470 milliseconds. This indicates that the web server 31 per se has no performance problem. The result of the analysis described above is stored in the analysis-result storage unit 114.

Next, processing performed by the output unit 160 is explained in detail below.

The output unit 160 outputs the information on the transaction stored by the analysis unit 150 in the analysis-result storage unit 114, to the monitor 11 in various forms. Hereinbelow, an example of output of transaction information is indicated.

Figure 35:
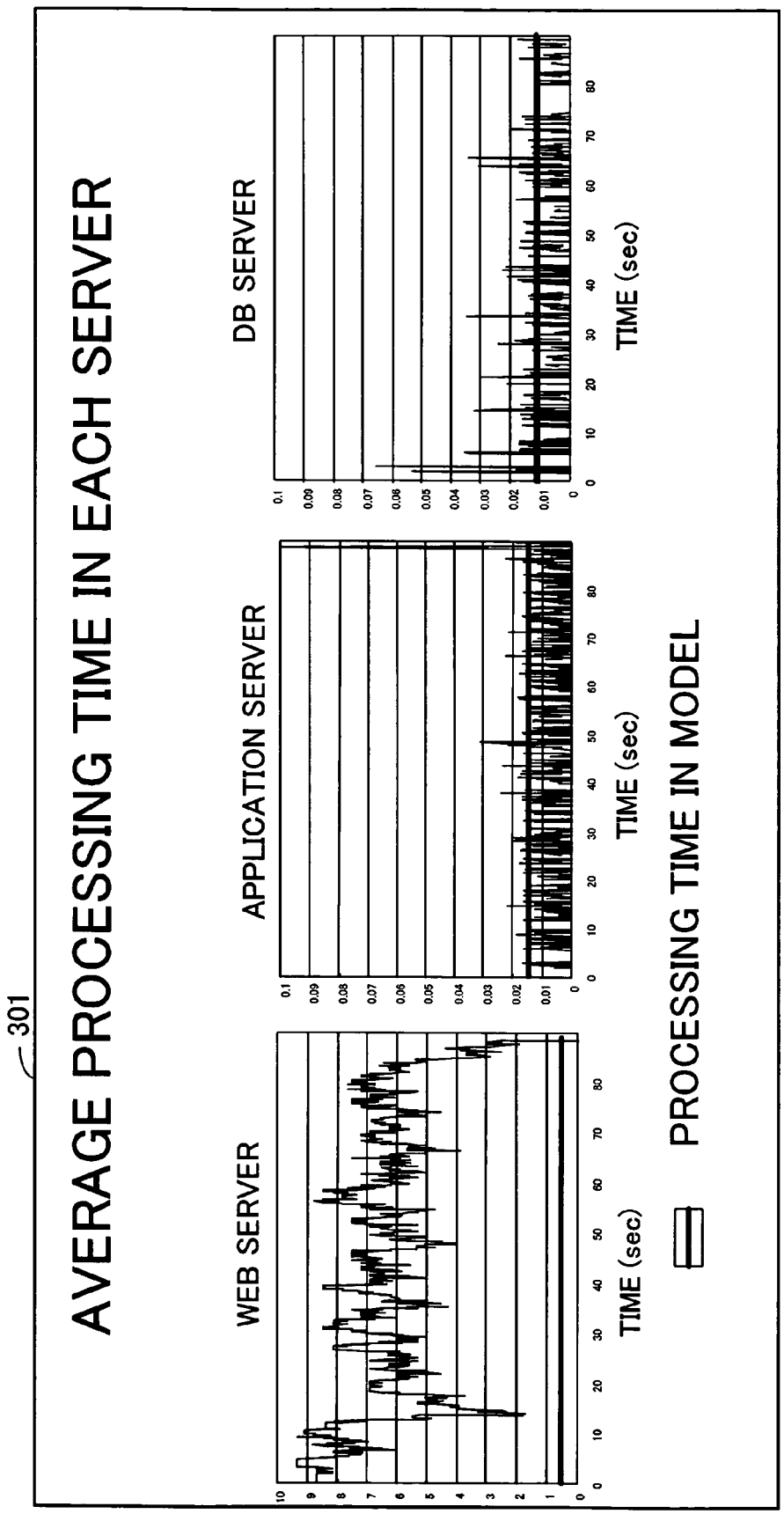
FIG. 35 is a diagram illustrating an example of display of average processing times in each server.

FIG. 35 is a diagram illustrating an example of display of average processing times in each server. The output unit 160 obtains average processing times for each server, and displays on the monitor 11 a screen 301 which indicates the average processing times as illustrated in FIG. 35. The screen 301 contains graphs indicating the processing times in the respective servers. In each graph, a horizontal line indicating a value of the processing time in the corresponding server in a transaction model is displayed. In addition, when the difference of an actual processing time from the model is very great, it is possible to make a list of such processing and display the list on the monitor 11.

Figure 36:
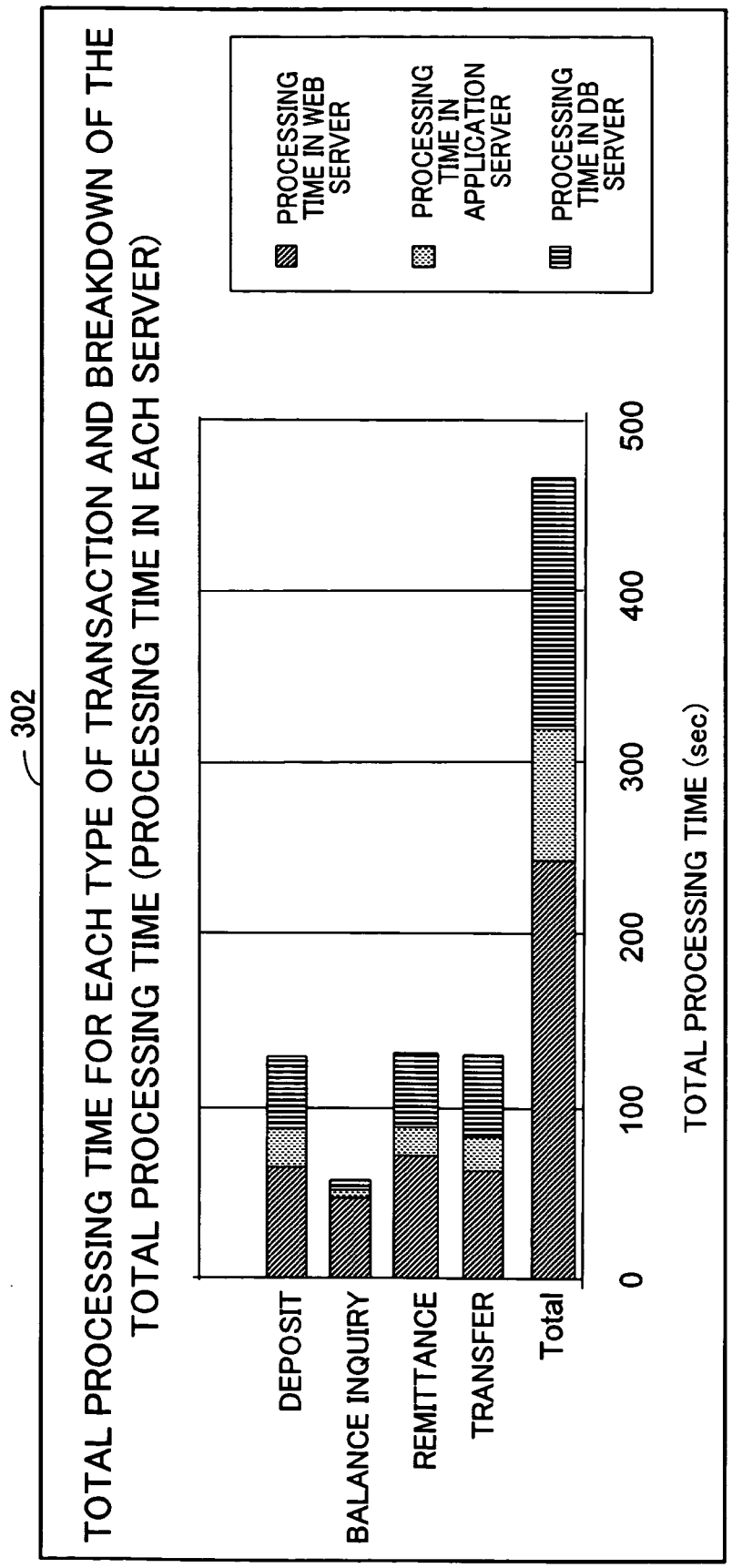
FIG. 36 is a diagram illustrating an example of display of a total processing time for each type of transaction and a breakdown of the total processing time of each type of transaction.

FIG. 36 is a diagram illustrating an example of display of the total processing time for each type of transaction and a breakdown of the total processing time of each type of transaction. In the screen 302 illustrated in FIG. 36, all transactions in a certain time span are summarized, and processing times in the respective servers are indicated.

Figure 37:
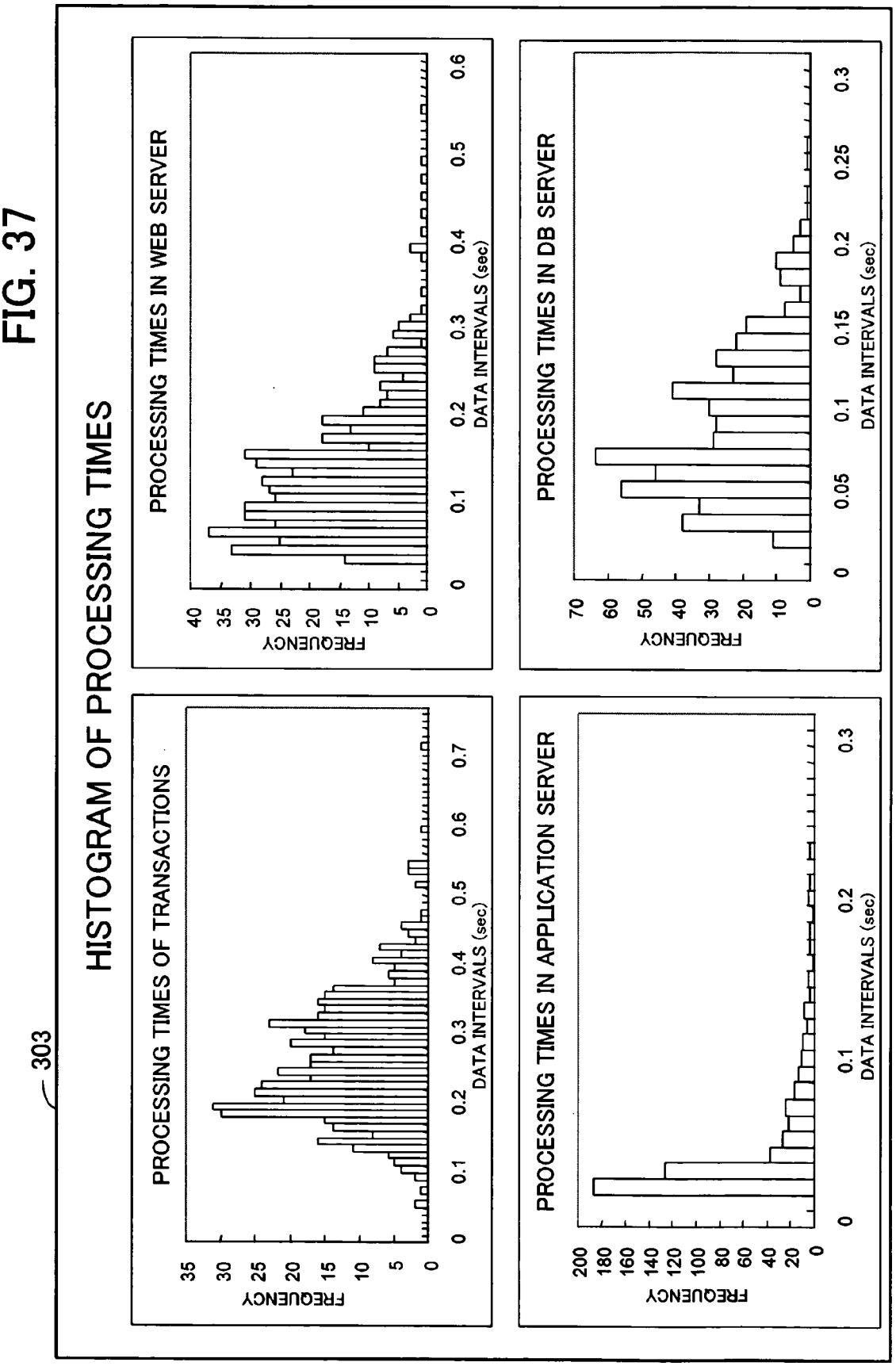
FIG. 37 is a diagram illustrating an example of display of histograms of processing times.

FIG. 37 is a diagram illustrating an example of display of histograms of processing times. In the screen 303 illustrated in FIG. 37, transaction processing times and histograms of processing times are displayed. The histograms are each a bar graph indicating the frequency of each value of the processing time. Since various information including the histograms is concurrently displayed in the screen, it is possible to facilitate analysis of causes of delay in processing.

Figure 38:
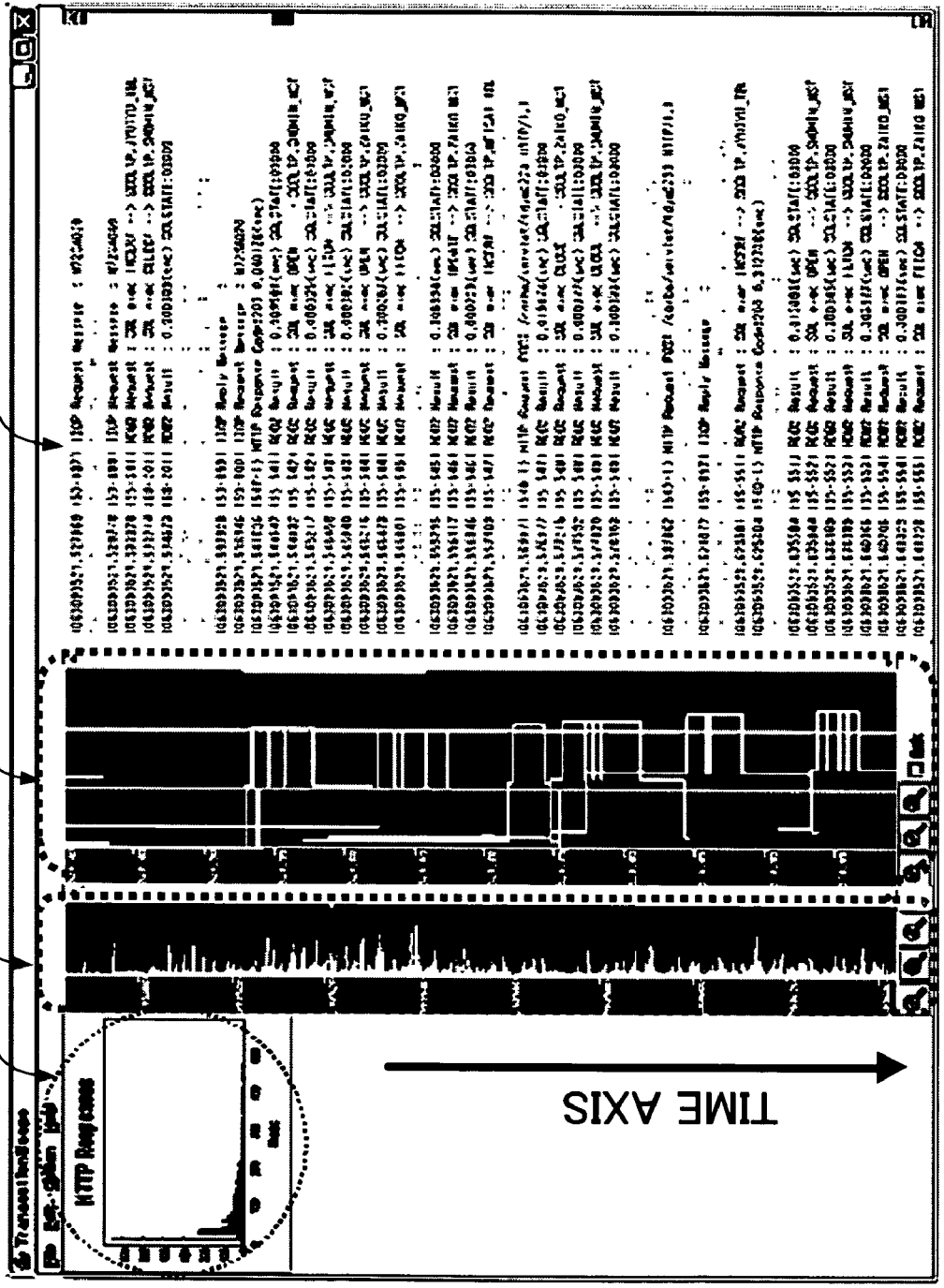
FIG. 38 is a diagram illustrating an example of a screen in which a plurality of information items are concurrently displayed.

FIG. 38 is a diagram illustrating an example of a screen in which a plurality of information items are concurrently displayed. In this example, the screen 310 as illustrated in FIG. 38 is displayed. That is, the screen 310 includes a histogram display area 311, a multiplicity display area 312, a progression-over-time display area 313, and a sequence display area 314. In the histogram display area 311, a histogram of transaction processing times are displayed. In the multiplicity display area 312, the multiplicity of transactions is displayed. In the progression-over-time display area 313, the progression of the transaction processing (variations in the breakdown into portions performed by the web server 31, the application server 32, and the DB server 33) is displayed. In the sequence display area 314, the sequence of transaction messages is displayed. The output unit 160 displays the contents of the histogram display area 311, the multiplicity display area 312, the progression-over-time display area 313, and the sequence display area 314 so that the contents of the respective areas are linked with each other.

Figure 39:
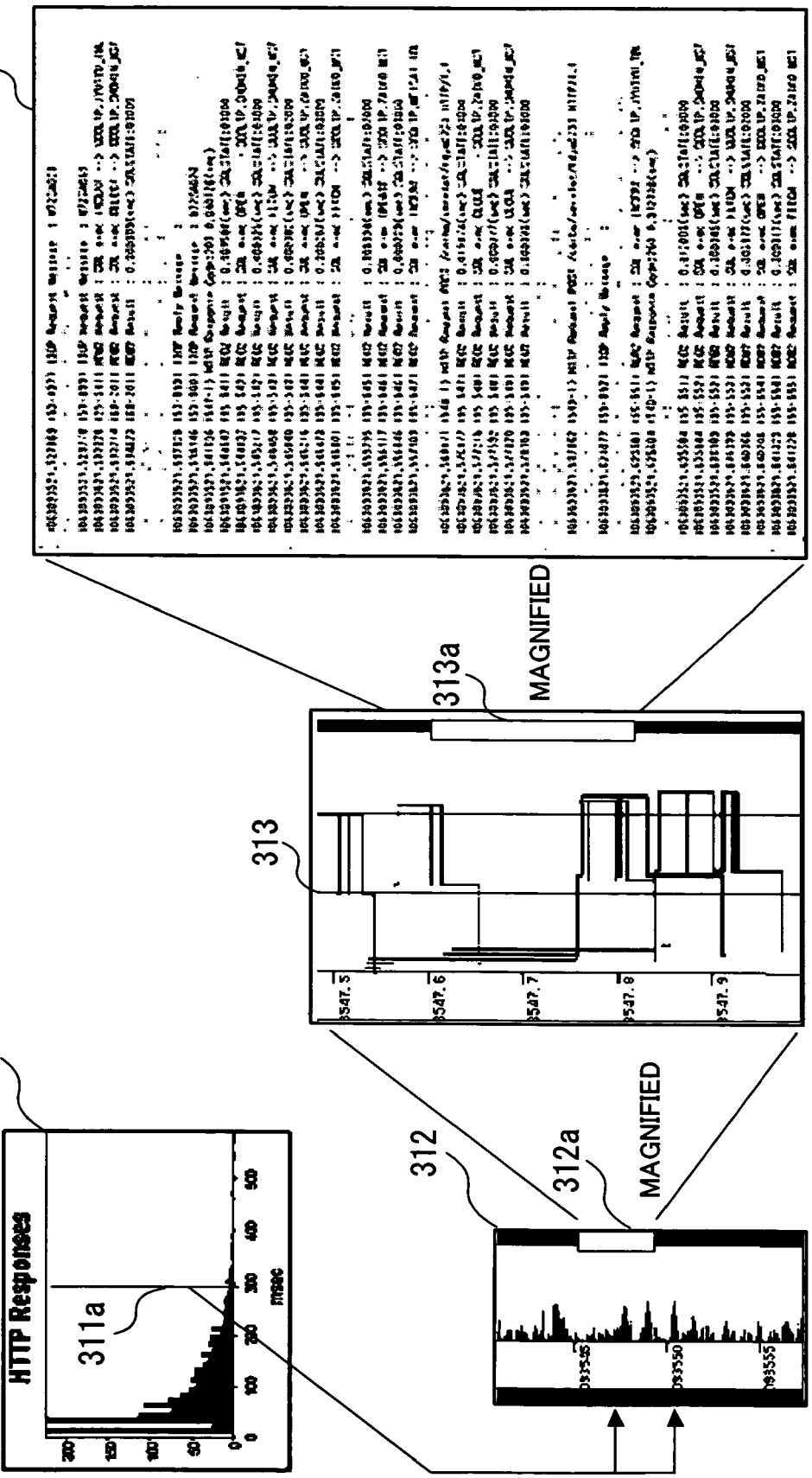
FIG. 39 is a diagram illustrating linkages between elements which are to be displayed.

FIG. 39 is a diagram illustrating linkages between elements which are to be displayed. As illustrated in FIG. 39, a vertical line 311a indicating a threshold value for discrimination of delay in processing. The value of the processing time at which the vertical line 311a is located is the threshold value. The vertical line 311a can be moved in the horizontal direction by a user's manipulation input. The processing for each transaction which has taken time equal to or greater than the threshold value is determined to be processing of interest.

In the example of FIG. 39, the vertical line 311a is located at the processing time of 300 milliseconds. Therefore, each transaction which has taken time equal to or greater than 300 milliseconds is determined to be a transaction of interest.

In the multiplicity display area 312, a time span of a transaction which is classified as a transaction of interest on the histogram display area 311 is highlighted. In addition, a scroll bar 312a is provided on one side of the multiplicity display area 312. Details of transactions in the time span indicated in the scroll bar 312a are displayed in the progression-over-time display area 313.

In the progression-over-time display area 313, exchange of messages between the servers is indicated by a sequence diagram between the servers. In addition, a scroll bar 313a is provided on one side of the progression-over-time display area 313. The contents of messages in the time span indicated in the scroll bar 313a are displayed in the sequence display area 314. In the sequence display area 314, messages related to the transaction of interest are highlighted.

According to the above arrangement, when a user chooses a transaction the processing for which has taken time equal to or greater than a predetermined time, the user can locate the processing of the transaction on the multiplicity display area 312, the progression-over-time display area 313, and the sequence display area 314.

As explained above, according to the first embodiment of the present invention, a provision is made so that a transaction model is generated, and transmission and reception of messages which are performed along the transaction model are detected from among the messages transmitted through the switch 10. Thus, it is possible to identify a set of messages constituting an arbitrary transaction, and analyze the transaction.

Specifically, in the system analysis apparatus 100, communication between applications executed in the respective servers is reconstructed by analyzing data portions of TCP packets captured from the network. In addition, in the system analysis apparatus 100, it is possible to choose a set of messages corresponding to certainly existing caller-called relationships between processes, and extract a transaction which is constituted by sequentially chained processes corresponding to a user's request. Further, it is possible to quickly recognize a performance problem and a bottleneck by tracing processing of the respective applications between a user's request and the corresponding response to the user.

Furthermore, according to the first embodiment, transactions are extracted by external monitoring. Therefore, it is unnecessary for users to add functions to the existing system, or perform change of applications in servers and the like.

Second Embodiment

According to the second embodiment, a provision is made so that a transaction model can be generated by extracting messages constituting a transaction the processing time of which overlaps with a processing time of another transaction.

According to the first embodiment, a transaction model is obtained by extracting only portions of transactions in which the processing time of each transaction does not overlap with the processing time of another transaction (from a client's request to a response), i.e., only nonmultiple portions (with the multiplicity of "1"). Therefore, the first embodiment is effective, for example, in the case where the service with the system to be analyzed can be temporarily halted, and the system can be operated only for acquisition of a model.

However, in the systems which provide services 24 hours, and in which the services cannot be stopped and more than one process is concurrently executed almost all the time, it is difficult to apply the first embodiment. In addition, when the behavior of the system is different according to the multiplicity of processes and the load imposed on the system, it is insufficient to generate a transaction model based on the portions of transactions in which the multiplicity is one. Therefore, it is necessary to generate a transaction model based on portions of transactions in which the multiplicity is more than one as well as the portions of transactions in which the multiplicity is one. Hereinbelow, an example in which a transaction model is generated in such a manner is explained.

The functions of the system analysis apparatus according to the second embodiment are similar to the functions of the first embodiment illustrated in FIG. 4 except for the difference explained below. Therefore, the processing in the second embodiment is also explained with reference to FIG. 4. The second embodiment is different from the first embodiment only in the processing by the model generation unit 140, and the first and second embodiments are identical in the functions of the other elements in FIG. 4. In order to simplify the explanation, the second embodiment is explained by using an example of a transaction which is completed in the application server 32 and the DB server 33. That is, a transaction model is generated based on relationships between IIOP messages and DB messages.

FIG. 40 is a diagram illustrating messages which are inputted into the analysis unit. As illustrated in FIG. 40, the protocol-log record items 401 to 420, which are stored in the protocol-log storage unit 112, are inputted into the model generation unit 140.

The model generation unit 140 analyzes the messages indicated in the protocol log, in accordance with predetermined limiting conditions.

Figure 41:
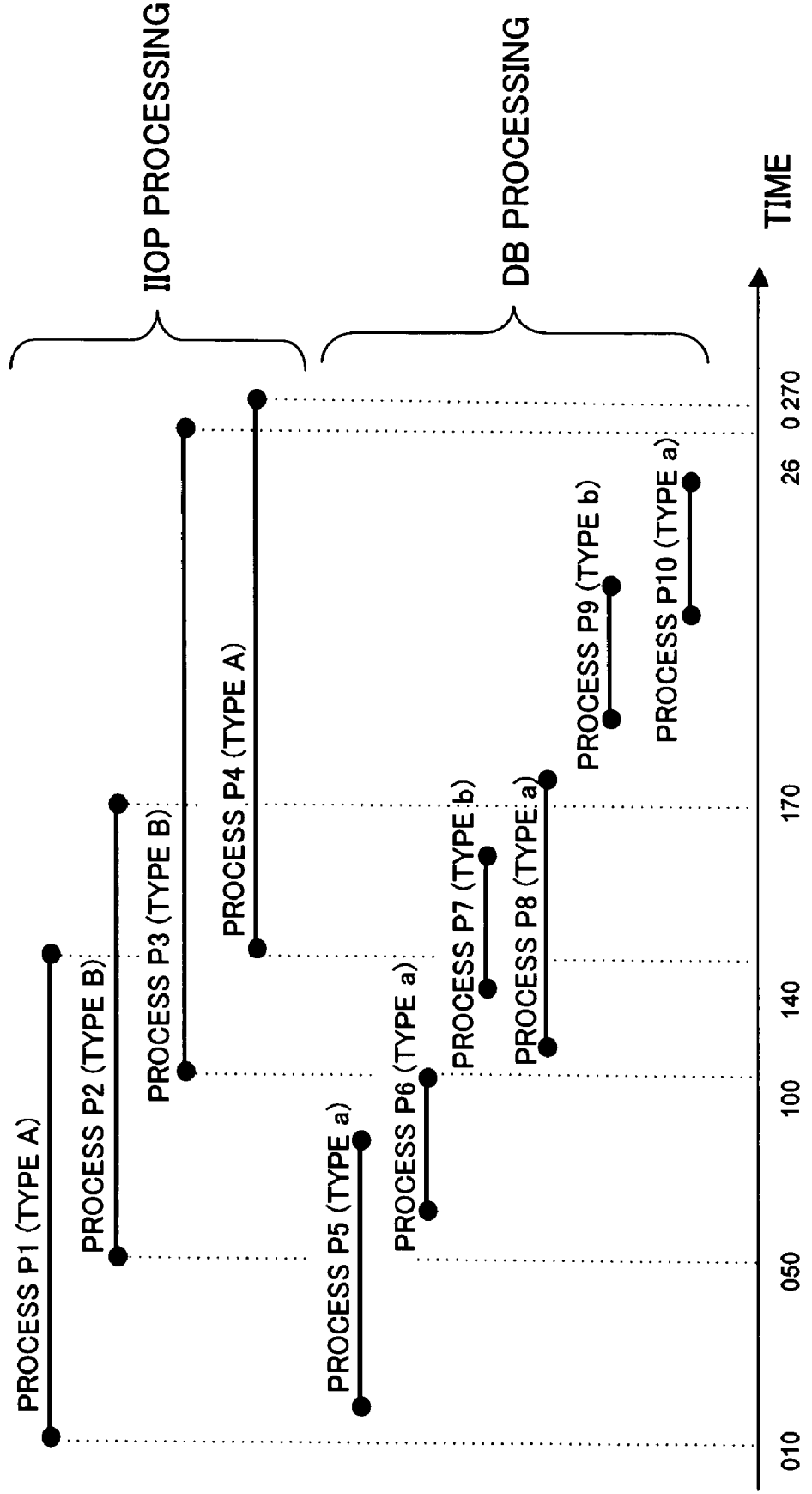
FIG. 41 is a diagram indicating processes which are recognized from messages inputted into a model generation unit.

FIG. 41 is a diagram indicating processes which are recognized from messages inputted into a model generation unit. The model generation unit 140 extracts starts and ends of each process from the messages indicated in the protocol-log record items 401 to 420 illustrated in FIG. 40, and processing time spans are arrayed in chronological order as illustrated in FIG. 41.

The process P1 is recognized from the IIOP messages having the identification numbers "1" and being indicated by the protocol-log record items 401 and 410, the process P2 is recognized from the IIOP messages having the identification numbers "2" and being indicated by the protocol-log record items 403 and 413, the process P3 is recognized from the IIOP messages having the identification numbers "3" and being indicated by the protocol-log record items 407 and 419, and the process P4 is recognized from the IIOP messages having the identification numbers "4" and being indicated by the protocol-log record items 411 and 420.

The process P5 is recognized from the DB messages having the identification numbers "1" and being indicated by the protocol-log record items 402 and 405, the process P6 is recognized from the DB messages having the identification numbers "2" and being indicated by the protocol-log record items 404 and 406, the process P7 is recognized from the DB messages having the identification numbers "4" and being indicated by the protocol-log record items 409 and 412, the process P8 is recognized from the DB messages having the identification numbers "3" and being indicated by the protocol-log record items 408 and 414, the process P9 is recognized from the DB messages having the identification numbers "5" and being indicated by the protocol-log record items 415 and 417, and the process P10 is recognized from the DB messages having the identification numbers "6" and being indicated by the protocol-log record items 416 and 418.

In this example, two types of processes according to the IIOP protocol and two types of processes according to the DB protocol appear. Hereinafter, in order to simplify the explanations, these types of processes are referred to as follows.

Mbalance according to IIOP: Type A
Mdeposit according to IIOP: Type B
Fetch→Account according to DB: Type a
Update→Account according to DB: Type b The processing times of the processes of the respective types in the model can be obtained in a similar manner to the first embodiment. Therefore, in the following explanations, attention is focused on only the caller-called relationships between the processes of the respective types, and the explanations on the method of obtaining the processing times are not repeated.

The limiting conditions in the second embodiment are as follows.

First Limiting Condition: The start time of a first (called) process called by a second (caller) process is after the start time of the second (caller) process, and the finish time of the first (called) process is before the finish time of the second (caller) process.

Second Limiting Condition: IIOP processes are directly called from outside of the system (e.g., from the client 21).

Third Limiting Condition: DB processes are necessarily called from IIOP processes.

The first limiting condition is a basic limiting condition, and requires that when a process X calls a process Y, the process Y is started after the start of the process X, and finished before the finish of the process X. In many cases, an upper limit value or a lower limit value of the difference in the start time (or finish time) between the processes X and Y may be provided, so that the number of possible caller-called relationships can be reduced.

The second limiting condition is widely used in hierarchic systems, and requires that processes at upper levels (on the users' side) call processes at lower levels, but the converse is not true. Specifically, IIOP processes are called from outside of the system which is to be monitored, and DB processes are called by the IIOP process. No other caller-called relationship occurs. For example, no IIOP process calls another IIOP process, and no DB process calls an IIOP process.

It is possible to input an additional limiting condition based on knowledge about the system which is possessed by the monitoring side. For example, the additional limiting condition may be related to the process types, the number or order of calls between groups of the respective process types, or the like. For example, the additional limiting condition is that a certain IIOP process calls a DB process at least once.

Figure 42:
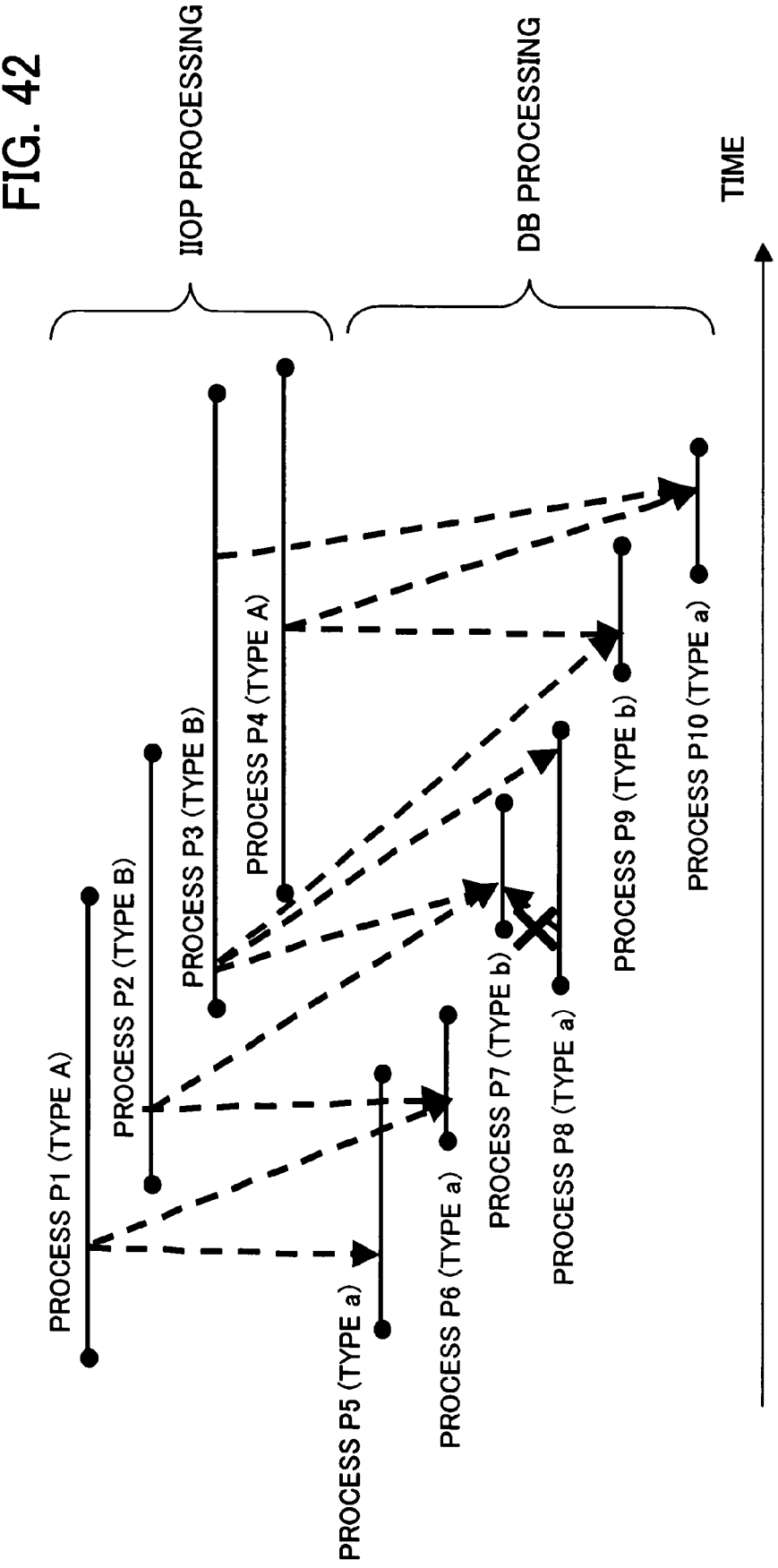
FIG. 42 is a diagram indicating caller-called relationships which satisfy the limiting conditions.

FIG. 42 is a diagram indicating caller-called relationships which satisfy the limiting conditions. That is, the first to third limiting conditions indicate which IIOP process may call which DB process, and the other calls do not satisfy the first to third limiting conditions.

For example, the first limiting condition requires that the processing time span of a process which can call the DB process P5 includes the processing time span of the process P5. In the above example, only the process P1 can call the DB process P5 according to the first limiting condition. On the other hand, according to the first limiting condition, the three processes P2, P3, and P8 can call the process P7. However, the process P8 is a DB process, and according to the second and third limiting conditions, the DB process P8 cannot call the DB process P7. Therefore, the candidates for the caller to the process P7 are narrowed down to the processes P2 and P3.

Next, the numbers of calls from each process type in the above candidates to other process types are calculated. Hereinafter, the number of calls from processes of the type i to processes of another type j is denoted by $M(i, j)$, and a matrix M having the number $M(i, j)$ as an element is referred to as the number-of-calls matrix.

First, the model generation unit 140 initializes the number-of-calls matrix M so that each element satisfying the limiting conditions concerning the caller-called relationships is set to one, and the other elements are set to zero.

FIG. 43 is a diagram illustrating an example of the number-of-calls matrix. Since there are four types of processes in this example, the number-of-calls matrix has sixteen elements. Since the limiting conditions allow only the calls from the IIOP processes to the DB processes, the elements corresponding to the calls from the IIOP processes to the DB processes are set to one, and the twelve other elements are set to zero. This initialization is based on an assumption that the allowed calls corresponding to the respective elements occur with identical frequencies (probabilities) unless other information exists.

Next, the probabilities of the candidates for calls indicated in FIG. 42 are calculated by using the number-of-calls matrix. For example, since the only possible caller to the process P5 is the process P1, the probability of the call from the process P1 to the process P5 is one.

On the other hand, either the process P1 (of the type A) or the process P2 (of the type B) can call the process P6 (of the type a). In such a case, the probability proportional to the value of the element of the number-of-calls matrix indicating the number of calls from the process type of each candidate for a caller to the process type of the called process (the process P6 in the above example) is assigned to the call from the candidate to the called process. In the above example, the number of calls from processes of the type A (such as the process P1) to processes of the type a (such as the process P6) is one, and the number of calls from processes of the type B (such as the process P2) to the processes of the type a (such as the process P6) is also one, as indicated in FIG. 43. Therefore, the probability of a call from each of the processes P1 and P2 to the process P5 is 1/2.

Similarly, the model generation unit 140 obtains the probability of each of candidates for the other calls.

Figure 44:
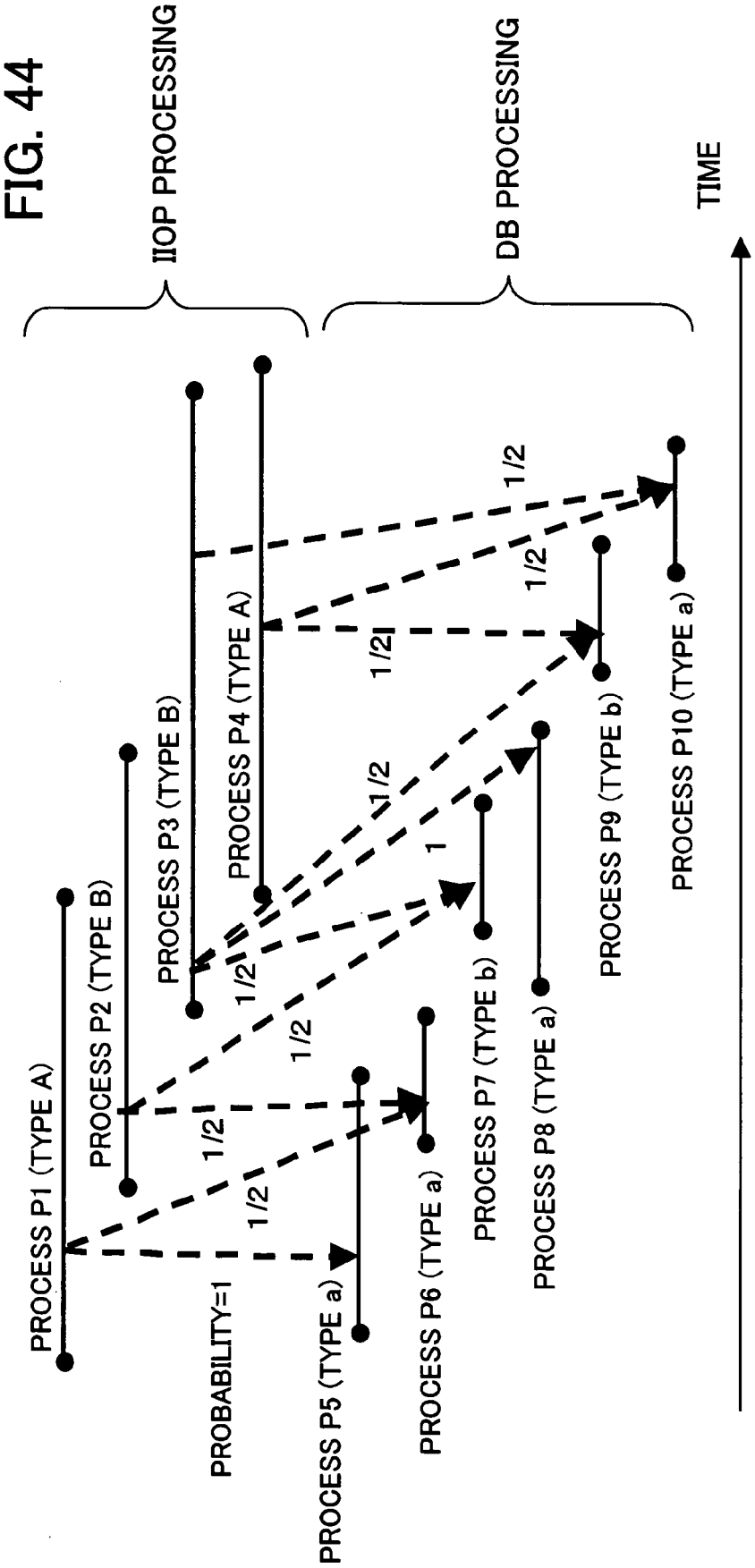
FIG. 44 is a diagram illustrating obtained probabilities of candidates for calls.

FIG. 44 is a diagram illustrating obtained probabilities of candidates for calls. In the number-of-calls matrix indicated in FIG. 43, every element indicating a caller-called relationship which satisfies the limiting conditions is one. Therefore, when a plurality of candidates for a call exist, the probability of each candidate is identical. In this example, the probability of each of the two candidates is 1/2.

Next, the model generation unit 140 updates the values of the number-of-calls matrix by using the above probabilities. Specifically, the number of calls from the process type X to the process type Y can be calculated as a sum of the probabilities of the candidates for calls from the process type X to the process type Y in FIG. 43 divided by the number of calls from processes of the process type X.

For example, the candidates for calls from the process type A to the process type a are a call from the process P1 to the process P5, a call from the process P1 to the process P6, and a call from the process P4 to the process P10, and the probabilities of the call from the process P1 to the process P5, the call from the process P1 to the process P6, and the call from the process P4 to the process P10 are 1, 1/2, and 1/2, respectively. In addition, since the processes of the process type A are the processes P1 and P4, the number of the processes of the process type A is two.

Therefore, the value of the element M(A, a) of the number-of-calls matrix becomes (1+1/2+1/2)/2=1.

Similarly, the model generation unit 140 calculates the other elements of the number-of-calls matrix.

FIG. 45 is a diagram illustrating an example of the number-of-calls matrix after the update. Since the elements of the number-of-calls matrix corresponding to caller-called relationships which are not allowed by the limiting conditions are constantly zero, FIG. 45 shows only the elements of the number-of-calls matrix corresponding to the caller-called relationships which are allowed by the limiting conditions, i.e., only the elements of the number-of-calls matrix corresponding to calls from the processes of the IIOP types to the processes of the DB types.

The calculation of the probabilities of candidates for calls by use of the number-of-calls matrix and the update of the number-of-calls matrix based on the calculated probabilities, as explained above, are repeated until a predetermined condition for completion is satisfied. For example, the predetermined condition for completion is that the number of updating operations reaches a predetermined number. Alternatively, the predetermined condition for completion may be that the amount of change in the matrix elements caused by the update falls below an upper limit value which is preset.

According to the second embodiment, the predetermined condition for completion is that the number of updating operations reaches two. That is, after the probabilities indicated in FIG. 44 are obtained, the model generation unit 140 performs once again the counting of calls and the calculation of the matrix elements. In the second and following operations for updating the number-of-calls matrix, the probabilities of candidates for calls are calculated in the same manner as the first operation for updating the number-of-calls matrix explained with reference to FIG. 44. However, the values of the probabilities obtained in the second updating operation are different from those obtained in the first updating operation, since the probabilities in the second updating operation are calculated based on the number-of-calls matrix of FIG. 45, which is different from the number-of-calls matrix of FIG. 43.

For example, the candidates for calls to the process P9 are a call from the process P3 (of the type B) to the process P9 (of the type b) and a call from the process P4 (of the type A) to the process P9. In the number-of-calls matrix indicated in FIG. 45, the number of calls from the type B to the type b is indicated as 3/4, and the number of calls from the type A to the type b is indicated as 1/4. When the probabilities are assigned to the call from the process P3 to the process P9 and the call from the process P4 to the process P9 so as to be proportional to the above numbers in the number-of-calls matrix, the probability of the call from the process P3 to the process P9 is 3/4, and the probability of the call from the process P4 to the process P9 is 1/4. It should be noted that the sum of these probabilities is one since the process P8 is called one of the processes P3 and P4.

Similarly, the model generation unit 140 calculates the probabilities of the other candidates for calls.

Figure 46:
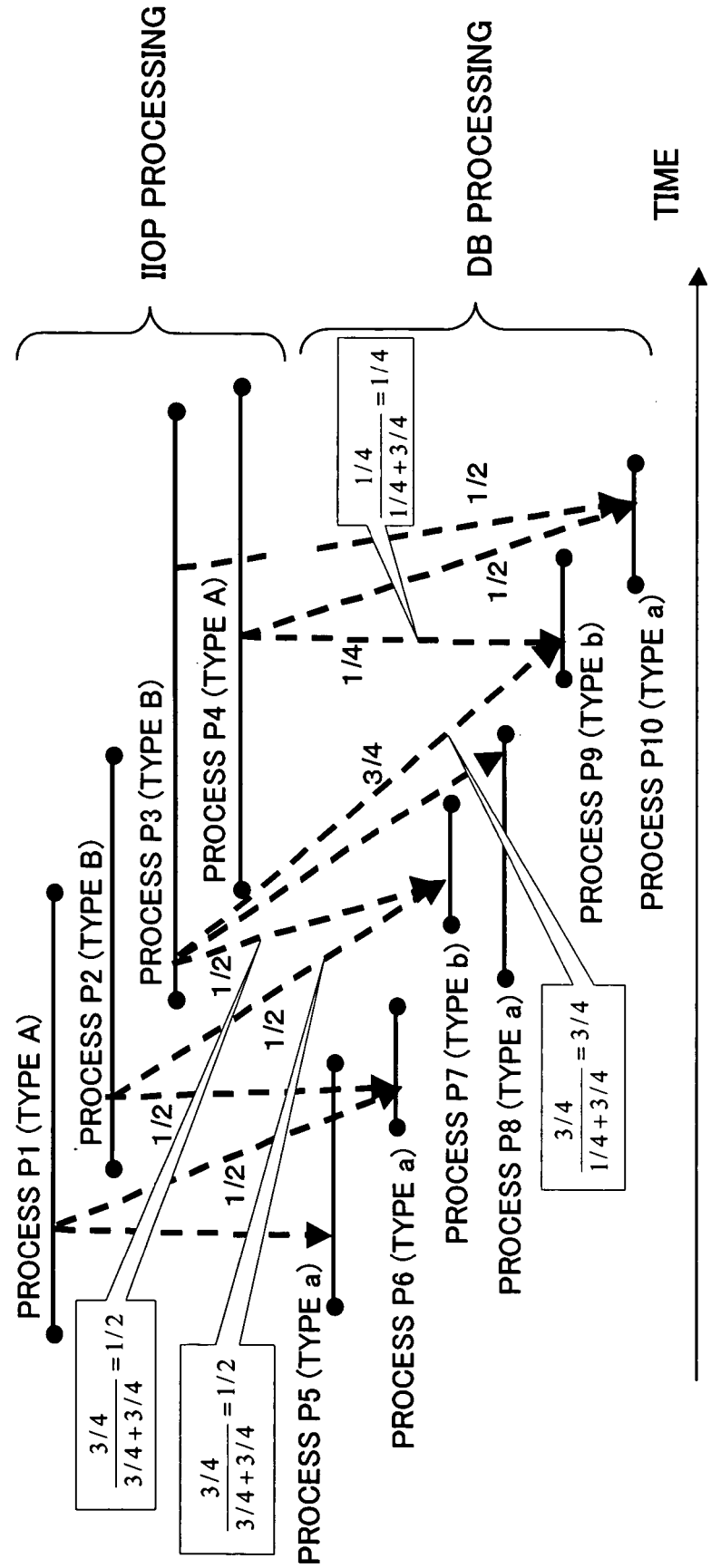
FIG. 46 is a diagram illustrating the probabilities of candidates for calls obtained by the second updating operation.

FIG. 46 is a diagram illustrating the probabilities of candidates for calls obtained by the second updating operation. As indicated in FIG. 46, when a plurality of candidates exist for a call, the probabilities of the candidates are calculated by using as weights the prediction values of the numbers of calls. The number-of-calls matrix is updated based on the probabilities of candidates for calls obtained as above.

FIG. 47 is a diagram illustrating an example of the number-of-calls matrix after the second update. The number of calls is calculated in the same manner as the processing for the first update. Thus, the number-of-calls matrix is updated twice, and the calculation of the probabilities and the processing for the update are completed. Then, the operation goes to the next step.

Next, each element of the number-of-calls matrix having a non-integer value is rounded off to an integer, e.g., to the nearest integer. In the example of FIG. 47, the number of calls from the type A to the type b is 1/8, and is therefore rounded off to zero. In addition, the number of calls from the type B to the type b is 7/8, and is therefore rounded off to one. Since the other elements are integers, the values of the other elements are not changed.

Figure 48:
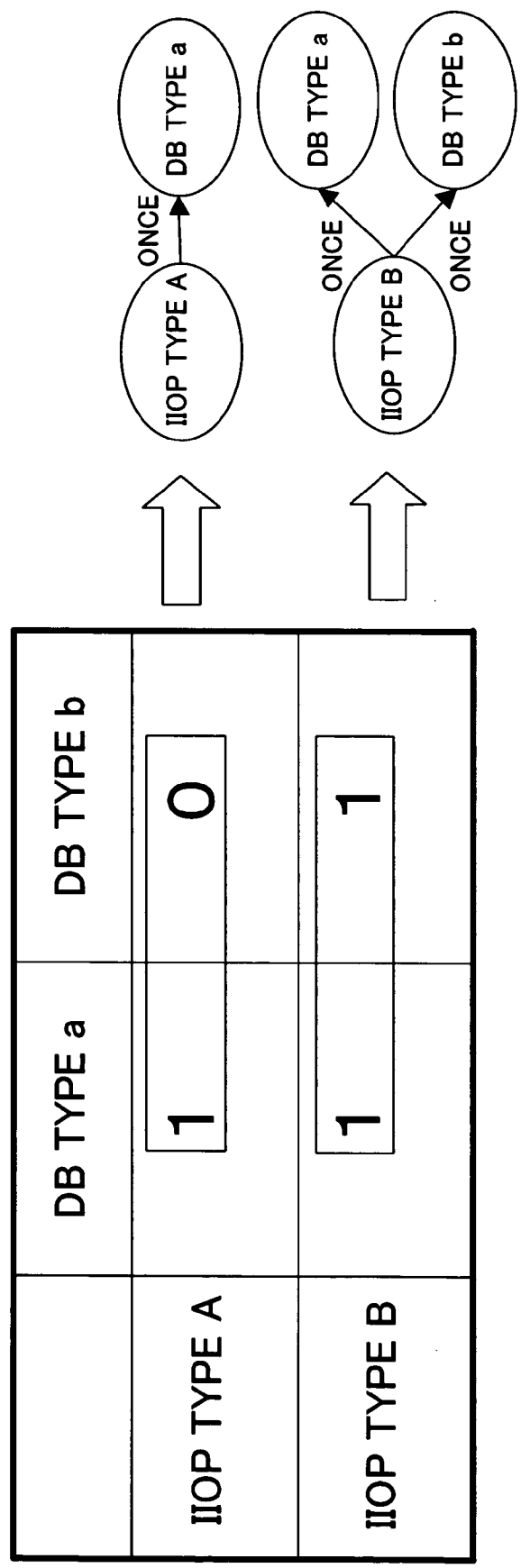
FIG. 48 is a diagram illustrating a number-of-calls matrix and a generated transaction model which are finally obtained.

FIG. 48 is a diagram illustrating a number-of-calls matrix and a generated transaction model which are finally obtained. The model generation unit 140 obtains a transaction model indicating caller-called relationships between the process types, based on the number-of-calls matrix the elements of which are rounded off as indicated in FIG. 48. That is, the number-of-calls matrix indicates that IIOP processes of the process type A call DB processes of the process type a once, and IIOP processes of the process type B call DB processes of each of the process types a and b once.

In other words, each caller-called relationship corresponding to an element of the number-of-calls matrix having the value "1" occurs with high probability. Therefore, the model generation unit 140 generates transaction models 431 and 432 which are recognized from the caller-called relationships corresponding to elements of the number-of-calls matrix each having the value "1," and stores the transaction models 431 and 432 in the model storage unit 113.

The operations explained above are summarized as follows.

Figure 49:
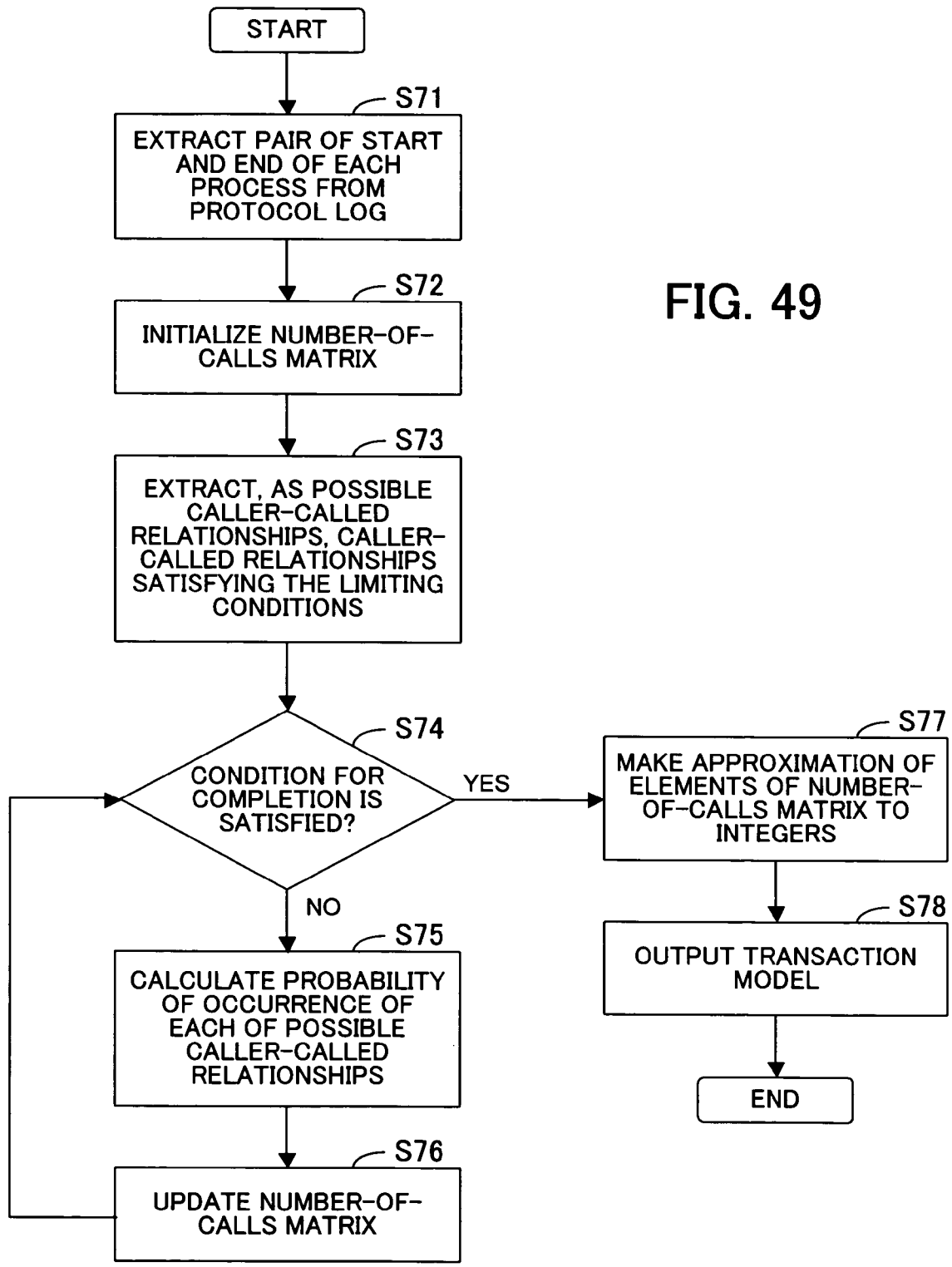
FIG. 49 is a flow diagram indicating a sequence of processing for generating a transaction model in a second embodiment.

FIG. 49 is a flow diagram indicating a sequence of processing for generating a transaction model in the second embodiment. The processing illustrated in FIG. 49 is explained below step by step.

[Step S71] The model generation unit 140 extracts a pair of a start and a finish of each process from the protocol log.

[Step S72] The model generation unit 140 initializes the number-of-calls matrix. At this time, the elements corresponding to caller-called relationships which do not satisfy the limiting conditions are set to zero.

[Step S73] The model generation unit 140 extracts, as possible caller-called relationships, caller-called relationships between processes which satisfy the limiting conditions.

[Step S74] The model generation unit 140 determines whether or not the condition for completion is satisfied. When yes is determined, the operation goes to step S77. When no is determined, the operation goes to step S75.

[Step S75] The model generation unit 140 calculates the probability of occurrence of each of the possible caller-called relationships so as to be proportional to the value of the corresponding element of the number-of-calls matrix.

[Step S76] The model generation unit 140 updates the number-of-calls matrix by calculating an average of the probabilities of caller-called relationships for each combination of the process types of a caller process and a called process. Thereafter, the operation goes to step S74.

[Step S77] The model generation unit 140 makes approximation of the elements of the number-of-calls matrix to integers.

[Step S78] The model generation unit 140 outputs a transaction model in which the number of calls for each combination of the process types of a caller process and a called process is determined by the value of each nonzero element of the number-of-calls matrix.

As explained above, even when plural transactions are concurrently processed, the second embodiment makes it possible to generate a transaction model by iteratively updating the frequencies of calles from process types. In addition, the amount of calculation for generation of the transaction model is relatively small.

Third Embodiment

In the method according to the second embodiment, the averages of the numbers of calls between different process types are used. Therefore, it is impossible to discriminate whether a certain type of caller process calls a different type of process once with probability 1, or the caller process calls the called process twice with probability 1/2. Consequently, in some cases, it is impossible to perform learning so as to generate an appropriate transaction model. This problem can occur in the case where calls from a certain process type can occur in plural ways. This problem can be solved by obtaining the probability of a set of all processes called by processes of a certain process type or the probability of the order of the processes in the set, instead of obtaining the average frequencies between respective process types as possible caller-called relationships. Hereinbelow, a method for generating a model in this manner is explained as the third embodiment.

The functions of the system analysis apparatus according to the third embodiment are also similar to the functions of the first embodiment illustrated in FIG. 4 except for the difference explained below. Therefore, the processing in the third embodiment is explained with reference to FIG. 4. The third embodiment is different from the first embodiment only in the processing by the model generation unit 140, and the first and third embodiments are identical in the functions of the other elements in FIG. 4. In order to simplify the explanation, the third embodiment is explained by using an example of a transaction which is completed in the application server 32 and the DB server 33. That is, a transaction model is generated based on relationships between IIOP messages and DB messages.

It is assumed that the series of messages indicated in FIG. 40 and the aforementioned limiting conditions are inputted into the model generation unit 140.

First, the model generation unit 140 obtains possible caller-called relationships between respective processes as in the second embodiment. Thus, the result as illustrated in FIG. 42 is obtained.

Next, the model generation unit 140 obtains a possible ordered set of processes called by each process. For example, it is possible to obtain a possible ordered set of processes called by the process P1. (Such a possible set of processes is hereinafter referred to as a process-set candidate.)

When the caller-called relationships indicated in FIG. 42 are analyzed, it is found that the processes which can be called by the process P1 are the processes P5 and P6. (Hereinafter, a set of processes called by the process P1 is referred to as a set U.) Since the process P5 cannot be called by the processes other than the process P1, the process P5 is necessarily belongs to the set U. On the other hand, since the process P6 can also be called by the process P2, the process P6 may or may not belong to the set U. Further, since the process P5 starts before the start of the process P6, the following sets U11 and U12 can be considered to be candidates for the set U.

U11: {process P5}
U12: {process P5, process P6}

In the description of each set of processes, the processes are indicated from left to right in the order in which the processes are called. At this stage, there is no information which can be used for determining which candidate is more likely. Therefore, the likelihoods of the two sets U11 and U22 are assumed to be identical, i.e., 1/2.

Next, the process-set candidates U11 and U12 are expressed in terms of the process types of their elements, and patterns of processes called by the process P1, i.e., candidates for an ordered set of called process types, are generated. Since the process types of the processes P5 and P6 are both a, the process-set candidates U11 and U12 can be converted into the following expressions.

U11: pattern {a}
U12: pattern {a, a}

These expression based on process types are refered as patterns of processes, or patterns for simplicity.

The latter process-set candidate U12 corresponds to a possibility that the process P1 calls processes of the same process type successively twice.

Then, the likelihood of each pattern is calculated based on the likelihood of the process-set candidate based on which the pattern is generated. Since, in this case, different patterns are generated from the process-set candidates U11 and U12, the likelihoods of the process-set candidates U11 and U12 are assigned to the corresponding patterns, respectively. That is, in this case, the likelihoods of the two patterns are both set to 1/2.

Thus, the possible patterns of process types called by the process P1 and the likelihoods of the possible patterns become as follows.

pattern {a}: likelihood 1/2
pattern {a, a}: likelihood 1/2

The second pattern indicates a pattern in which the process P1 calls processes of the same process type a are called successively twice. Similarly, the model generation unit 140 also obtains possible patterns of process types called by other processes and the likelihoods of the possible patterns.

The processes which can be called by the process P2 are the processes P6 and P7. Since each of the processes P6 and P7 can also be called by another process, the process-set candidates of processes called by the process P2 are as follows.

U21: { }
U22: {process P6}
U23: {process P7}
U24: {process P6, process P7}

As in the case of the process-set candidates of processes called by the process P1, the likelihoods of the process-set candidates called by the process P2 are assumed to be identical, i.e., 1/4.

Since the process types of the processes P6 and P7 are a and b, respectively, the possible patterns of process types called by the process P2 and the likelihoods of the possible patterns become as follows.

pattern { }: likelihood 1/4
pattern {a}: likelihood 1/4
pattern {b}: likelihood 1/4
pattern {a, b}: likelihood 1/4

In the last pattern {a, b}, a process of the process type a is first called, and then a process of the process type b is called.

Alternatively, each pattern may be defined by only the number of calls for each process type of called processes regardless of the order of processes.

Regarding the processes called by the process P3, attention is necessary as explained below. The process which is necessarily called by the process P3 is the process P8, and the processes which can be called by each of the process P8 and another process are the processes P7, P9, and P10. Therefore, the process-set candidates called by the process P3 are as follows.

{process P8}
{process P8, process P7}
{process P8, process P9}
{process P8, process P10}
{process P8, process P7, process P9}
{process P8, process P7, process P10}
{process P8, process P9, process P10}
{process P8, process P7, process P9, process P10}

The likelihoods of the process-set candidates of processes called by the process P3 are identical, i.e., 1/8. Based on the above process-set candidates, possible patterns of process types called by the process P3 and the likelihoods of the possible patterns are calculated.

Since both of the processes P7 and P9 are type b processes, an identical pattern {a, b} is generated from each of the process-set candidates {process P8, process P7} and {process P8, process P9}. Similarly, an identical pattern {a, b, c} is generated from each of the process-set candidates {process P8, process P7, process P10} and {process P8, process P9, process P10}. In these cases, the likelihoods of the patterns are obtained by calculating a sum of the likelihoods of the corresponding process-set candidates, as indicated below.

pattern {a}: likelihood 1/8
pattern {a, b}: likelihood 1/8
pattern {a, a}: likelihood 1/8
pattern {a, b, b}: likelihood 1/8
pattern {a, b, a}: likelihood 1/8
pattern {a, b, b, a}: likelihood 1/8

Similarly, patterns of process types called by the process P4 and the likelihoods of the candidates are obtained as indicated below.

pattern { }: likelihood 1/4
pattern {b}: likelihood 1/4
pattern {a}: likelihood 1/4
pattern {b, a}: likelihood 1/4

Next, patterns of process types called by processes of each process type and the probabilities of the patterns are obtained by calculating averages of the aforementioned patterns of process types called by each process and the likelihoods of the patterns of process types called by each process which are obtained before.

First, the average of the likelihoods of the possible patterns of process types called by processes of the type A is calculated. Since the processes P1 and P4 belong to the type A, the average of the likelihoods of the possible patterns of process types called by processes P1 and P4 is calculated. For example, since the likelihood of the pattern {a} is 1/2 in the case where processes are called by the process P1, and 1/4 in the case where processes are called by the process P4, the probability of occurrence of a call corresponding to this pattern is the average of these likelihoods, i.e., 3/8. On the other hand, the likelihood of the pattern {a, a} is 1/2 in the case where processes are called by the process P1. However, the pattern {a, a} is not included in the aforementioned possible patterns of process types called by the process P4. Therefore, the likelihood of the pattern {a, a} is 0 in the case where processes are called by the process P4. Thus, the probability of occurrence of calls corresponding to the pattern {a, a} is the average of the above likelihoods 1/2 and 0, i.e., 1/4.

FIG. 50 is a first diagram illustrating patterns of calls from processes of the process type A and the probabilities of the patterns. As indicated in FIG. 50, the probability of the pattern A1 ({ }) is (0+1/4)/2=1/8, the probability of the pattern A2 ({b}) is (0+1/4)/2=1/8, the probability of the pattern A3 ({a}) is (1/2+1/4)/2=3/8, the probability of the pattern A4 ({a, a}) is (1/2+0)/2=1/4, and the probability of the pattern A5 ({b, a}) is (0+1/4)/2=1/8.

Similarly, the average of the likelihoods of the possible patterns of process types called by processes of the type B is calculated. Since the processes P2 and P3 belong to the type B, the average of the likelihoods of the possible patterns of process types called by processes P2 and P3 is calculated as indicated below.

FIG. 51 is a first diagram illustrating patterns of calls from processes of the process type B and the probabilities of the patterns. As indicated in FIG. 51, the probability of the pattern B1 ({ }) is (1/4+0)/2=1/8, the probability of the pattern B2 ({a}) is (1/4+1/8)/2=3/16, the probability of the pattern B3 ({b}) is (1/4+0)/2=1/8, the probability of the pattern B4 ({a, b}) is (1/4+1/4)/2=1/4, the probability of the pattern B5 ({a, a}) is (0+1/8)/2=1/16, the probability of the pattern B6 ({a, b}) is (0+1/8)/2=1/16, the probability of the pattern B7 ({a, b, a}) is (0+1/4)/2=1/8, and the probability of the pattern B8 ({a, b, b, a}) is (0+1/8)/2=1/16.

Thereafter, by using the above patterns of calls from processes of each process type, the possible sets of processes called by each process (process-set candidates) and the likelihoods of the process-set candidates are calculated again.

First, processes called by the process P1 are considered.

The process-set candidates of calls from the process P1 are exactly the same as indicated before. That is, U11: (process P5), and
U12: (process P5, process P6).

The likelihoods of the above process-set candidates are assumed to be identical before since there is no information for determining which process-set candidate is more likely. However, this time, it is possible to use the probabilities of the patterns of calls from the respective process types indicated in FIGS. 50 and 51 as the information for determining which process-set candidate is more likely.

However, in order to determine the likelihoods of the process-set candidates U11 and U12, it is necessary to consider not only the likelihoods of the patterns of calls from the process P1, but also the likelihoods of patterns of calls from other processes which can be influenced by which of the process-set candidates U11 and U12 is chosen.

The difference between the process-set candidates U11 and U12 is whether or not the process P6 is called by the process P1. Since the process P6 is called by the process P1 or P2, for example, the choice of the process-set candidate U11 means not only that the process P6 is not called by the process P1, but also means that the process P6 is called by the process P2. Therefore, when the likelihood of the process-set candidate U11 is calculated, it is necessary to consider to what degree the choice of calls from the process P2 is limited.

In the case of the process-set candidate U11, the corresponding pattern of calls from the process P1 (i.e., the process type A) is the pattern A3, and the probability of this pattern is 3/8. On the other hand, in the case of the process-set candidate U12, the corresponding pattern is the pattern A4, and the probability of this pattern is 1/4. However, at this time, the likelihoods of the process-set candidates U11 and U12 are not used as they are, and it is considered how the patterns of calls from the other processes are limited by the likelihoods of the process-set candidates U11 and U12.

That is, when a call from the process P1 corresponds to the process-set candidate U11, the process P6 is not called by the process P1, and the process P6 is necessarily called by the other process, i.e., the process P2. Therefore, the sets of processes called by the process P2 must be {process P6} and {process P6, process P7}.

Since the process types of processes P6 and P7 are respectively a and b, the above sets {process P6} and {process P6, process P7} respectively correspond to the patterns B2 and B4 of process types, and the probabilities of the patterns B2 and B4 are respectively 3/16 and 1/4. Therefore, it is possible to estimate the probability on the P2 side to be the sum of the probabilities of the patterns B2 and B4, i.e., 7/16. Thus, it is possible to estimate the likelihood of the process-set candidate U11 to be the product of the probability, 3/8, of the aforementioned pattern A3 (corresponding to the process-set candidate U11) and the above probability, 7/16, based on the limitations on the P2 side. That is, the likelihood of the process-set candidate U11 is estimated to be 21/128.

On the other hand, in the case of the process-set candidate U12, the process P6 is called by the process P1. Therefore, the possible sets of processes called by the process P2 are be { } and {process P7}, and the corresponding patterns of process types of calls from the process P2 are B1 and B3, and the probability of each of these patterns is 1/8. Thus, it is possible to estimate the likelihood of the process-set candidate U12 to be 1/4×(1/8+1/8)=1/16=8/128.

Since the actual call corresponds to either of the process-set candidates U11 and U12, the likelihoods are normalized so that the sum of the likelihoods of the process-set candidates U11 and U12 becomes one. Thus, the likelihoods of the process-set candidates U11 and U12 finally becomes as follows by normalization.

U11: {process P5} likelihood 21/29
U12: {process P5, process P6} likelihood 8/29

That is, it is estimated that the process-set candidate U11 is more likely.

Then, as mentioned before, the above process-set candidates U11 and U12 can be converted into the following expressions.

pattern {a} likelihood 21/29
pattern {a, a} likelihood 8/29

Further, in a similar manner to the above case, the likelihoods of possible sets of processes called by each of the processes P2, P3, and P4 are calculated, and the likelihoods of patterns of process types called by each process type are calculated based on the likelihoods of possible sets of processes P2, P3, and P4 as indicated below.

The obtained likelihoods of the patterns of process types called by the process P2 are as follows.

pattern { }: likelihood 4/33
pattern {a}: likelihood 9/33
pattern {b}: likelihood 5/33
pattern {a, b}: likelihood 15/33

The obtained likelihoods of the patterns of process types called by the process P3 are as follows.

pattern {a}: likelihood 18/101
pattern {a, b}: likelihood 46/101
pattern {a, a}: likelihood 6/101
pattern {a, b, b}: likelihood 15/101
pattern {a, b, a}: likelihood 11/101
pattern {a, b, b, a}: likelihood 5/101

The obtained likelihoods of the patterns of process types called by the process P4 are as follows.

pattern { }: likelihood 3/28
pattern {b}: likelihood 3/28
pattern {a}: likelihood 15/28
pattern {b, a}: likelihood 7/28

Next, in a similar manner to the aforementioned case, patterns of process types called by processes of each process type and the probabilities of the patterns are obtained by calculating averages of the above-mentioned patterns of process types called by each process and the likelihoods of the patterns of process types called by each process.

FIG. 52 is a second diagram illustrating patterns of calls from processes of the process type A and the probabilities of the patterns. As indicated in FIG. 52, the probability of the pattern A1 ({ }) is 87/1624=0.054, the probability of the pattern A2 ({b}) is 87/1624=0.054, the probability of the pattern A3 ({a}) is 1023/1624=0.630, the probability of the pattern A4 ({a, a}) is 224/1624=0.138, and the probability of the pattern A5 ({b, a}) is 203/1624=0.125.

Similarly, the average of the likelihoods of the possible patterns of process types called by processes of the type B is calculated. Since the processes P2 and P3 belong to the type B, the average of the likelihoods of the possible patterns of process types called by processes P2 and P3 is calculated as indicated below.

FIG. 53 is a second diagram illustrating patterns of calls from processes of the process type B and the probabilities of the patterns. As indicated in FIG. 53, the probability of the pattern B1 ({ }) is 404/6666=0.061, the probability of the pattern B2 ({a}) is 1503/6666=0.225, the probability of the pattern B3 ({b}) is 505/6666=0.076, the probability of the pattern B4 ({a, b}) is 3033/6666=0.455, the probability of the pattern B5 ({a, a}) is 198/6666=0.030, the probability of the pattern B6 ({a, b, b}) is 495/6666=0.074, the probability of the pattern B7 ({a, b, a}) is 363/6666=0.054, and the probability of the pattern B8 ({a, b, b, a}) is 165/6666=0.025.

The determination of the sets of processes called by each process, the calculation of the likelihoods of the sets of processes, the determination of the patterns of calls from each process type, and the calculation of the probabilities of the patterns are repeated until a predetermined condition for completion is satisfied. For example, the predetermined condition for completion is related to the number of repetition, an upper limit value of the amount of change in the probability of each pattern, or the like, as in the second embodiment.

When the condition for completion is satisfied in the state indicated in FIGS. 52 and 53, the model generation unit 140 generates a model based on the patterns of calls indicated in FIGS. 52 and 53 and the probabilities of the patterns. At this time, a model having a too small probability is not reliable. Therefore, patterns which are adopted in the model are chosen from among possible patterns of calls from processes of each type in descending order of probability by using an upper limit of the number of choices and a lower limit of the probability.

For example, when the upper limit of the number of choices is two, and the lower limit of the probability is 0.1, the patterns A3 and A4 are chosen for caller processes of the process type A in a model, and the patterns B4 and B2 are chosen for caller processes of the process type B in the model. In the final model, only the chosen patterns are used, and the probabilities are normalized so that the sum of the probabilities becomes one.

FIG. 54 is a diagram illustrating a result of generation of a model. In the example of FIG. 54, two transaction models 441 and 442 are generated for IIOP caller processes of the process type A. The probability of the transaction model 441 is 0.82 (=0.630/(0.630+0.138)), and the probability of the transaction model 442 is 0.18 (=0.138/(0.630+0.138)). In addition, two transaction models 443 and 444 are generated for IIOP caller processes of the process type B. The probability of the transaction model 443 is 0.80 (=0.574/(0.574+0.142)), and the probability of the transaction model 444 is 0.20 (=0.142/(0.574+0.142)).

The operations explained above are summarized as follows.

Figure 55:
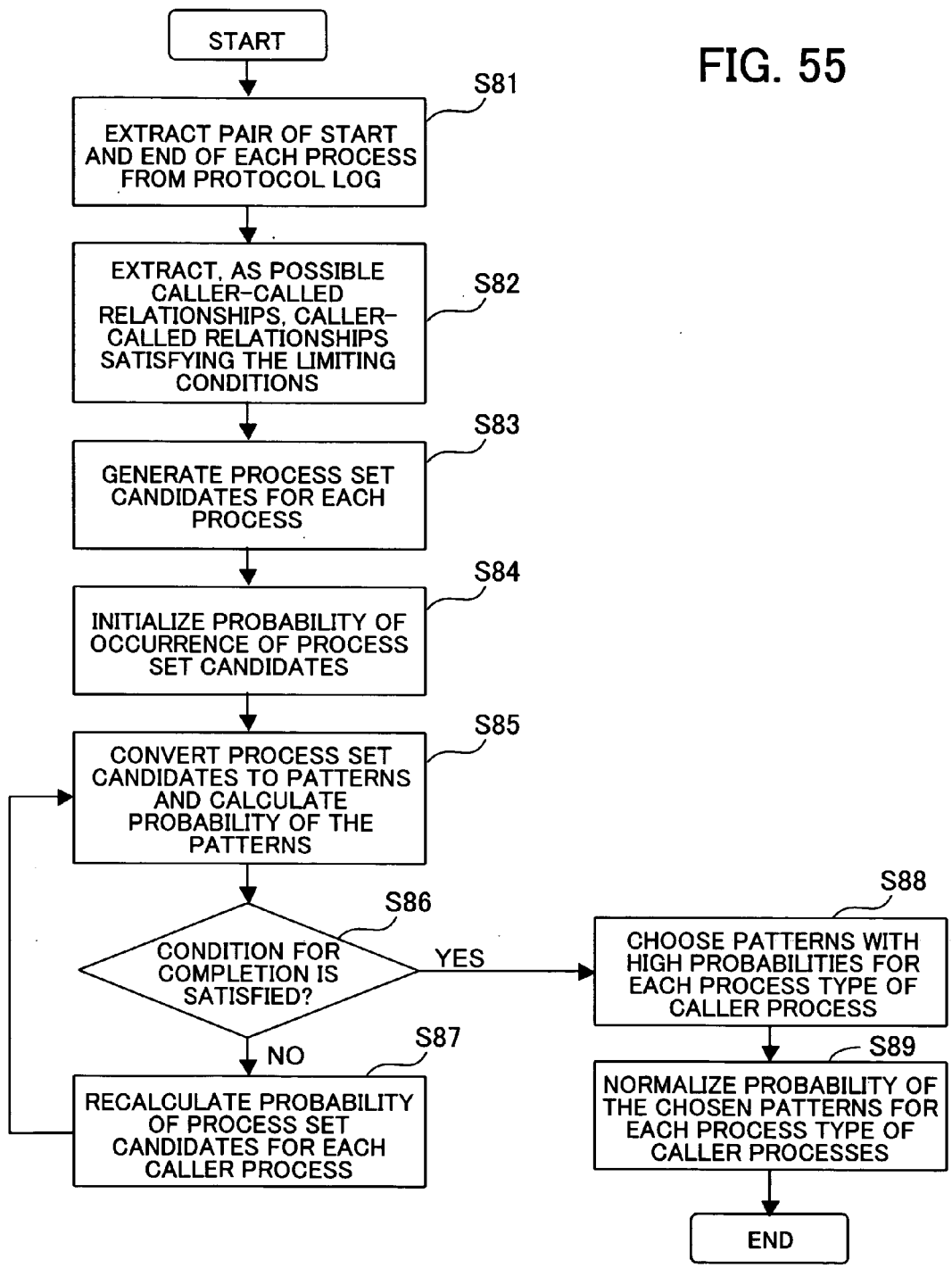
FIG. 55 is a flow diagram indicating a sequence of processing for generating a transaction model in a third embodiment.

FIG. 55 is a flow diagram indicating a sequence of processing for generating a transaction model in the third embodiment. The processing illustrated in FIG. 55 is explained below step by step.

[Step S81] The model generation unit 140 extracts a pair of a start and a finish of each process from the protocol log.

[Step S82] The model generation unit 140 extracts, as possible caller-called relationships, caller-called relationships between processes which satisfy the limiting conditions.

[Step S83] The model generation unit 140 generates process set candidates for each (caller) process from the caller-called relationships.

[Step S84] The model generation unit 140 initializes the probability of occurrence of the process set candidates. Specifically, the model generation unit 140 assigns a uniform probability to each candidate for a certain caller process.

[Step S85] The model generation unit 140 converts the process set candidates to patterns expressed by process types. The model generation unit 140 also calculates the probabilities of the patterns from the probabilities of the corresponding process set candidates.

[Step S86] The model generation unit 140 determines whether or not a condition for completion is satisfied. When yes is determined, the operation goes to step S88. When no is determined, the operation goes to step S87.

[Step S87] The model generation unit 140 recalculates the probability of the process set candidates for each caller process based on the probabilities of the patterns, and thereafter the operation goes to step S85.

[Step S88] The model generation unit 140 chooses the patterns with high probabilities for each process type of caller process as a transaction model by the predetermined conditions (e.g., having a probability higher than a predetermined value).

[Step S89] The model generation unit 140 normalizes the probability of the chosen patterns for each process type of caller processes, and thereafter the processing of FIG. 55 is completed.

As explained above, the third embodiment generates plural patterns for one process type and iteratively updates their occurrence probabilities. Thus, even when there are plural possible patterns of processes for a certain process type of callers, it is possible to generate an appropriate model.

However, when the multiplicity of concurrent transactions is great, the above method tends to generate too many patterns and this makes computational complexity too large. However, the amount of the complexity can be reduced in the following way.

According to the third embodiment, a transaction model is generated by updating probabilities of patterns a certain number of cycles, and by removing less probable ones after all of the updating operations. Alternatively, it is possible to remove less probable patterns and corresponding process set candidates after each of the updating operations is performed.

Since it is unnecessary to consider the probabilities of the removed ones, the time needed for generating the model can be reduced.

For example, patterns with probabilities not greater than a threshold value may be removed at the stage at which the patterns of FIGS. 50 and 51 are generated, i.e., at the stage at which the possible patterns are first generated and the probabilities of the patterns are obtained. When the threshold value is 0.1, the probability of the pattern of calls from the process type A indicated in FIG. 50 is 1/8, and therefore this pattern is not removed. On the other hand, since the patterns B5, B6, and B8 of calls from the process type B indicated in FIG. 51 are 1/16, i.e., below the threshold value, these patterns B5, B6, and B8 can be removed. Once these patterns are removed, the corresponding processes are regarded as not being called according to these patterns in the actual operation.

Therefore, the removed patterns are regarded as unnecessary to be considered for obtaining the probabilities of possible patterns at the stages after the removal. For example, as mentioned before, the sets of processes which can be called from the process P3 of the process type B are as follows.

{process P8}
{process P8, process P7}
{process P8, process P9}
{process P8, process P10}
{process P8, process P7, process P9}
{process P8, process P7, process P10}
{process P8, process P9, process P10}
{process P8, process P7, process P9, process P10}

Since the process type of the processes P8 and P10 is a, and the process type of the processes P7 and P9 is b, the set {process P8, process P10} corresponds to the pattern B5, the set {process P8, process P7, process P9} corresponds to the pattern B6, and the set {process P8, process P7, process P9, process P10} corresponds to the pattern B8. That is, calls corresponding to these sets do not occur, and therefore it is unnecessary to consider occurrence of such calls in the following processing. Thus, when such patterns corresponding to the calls which do not occur are removed from consideration, it is possible to reduce the amount of processing which is performed after the removal.

[Other Applications]

Although, in the above embodiments, the packets constituting messages are collected through the mirror port of the switch 10, alternatively, it is possible to record dump data of the messages in the web server 31, the application server 32, and the DB server 33, and then collect the dump data from the web server 31, the application server 32, and the DB server 33 by the message monitoring unit 120.

Further, it is also possible to update the transaction model according to the result of the analysis by the analysis unit 150. For example, when processing times in each server during transactions of an arbitrary type are obtained by the analysis unit 150, it is possible to obtain an average of the processing times for each process type as a processing time in a transaction model.

The above processing functions can be realized by a computer. In this case, a program describing details of processing for realizing the functions which the system analysis apparatus should have is provided. When the computer executes the program, the above processing functions can be realized on the computer.

The program describing the details of the processing can be stored in a recording medium which can be read by the computer. The recording medium may be a magnetic recording device, an optical disc, an optical magnetic recording medium, a semiconductor memory, or the like. The magnetic recording device may be a hard disk drive (HDD), a flexible disk (FD), a magnetic tape, or the like. The optical disc may be a DVD (Digital Versatile disc), a DVD-RAM (Random Access Memory), a CD-ROM (Compact disc Read Only Memory), a CD-R (Recordable)/RW (ReWritable), or the like. The optical magnetic recording medium may be an MO (Magneto-Optical disc) or the like.

In order to put the program into the market, for example, it is possible to sell a portable recording medium such as a DVD or a CD-ROM in which the program is recorded. Alternatively, it is possible to store the program in a storage device belonging to a server computer, and transfer the program to another computer through a network.

The computer which executes the program stores the program in a storage device belonging to the computer, where the program is originally recorded in, for example, a portable recording medium, or transferred from the server computer. The computer reads the program from the storage device, and performs processing in accordance with the program. Alternatively, the computer may directly read the program from the portable recording medium for performing processing in accordance with the program. Further, the computer can sequentially execute processing in accordance with each portion of the program when the portion of the program is transferred from the server computer.

ADVANTAGES OF THE INVENTION

As explained above, according to the present invention, a transaction model is generated from a set of messages which is selected in accordance with a selection criterion based on the certainty of existence of caller-called relationships between processes, and processing of a transaction is analyzed based on messages in accordance with the transaction model. Therefore, it is possible to identify a set of messages constituting a common transaction, and analyze a processing status, without adding functions to the servers.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable storage medium storing a system analysis program for analyzing an operational form of a network to which a plurality of servers that constitute a multi-layered system are connected, by using a computer, wherein the system analysis program makes the computer execute processing comprising:

collecting messages captured by a switch;

analyzing contents of the collected messages;

determining process types requested by the collected messages and message types indicating whether or not each of the collected messages is a request message or a response message;

storing the determined process types and message types in a protocol-log storage unit as a protocol log;

upon input of an instruction for generation of a model:

identifying at least one process corresponding to each process type, based on at least one correspondence relationship between at least one request message and at least one response message corresponding to each of the process types which are indicated in the protocol log;

selecting a set of messages in accordance with a selection criterion based on certainty of existence of caller-called relationships;

generating a transaction model which satisfies at least one limiting condition related to the caller-called relationships between the identified processes, based on the selected messages;

upon input of an instruction for analysis:

extracting, from the protocol-log storage unit, the protocol log corresponding to at least one caller-called relationship indicated by the transaction model;

analyzing a processing status of a transaction constituted by a message indicated by the extracted protocol log; and outputting a result of the analyzing;

wherein the selecting determines whether, in a processing time span from a request message to a response message corresponding to an identified process executed by a server belonging to a top layer of the multi-layered system, a message corresponding to another identified process in the top layer of the multi-layered system exists or not, and when no message corresponding to another identified process exists, selects the set of messages that includes the request message, the response message corresponding to the identified processes, and all messages in the processing time span corresponding to identified processes executed by servers belonging to lower layers than the tip layer, the top layer being a layer where the request message from a client computer is received, wherein the transaction model has the caller-called relationships and processing times, wherein the limiting condition includes a condition that a processing time span of a caller process includes a processing time span of a called process, and directions of calls between the plurality of the servers, and wherein the generating generates the transaction model based on the selected set of messages, generates one or more patterns of occurrence each indicating a combination of processes which can be called from processes of each process type, calculates a probability of each of the one or more patterns of occurrence, chooses a predetermined number of ones of the one or more patterns of occurrence having higher probabilities, and generates said transaction model based on the chosen ones of the one or more patterns of occurrence.

2. The computer-readable medium according to claim 1, wherein the generating calculates a time necessary for performing processing corresponding to each protocol in each of the plurality of servers, based on a time elapsed after occurrence of a request message until occurrence of a response message corresponding to each process type in a transaction, and sets the calculated time in said transaction model.

3. The computer-readable medium according to claim 1, wherein when there are a plurality of processes which can call a process to be called, the generating uniformly determines a probability of a call from each of the plurality of processes, integrates probabilities of calls from the plurality of processes to other processes into probabilities on a process type basis, and calculates the likelihoods of caller-called relationships.

4. A system analysis method for analyzing an operational form of a network to which a plurality of servers that constitute a multi-layered system are connected, by using a computer, wherein the system analysis method makes the computer execute processing comprising:

collecting messages captured by a switch;
 analyzing contents of the collected messages;
 determining process types requested by the collected messages and message types indicating whether or not each of the messages is a request message or a response message;
 storing the determined process types and message types in a protocol-log storage unit as a protocol log;
 upon input of an instruction for generation of a model:
  identifying at least one process corresponding to each process type, based on at least one correspondence relationship between at least one request message and at least one response message corresponding to each of the process types which are indicated in the protocol log;
  selecting a set of messages in accordance with a selection criterion based on certainty of existence of caller-called relationships;
  generating a transaction model which satisfies at least one limiting condition related to the caller-called relationships between the identified processes, based on the selected messages;
 upon input of an instruction for analysis:
  extracting, from the protocol-log storage unit, said protocol log corresponding to at least one caller-called relationship indicated by the transaction model;
  analyzing a processing status of a transaction constituted by message indicated by the extracted protocol log; and
  outputting a result of the analyzing,
 wherein the selecting determines whether, in a processing time span from a request message to a response message corresponding to an identified process executed by a server belonging to a top layer of the multi-layered system, a message corresponding to another identified process in the top layer of the multi-layered system exists or not, and when no message corresponding to another identified process exists, selects the set of messages that includes the request message, the response message corresponding to the identified process, and all messages in the processing time span corresponding to identified processes executed by servers belonging to lower layers than the tip layer, the top layer being a layer where the request message from a client computer is received,
 wherein the transaction model has the caller-called relationships and processing times,
 wherein the limiting condition includes a condition that a processing time span of a caller process includes a processing time span of a called process, and directions of calls between the plurality of the servers, and
 wherein the generating generates the transaction model based on the selected set of messages, generates one or more patterns of occurrence each indicating a combination of processes which can be called from processes of each process type, calculates a probability of each of the one or more patterns of occurrence, chooses a predetermined number of ones of the one or more patterns of occurrence having higher probabilities, and generates said transaction model based on the chosen ones of the one or more patterns of occurrence.

5. A system analysis apparatus for analyzing an operational form of a network to which a plurality of servers constituting a multi-layered system are connected, comprising:
a processor further comprising:
a message monitoring unit which collects messages from a switch;
a message analyzing unit which analyzes contents of the collected messages;
a process type determining unit which determines process types requested by the collected messages and message types indicating whether or not each of the messages is a request message or a response message;
a message analysis store unit which stores the determined process types and message types in a protocol-log storage unit as a protocol log;
an identifying unit which identifies at least one process corresponding to each process type, based on at least one correspondence relationship between at least one request message and at least one response message corresponding to each of the process types indicated in the protocol log;
a selecting unit which selects a set of messages in accordance with a selection criterion based on certainty of existence of caller-called relationships;
a model generation unit which generates a transaction model which satisfies at least one limiting condition related to the caller-called relationships between the identified processes, based on the selected messages;
an extracting unit which extracts, from the protocol-log storage unit, the protocol log corresponding to at least one caller-called relationship indicated by the transaction model;
an analysis unit which analyzes a processing status of a transaction constituted by a message indicated by the extracted protocol log; and
an output unit which outputs a result obtained from the analysis unit,
wherein the selecting unit determines whether, in a processing time span from a request message to a response message corresponding to an identified process executed by a server belonging to a top layer of the multi-layered system, a message corresponding to another identified process in the top layer of the multi-layered system exists or not, and when no message corresponding to another identified process exists, selects the set of messages that includes the request message, the response message corresponding to the identified process and all messages existing in the processing time span corresponding to identified processes executed by servers belonging to lower layers than the top layer,
wherein the transaction model has the caller-called relationships and processing times,
wherein the limiting condition includes a condition that a processing time span of a caller process includes a processing time span of a called process, and directions of calls between the plurality of the servers, and wherein the model generation unit generates the transaction model based on the selected set of messages, generates one or more patterns of occurrence each indicating a combination of processes which can be called from processes of each process type, calculates a probability of each of the one or more patterns of occurrence, chooses a predetermined number of ones of the one or more patterns of occurrence having higher probabilities, and generates said transaction model based on the chosen ones of the one or more patterns of occurrence.

* * * * *